US012792895B1

(12) United States Patent
Ko et al.

(10) Patent No.: US 12,792,895 B1
(45) Date of Patent: Nov. 10, 2026

(54) DOT PRODUCT COMPUTATION CIRCUITS FOR HANDLING QUINARY WEIGHTS

(71) Applicant: Amazon Technologies, Inc., Seattle, WA (US)

(72) Inventors: Jung Ko, San Jose, CA (US); Kenneth Duong, San Jose, CA (US); Brian Thomas, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 380 days.

(21) Appl. No.: 18/416,265

(22) Filed: Jan. 18, 2024

Related U.S. Application Data

(60) Provisional application No. 63/616,453, filed on Dec. 29, 2023.

(51) Int. Cl.
*G06N 3/063* (2023.01)
*G06F 7/523* (2006.01)
*G06N 3/0464* (2023.01)

(52) U.S. Cl.
CPC ............ *G06N 3/063* (2013.01); *G06F 7/523* (2013.01); *G06N 3/0464* (2023.01)

(58) Field of Classification Search
CPC ....... G06N 3/063; G06N 3/0464; G06F 7/523
USPC ...................................................... 706/26, 25
See application file for complete search history.

(56) References Cited

U.S. PATENT DOCUMENTS 5,463,573 A 10/1995 Yoshida
5,956,703 A 9/1999 Turner et al.
6,038,583 A 3/2000 Oberman et al.
8,577,951 B1 11/2013 Langhammer
9,710,265 B1 7/2017 Temam et al.
9,858,636 B1 1/2018 Lim et al.
9,904,874 B2 2/2018 Shoaib et al.
10,409,604 B2 9/2019 Kennedy et al.
(Continued)

FOREIGN PATENT DOCUMENTS

CN 108876698 A 11/2018
CN 108280514 B 10/2020
(Continued)

OTHER PUBLICATIONS

"Reinforcement Learning with Deep Deterministic Policy Gradient" Published by IEEE (Year: 2021).*
(Continued)

*Primary Examiner* — Zeina Elchanti
(74) *Attorney, Agent, or Firm* — K&L Gates LLP

(57) ABSTRACT

Some embodiments provide a neural network inference circuit (NNIC) for executing a neural network. The NNIC includes a set of circuits to compute a dot product of a set of inputs and a set of predefined weights. Each weight is one of a positive value, twice the positive value, the negation of the positive value, twice the negation of the positive value, and the value zero. The set of circuits includes an adder tree circuit to (i) receive at least a subset of the inputs, (ii) apply a negation factor to received inputs with negative corresponding weights, and (iii) add together the received inputs with the negation factors. The set of circuits includes, for each input of the subset of inputs, a circuit to configurably double the input when the weight corresponding to the input is either twice the positive value or twice the negation of the positive value.

20 Claims, 28 Drawing Sheets

(56) References Cited

U.S. PATENT DOCUMENTS

| | | | |
|---|---|---|---|
| 10,445,638 | B1 | 10/2019 | Amirineni et al. |
| 10,489,478 | B2 | 11/2019 | Lim et al. |
| 10,515,303 | B2 | 12/2019 | Lie et al. |
| 10,614,357 | B2 | 4/2020 | Lie |
| 10,657,438 | B2 | 5/2020 | Lie et al. |
| 10,664,310 | B2 | 5/2020 | Bokhari |
| 10,699,189 | B2 | 6/2020 | Lie |
| 10,740,434 | B1 | 8/2020 | Duong et al. |
| 10,768,856 | B1 | 9/2020 | Diamant et al. |
| 10,796,198 | B2 | 10/2020 | Franca-Neto |
| 10,817,042 | B2 | 10/2020 | Desai et al. |
| 10,853,738 | B1 | 12/2020 | Dockendorf et al. |
| 10,970,630 | B1 | 4/2021 | Aimone |
| 10,977,338 | B1 | 4/2021 | Duong et al. |
| 11,003,736 | B2 | 5/2021 | Duong et al. |
| 11,049,013 | B1 | 6/2021 | Duong et al. |
| 11,138,292 | B1 | 10/2021 | Nair et al. |
| 11,170,289 | B1 | 11/2021 | Duong et al. |
| 11,205,115 | B1 | 12/2021 | Duong et al. |
| 11,210,586 | B1 | 12/2021 | Duong et al. |
| 11,222,257 | B1 | 1/2022 | Ko et al. |
| 11,232,347 | B2 | 1/2022 | Lie |
| 11,250,326 | B1 | 2/2022 | Ko et al. |
| 11,295,200 | B1 | 4/2022 | Ko et al. |
| 11,341,397 | B1 | 5/2022 | Duong et al. |
| 11,347,297 | B1 | 5/2022 | Ko et al. |
| 11,361,213 | B1 | 6/2022 | Duong et al. |
| 11,403,530 | B1 | 8/2022 | Ko et al. |
| 11,423,289 | B2 | 8/2022 | Judd et al. |
| 11,468,145 | B1 | 10/2022 | Duong et al. |
| 11,481,612 | B1 | 10/2022 | Duong et al. |
| 11,488,004 | B2 | 11/2022 | Lie |
| 11,501,138 | B1 | 11/2022 | Duong et al. |
| 11,531,727 | B1 | 12/2022 | Ko et al. |
| 11,531,868 | B1 | 12/2022 | Duong et al. |
| 11,537,853 | B1 | 12/2022 | Afzal |
| 11,568,227 | B1 | 1/2023 | Ko et al. |
| 11,586,910 | B1 | 2/2023 | Duong et al. |
| 11,625,585 | B1 | 4/2023 | Thomas et al. |
| 11,809,515 | B2 | 11/2023 | Duong et al. |
| 11,868,867 | B1 | 1/2024 | Afzal |
| 12,609,905 | B1 * | 4/2026 | Cai ........................ H04L 41/16 |
| 2004/0078403 | A1 | 4/2004 | Scheuermann et al. |
| 2011/0055308 | A1 | 3/2011 | Mantor et al. |
| 2011/0307685 | A1 | 12/2011 | Song |
| 2016/0086078 | A1 | 3/2016 | Ji et al. |
| 2016/0239706 | A1 | 8/2016 | Dijkman et al. |
| 2016/0328643 | A1 | 11/2016 | Liu et al. |
| 2016/0342893 | A1 | 11/2016 | Ross et al. |
| 2017/0011006 | A1 | 1/2017 | Saber et al. |
| 2017/0011288 | A1 | 1/2017 | Brothers et al. |
| 2017/0168775 | A1 | 6/2017 | Tseng et al. |
| 2017/0243110 | A1 | 8/2017 | Esquivel et al. |
| 2017/0300828 | A1 | 10/2017 | Feng et al. |
| 2017/0323196 | A1 | 11/2017 | Gibson et al. |
| 2017/0344882 | A1 | 11/2017 | Ambrose |
| 2018/0018559 | A1 | 1/2018 | Yakopcic et al. |
| 2018/0046458 | A1 | 2/2018 | Kuramoto |
| 2018/0046900 | A1 | 2/2018 | Dally et al. |
| 2018/0046905 | A1 | 2/2018 | Li et al. |
| 2018/0046916 | A1 | 2/2018 | Dally et al. |
| 2018/0101763 | A1 | 4/2018 | Barnard et al. |
| 2018/0114569 | A1 | 4/2018 | Strachan et al. |
| 2018/0121196 | A1 | 5/2018 | Temam et al. |
| 2018/0121796 | A1 | 5/2018 | Deisher et al. |
| 2018/0164866 | A1 | 6/2018 | Turakhia et al. |
| 2018/0181406 | A1 | 6/2018 | Kuramoto |
| 2018/0189229 | A1 | 7/2018 | Desoli et al. |
| 2018/0189638 | A1 | 7/2018 | Nurvitadhi et al. |
| 2018/0197068 | A1 | 7/2018 | Narayanaswami et al. |
| 2018/0218518 | A1 | 8/2018 | Yan et al. |
| 2018/0246855 | A1 | 8/2018 | Redfern et al. |
| 2018/0285719 | A1 | 10/2018 | Baum et al. |
| 2018/0285726 | A1 | 10/2018 | Baum et al. |
| 2018/0285727 | A1 | 10/2018 | Baum et al. |
| 2018/0285736 | A1 | 10/2018 | Baum et al. |
| 2018/0293490 | A1 | 10/2018 | Ma et al. |
| 2018/0293493 | A1 | 10/2018 | Kalamkar et al. |
| 2018/0293691 | A1 | 10/2018 | Nurvitadhi et al. |
| 2018/0300600 | A1 | 10/2018 | Ma et al. |
| 2018/0307494 | A1 | 10/2018 | Ould-Ahmed-Vall et al. |
| 2018/0307950 | A1 | 10/2018 | Nealis et al. |
| 2018/0307980 | A1 | 10/2018 | Barik et al. |
| 2018/0307985 | A1 | 10/2018 | Appu et al. |
| 2018/0308202 | A1 | 10/2018 | Appu et al. |
| 2018/0314492 | A1 | 11/2018 | Fais et al. |
| 2018/0314941 | A1 | 11/2018 | Lie et al. |
| 2018/0315158 | A1 | 11/2018 | Nurvitadhi et al. |
| 2018/0315399 | A1 | 11/2018 | Kaul |
| 2018/0322095 | A1 | 11/2018 | Longley et al. |
| 2018/0322386 | A1 | 11/2018 | Sridharan et al. |
| 2018/0322387 | A1 | 11/2018 | Sridharan et al. |
| 2018/0329868 | A1 | 11/2018 | Chen et al. |
| 2018/0365794 | A1 | 12/2018 | Lee et al. |
| 2018/0373975 | A1 | 12/2018 | Yu et al. |
| 2019/0012296 | A1 | 1/2019 | Hsieh et al. |
| 2019/0026078 | A1 | 1/2019 | Bannon et al. |
| 2019/0026237 | A1 | 1/2019 | Talpes et al. |
| 2019/0026249 | A1 | 1/2019 | Talpes et al. |
| 2019/0041961 | A1 | 2/2019 | Desai et al. |
| 2019/0057036 | A1 | 2/2019 | Mathuriya et al. |
| 2019/0073585 | A1 | 3/2019 | Pu et al. |
| 2019/0087713 | A1 | 3/2019 | Lamb et al. |
| 2019/0095776 | A1 | 3/2019 | Kfir et al. |
| 2019/0114499 | A1 | 4/2019 | Delaye et al. |
| 2019/0114534 | A1 | 4/2019 | Teng |
| 2019/0138891 | A1 | 5/2019 | Kim et al. |
| 2019/0147338 | A1 | 5/2019 | Pau et al. |
| 2019/0156180 | A1 | 5/2019 | Nomura et al. |
| 2019/0171927 | A1 | 6/2019 | Diril et al. |
| 2019/0179635 | A1 | 6/2019 | Jiao et al. |
| 2019/0180167 | A1 | 6/2019 | Huang et al. |
| 2019/0187983 | A1 | 6/2019 | Ovsiannikov et al. |
| 2019/0196970 | A1 | 6/2019 | Han et al. |
| 2019/0205094 | A1 | 7/2019 | Diril et al. |
| 2019/0205358 | A1 | 7/2019 | Diril et al. |
| 2019/0205736 | A1 | 7/2019 | Bleiweiss et al. |
| 2019/0205739 | A1 | 7/2019 | Liu et al. |
| 2019/0205740 | A1 | 7/2019 | Judd et al. |
| 2019/0205780 | A1 | 7/2019 | Sakaguchi |
| 2019/0236437 | A1 | 8/2019 | Shin et al. |
| 2019/0236445 | A1 | 8/2019 | Das et al. |
| 2019/0266217 | A1 | 8/2019 | Arakawa et al. |
| 2019/0266479 | A1 | 8/2019 | Singh et al. |
| 2019/0294413 | A1 | 9/2019 | Vantrease et al. |
| 2019/0294959 | A1 | 9/2019 | Vantrease et al. |
| 2019/0294968 | A1 | 9/2019 | Vantrease et al. |
| 2019/0303741 | A1 | 10/2019 | Appuswamy et al. |
| 2019/0303749 | A1 | 10/2019 | Appuswamy et al. |
| 2019/0303750 | A1 | 10/2019 | Kumar et al. |
| 2019/0325296 | A1 | 10/2019 | Fowers et al. |
| 2019/0332925 | A1 | 10/2019 | Modha |
| 2019/0340493 | A1 | 11/2019 | Coenen |
| 2019/0347559 | A1 | 11/2019 | Kang et al. |
| 2019/0385046 | A1 | 12/2019 | Cassidy et al. |
| 2020/0005131 | A1 | 1/2020 | Nakahara et al. |
| 2020/0042856 | A1 | 2/2020 | Datta et al. |
| 2020/0042859 | A1 | 2/2020 | Mappouras et al. |
| 2020/0089506 | A1 | 3/2020 | Power et al. |
| 2020/0134461 | A1 | 4/2020 | Chai et al. |
| 2020/0210838 | A1 | 7/2020 | Lo et al. |
| 2020/0234114 | A1 | 7/2020 | Rakshit et al. |
| 2020/0257930 | A1 | 8/2020 | Nahr et al. |
| 2020/0301668 | A1 | 9/2020 | Li |
| 2020/0364545 | A1 | 11/2020 | Shattil |
| 2020/0380344 | A1 | 12/2020 | Lie et al. |
| 2020/0380363 | A1 | 12/2020 | Kwon et al. |
| 2021/0110236 | A1 | 4/2021 | Shibata |
| 2021/0173787 | A1 | 6/2021 | Nagy et al. |
| 2021/0232897 | A1 | 7/2021 | Bichler |
| 2021/0241082 | A1 | 8/2021 | Nagy et al. |
| 2021/0287074 | A1 | 9/2021 | Coenen |

(56) References Cited

U.S. PATENT DOCUMENTS

2022/0004854 A1 1/2022 Lee
2022/0121914 A1 4/2022 Huang et al.
2022/0335562 A1 10/2022 Surti et al.

FOREIGN PATENT DOCUMENTS

GB 2568086 A 5/2019
WO 2020044527 A1 3/2020

OTHER PUBLICATIONS

Abtahi, Tahmid, et al., "Accelerating Convolutional Neural Network With FFT on Embedded Hardware," IEEE Transactions on Very Large Scale Integration (VLSI) Systems, Sep. 2018, 14 pages, vol. 26, No. 9, IEEE.
Achterhold, Jan, et al., "Variational Network Quantization," Proceedings of 6th International Conference on Learning Representations (ICLR 2018), Apr. 30-May 3, 2018, 18 pages, ICLR, Vancouver, BC, Canada.
Andri, Renzo, et al., "YodaNN: An Architecture for Ultra-Low Power Binary-Weight CNN Acceleration," IEEE Transactions on Computer-Aided Design of Integrated Circuits and Systems, Mar. 14, 2017, 14 pages, IEEE, New York, NY, USA.
Ardakani, Arash, et al., "An Architecture to Accelerate Convolution in Deep Neural Networks," IEEE Transactions on Circuits and Systems I: Regular Papers, Oct. 17, 2017, 14 pages, vol. 65, No. 4, IEEE.
Ardakani, Arash, et al., "Sparsely-Connected Neural Networks: Towards Efficient VLSI Implementation of Deep Neural Networks," Proceedings of the 5th International Conference on Learning Representations (ICLR 2017), Apr. 24-26, 2017, 14 pages, ICLR, Toulon, France.
Bagherinezhad, Hessam, et al., "LCNN: Look-up Based Convolutional Neural Network," Proceedings of 2017 IEEE Conference on Computer Vision and Pattern Recognition (CVPR 2017), Jul. 21-26, 2017, 10 pages, IEEE, Honolulu, HI, USA.
Bang, Suyoung, et al., "A 288 µW Programmable Deep-Learning Processor with 270KB On-Chip Weight Storage Using Non-Uniform Memory Hierarchy for Mobile Intelligence," Proceedings of 2017 IEEE International Solid-State Circuits Conference (ISSCC 2017), Feb. 5-7, 2017, 3 pages, IEEE, San Francisco, CA, USA.
Bong, Kyeongryeol, et al., "A 0.62mW Ultra-Low-Power Convolutional-Neural-Network Face-Recognition Processor and a CIS Integrated with Always-On Haar-Like Face Detector," Proceedings of 2017 IEEE International Solid-State Circuits Conference (ISSCC 2017), Feb. 5-7, 2017, 3 pages, IEEE, San Francisco, CA, USA.
Boo, Yoonho, et al., "Structured Sparse Ternary Weight Coding of Deep Neural Networks for Efficient Hardware Implementations," 2017 IEEE Workshop on Signal Processing Systems (SiPS), Oct. 3-5, 2017, 6 pages, IEEE, Lorient, France.
Carbon, A., et al., "Pleura: A Scalable Energy-Efficient Programmable Hardware Accelerator for Neural Networks," 2018 Design, Automation & Test in Europe Conference & Exhibition (DATE 2018), Mar. 19-23, 2018, 6 pages, IEEE, Dresden, Germany.
Chen, Tianqi, et al., "TVM: End-to-End Optimization Stack for Deep Learning," Feb. 12, 2018, 19 pages, arXiv:1802.04799v1, Computing Research Repository (CoRR)—Cornell University, Ithaca, NY, USA.
Chen, Yu-Hsin, et al., "Eyeriss: A Spatial Architecture for Energy-Efficient Dataflow for Convolutional Neural Networks," Proceedings of 2016 ACM/IEEE 43rd Annual International Symposium on Computer Architecture (ISCA 2016), Jun. 18-22, 2016, 13 pages, IEEE, Seoul, South Korea.
Chen, Yu-Hsin, et al., "Using Dataflow to Optimize Energy Efficiency of Deep Neural Network Accelerators," IEEE Micro, Jun. 14, 2017, 10 pages, vol. 37, Issue 3, IEEE, New York, NY, USA.
Cho, Minsik, et al., "MEC: Memory-Efficient Convolution for Deep Neural Network," Jun. 21, 2017, 10 pages, arXiv:1706.06873v1, Computer Research Repository (CoRR)—Cornell University, Ithaca, NY, USA.
Courbariaux, Matthieu, et al., "Binarized Neural Networks: Training Neural Networks with Weights and Activations Constrained to +1 or −1," Mar. 17, 2016, 11 pages, arXiv:1602.02830v3, Computing Research Repository (CoRR)—Cornell University, Ithaca, NY, USA.
Courbariaux, Matthieu, et al., "BinaryConnect: Training Deep Neural Networks with Binary Weights during Propagations," Proceedings of the 28th International Conference on Neural Information Processing Systems (NIPS '15), Dec. 7-12, 2015, 9 pages, MIT Press, Montreal, Canada.
Deng, Lei, et al., "GXNOR-Net: Training Deep Neural Networks with Ternary Weights and Activations without Full- Precision Memory under a Unified Discretization Framework," Neural Networks 100, Feb. 2018, 10 pages, Elsevier.
Duda, Jarek, "Asymmetric Numeral Systems: Entropy Coding Combining Speed of Huffman Coding with Compression Rate of Arithmetic Coding," Jan. 6, 2014, 24 pages, arXiv:1311.2540v2, Computer Research Repository (CoRR)—Cornell University, Ithaca, NY, USA.
Emer, Joel, et al., "Hardware Architectures for Deep Neural Networks," CICS/MTL Tutorial, Mar. 27, 2017, 258 pages, Massachusetts Institute of Technology, Cambridge, MA, USA, retrieved from http://www.rle.mit.edu/eems/wp-content/uploads/2017/03/Tutorial-on-DNN-CICS-MTL.pdf.
Fu, Yao, et al., "Embedded Vision with INT8 Optimization on Xilinx Devices," WP490 (v1.0.1), Apr. 19, 2017, 15 pages, Xilinx, Inc., San Jose, CA, USA.
Gao, Mingyu, et al., "TETRIS: Scalable and Efficient Neural Network Acceleration with 3D Memory," Proceedings of the 22nd International Conference on Architectural Support for Programming Languages and Operating Systems (ASPLOS '17), Apr. 8-12, 2017, 14 pages, ACM, Xi'an, China.
Ghanekar, Sachin P., et al., "Signed-Digit-Based Multiplier-Free Realizations for Multirate Converters," IEEE Transactions on Signal Processing, Mar. 1995, 12 pages, vol. 43, No. 3, IEEE.
Giri, Sweta, et al., "Implementation of Combinational Circuits Using Ternary Multiplexer," International Journal of Computational Engineering Research, Mar.-Apr. 2012, 7 pages, vol. 2, No. 2, IJCER.
Gokhale, Vinayak, et al., "Snowflake: A Model Agnostic Accelerator for Deep Convolutional Neural Networks," Aug. 8, 2017, 11 pages, arXiv:1708.02579v1, Computing Research Repository (CoRR)—Cornell University, Ithaca, NY, USA.
Guo, Yiwen, et al., "Network Sketching: Exploring Binary Structure in Deep CNNs," 2017 IEEE Conference on Computer Vision and Pattern Recognition (CVPR 2017), Jul. 21-26, 2017, 9 pages, IEEE, Honolulu, HI.
Hanlon, Jamie, "Why is So Much Memory Needed for Deep Neural Networks?," Jan. 31, 2017, 6 pages, Graphcore, Bristol, United Kingdom, retrieved from https://www.graphcore.ai/posts/why-is-so-much-memory-needed-for-deep-neural-networks.
He, Zhezhi, et al., "Optimize Deep Convolutional Neural Network with Ternarized Weights and High Accuracy," Jul. 20, 2018, 8 pages, arXiv:1807.07948v1, Computing Research Repository (CoRR)—Cornell University, Ithaca, NY, USA.
Hegde, Kartik, et al., "UCNN: Exploiting Computational Reuse in Deep Neural Networks via Weight Repetition," Proceedings of the 45th Annual International Symposium on Computer Architecture (ISCA '18), Jun. 2-6, 2018, 14 pages, IEEE Press, Los Angeles, CA, USA.
Horowitz, Mark, "Computing's Energy Problem (and what can we do about it)," 2014 IEEE International Solid-State Circuits Conference (ISSCC 2014), Feb. 9-13, 2014, 5 pages, IEEE, San Francisco, CA, USA.
Huan, Yuxiang, et al., "A Low-Power Accelerator for Deep Neural Networks with Enlarged Near-Zero Sparsity," May 22, 2017, 5 pages, arXiv:1705.08009v1, Computer Research Repository (CoRR)—Cornell University, Ithaca, NY, USA.

(56) References Cited

OTHER PUBLICATIONS

Jain, Anil K., et al., "Artificial Neural Networks: A Tutorial," Computer, Mar. 1996, 14 pages, vol. 29, Issue 3, IEEE.
Jeon, Dongsuk, et al., "A 23-mW Face Recognition Processor with Mostly-Read 5T Memory in 40-nm CMOS," IEEE Journal on Solid-State Circuits, Jun. 2017, 15 pages, vol. 52, No. 6, IEEE, New York, NY, USA.
Jin, Canran,, et al., "Sparse Ternary Connect: Convolutional Neural Networks Using Ternarized Weights with Enhanced Sparsity," 2018 23rd Asia and South Pacific Design Automation Conference (ASP-DAC), Jan. 22-25, 2018, 6 pages, IEEE, Jeju, South Korea.
Jouppi, Norman, P., et al., "In-Datacenter Performance Analysis of a Tensor Processing Unit," Proceedings of the 44th Annual International Symposium on Computer Architecture (ISCA '17), Jun. 24-28, 2017, 17 pages, ACM, Toronto, ON, Canada.
Judd, Patrick, et al., "Cnvlutin2: Ineffectual-Activation-and-Weight-Free Deep Neural Network Computing," Apr. 29, 2017, 6 pages, arXiv:1705.00125v1, Computer Research Repository (CoRR)—Cornell University, Ithaca, NY, USA.
Kumar, Ashish, et al., "Resource-efficient Machine Learning in 2 KB RAM for the Internet of Things," Proceedings of the 34th International Conference on Machine Learning, Aug. 6-11, 2017, 10 pages, vol. 70, PMLR, Sydney, Australia.
Leng, Cong, et al., "Extremely Low Bit Neural Network: Squeeze the Last Bit Out with ADMM," Proceedings of 32nd AAAI Conference on Artificial Intelligence (AAAI-18), Feb. 2-7, 2018, 16 pages, Association for the Advancement of Artificial Intelligence, New Orleans, LA, USA.
Li, Fengfu, et al., "Ternary Weight Networks," May 16, 2016, 9 pages, arXiv:1605.04711v1, Computing Research Repository (CoRR)—Cornell University, Ithaca, NY, USA.
Liu, Shaoli, et al., "Cambricon: An Instruction Set Architecture for Neural Networks," 2016 ACM/IEEE 43rd Annual International Symposium on Computer Architecture, Jun. 18-22, 2016, 13 pages, IEEE, Seoul, South Korea.
Merolla, Paul, et al., "Deep Neural Networks are Robust to Weight Binarization and Other Non-linear Distortions," Jun. 7, 2016, 10 pages, arXiv:1606.01981v1, Computing Research Repository (CoRR)—Cornell University, Ithaca, NY, USA.
Moons, Bert, et al., "ENVISION: A 0.26-to-10TOPS/W Subword-Parallel Dynamic-Voltage-Accuracy-Frequency-Scalable Convolutional Neural Network Processor in 28nm FDSOI," Proceedings of 2017 IEEE International Solid-State Circuits Conference (ISSCC 2017), Feb. 5-7, 2017, 3 pages, IEEE, San Francisco, CA, USA.
Moshovos, Andreas, et al., "Exploiting Typical Values to Accelerate Deep Learning," Computer, May 24, 2018, 13 pages, vol. 51-Issue 5, IEEE Computer Society, Washington, D.C.
Non-Published commonly Owned U.S. Appl. No. 18/416,266, filed Jan. 18, 2024, 119 pages, Perceive Corporation.
Non-Published commonly Owned U.S. Appl. No. 18/416,268, filed Jan. 18, 2024, 120 pages, Perceive Corporation.
Park, Jongsoo, et al., "Faster CNNs with Direct Sparse Convolutions and Guided Pruning," Jul. 28, 2017, 12 pages, arXiv:1608.01409v5, Computer Research Repository (CoRR)—Cornell University, Ithaca, NY, USA.
Patterson, David, et al., "Computer Organization and Design: The Hardware/Software Interface—Chapter 4—The Processor," Fifth Edition, Sep. 26, 2013, 124 pages, Elsevier, Inc.
Pawar, A. B., "Radix-2 Vs Radix-4 High Speed Multiplier," International Journal of Advanced Research in Computer Science and Software Engineering, Mar. 2015, 5 pages, vol. 5, No. 3, IJARCSSE.
Pedram, Ardavan, et al., "Dark Memory and Accelerator-Rich System Optimization in the Dark Silicon Era," Apr. 27, 2016, 8 pages, arXiv:1602.04183v3, Computer Research Repository (CoRR)—Cornell University, Ithaca, NY, USA.
Rastegari, Mohammad, et al., "XNOR-Net: ImageNet Classification Using Binary Convolutional Neural Networks," Proceedings of 2016 European Conference on Computer Vision (ECCV '16), Oct. 8-16, 2016, 17 pages, Lecture Notes in Computer Science, vol. 9908, Springer, Cham, Amsterdam, Netherlands.
Ren, Mengye, et al., "SBNet: Sparse Blocks Network for Fast Inference," Jan. 7, 2018, 10 pages, arXiv:1801.02108v1, Computer Research Repository (CoRR)—Cornell University, Ithaca, NY, USA.
Han, Song, "Efficient Methods and Hardware for Deep Learning," Sep. 217, 125 pages, Stanford University, Palo Alto, CA, USA.
Rutenbar, Rob A., et al., "Hardware Inference Accelerators for Machine Learning," 2016 IEEE International Test Conference (ITC), Nov. 15-17, 2016, 39 pages, IEEE, Fort Worth, TX, USA.
Sen, Sanchari, et al., "SPARCE: Sparsity aware General Purpose Core Extensions to Accelerate Deep Neural Networks," Nov. 29, 2017, 13 pages, arXiv:1711.06315v2, Computer Research Repository (CoRR)—Cornell University, Ithaca, NY, USA.
Shayer, Oran, et al., "Learning Discrete Weights Using the Local Reparameterization Trick," Proceedings of 6th International Conference on Learning Representations (ICLR 2018), Apr. 30-May 3, 2018, 12 pages, ICLR, Vancouver, BC, Canada.
Shin, Dongjoo, et al., "DNPU: An 8.1TOPS/W Reconfigurable CNN-RNN Processor for General-Purpose Deep Neural Networks," Proceedings of 2017 IEEE International Solid-State Circuits Conference (ISSCC 2017), Feb. 5-7, 2017, 3 pages, IEEE, San Francisco, CA, USA.
Sim, Jaehyeong, et al., "A 1.42TOPS/W Deep Convolutional Neural Network Recognition Processor for Intelligent IoE Systems," Proceedings of 2016 IEEE International Solid-State Circuits Conference (ISSCC 2016), Jan. 31-Feb. 4, 2016, 3 pages, IEEE, San Francisco, CA, USA.
Sze, Vivienne, et al., "Efficient Processing of Deep Neural Networks: A Tutorial and Survey," Aug. 13, 2017, 32 pages, arXiv:1703.09039v2, Computer Research Repository (CoRR)—Cornell University, Ithaca, NY, USA.
Wang, Min, et al., "Factorized Convolutional Neural Networks," 2017 IEEE International Conference on Computer Vision Workshops (ICCVW '17), Oct. 22-29, 2017, 9 pages, IEEE, Venice, Italy.
Wang, Peiqi, et al., "HitNet: Hybrid Ternary Recurrent Neural Network," 32nd Conference on Neural Information Processing Systems (NeurIPS '18), Dec. 2018, 11 pages, Montreal, Canada.
Wen, Wei, et al., "Learning Structured Sparsity in Deep Neural Networks," Oct. 18, 2016, 10 pages, arXiv:1608.03665v4, Computer Research Repository (CoRR)—Cornell University, Ithaca, NY, USA.
Yang, Tien-Ju, et al., "Designing Energy-Efficient Convolutional Neural Networks using Energy-Aware Pruning," Apr. 18, 2017, 9 pages, arXiv:1611.05128v4, Computer Research Repository (CoRR)—Cornell University, Ithaca, NY, USA.
Yang, Xuan, et al., "DNN Dataflow Choice Is Overrated," Sep. 10, 2018, 13 pages, arXiv:1809.04070v1, Computer Research Repository (CoRR)—Cornell University, Ithaca, NY, USA.
Zhang, Shijin, et al., "Cambricon-X: An Accelerator for Sparse Neural Networks," 2016 49th Annual IEEE/ACM International Symposium on Microarchitecture (MICRO '16), Oct. 15-19, 2016, 12 pages, IEEE, Taipei, Taiwan.
Zhou, Shuchang, et al., "DoReFa-Net: Training Low Bitwidth Convolutional Neural Networks with Low Bitwidth Gradients," Jul. 17, 2016, 14 pages, arXiv:1606.06160v2, Computer Research Repository (CoRR)—Cornell University, Ithaca, NY, USA.
Zhu, Chenzhuo, et al., "Trained Ternary Quantization," Dec. 4, 2016, 9 pages, arXiv:1612.01064v1, Computing Research Repository (CoRR)—Cornell University, Ithaca, NY, USA.

* cited by examiner

DOT PRODUCT COMPUTATION CIRCUITS FOR HANDLING QUINARY WEIGHTS

BACKGROUND

In a typical neural network, a standard computation is a dot product between input values (activations) and weight values. A common way for an integrated circuit to compute these weight values is to use multiply-accumulate (MAC) circuits that repeatedly perform the multiplication of an input value by a weight value, add that to an existing partial dot product, and store the new partial dot product. However, this requires numerous clock cycles, as each term in the dot product computed by a MAC circuit uses a separate cycle. In addition, the storage of each intermediate term requires the use of memory (contributing to both slowing down of the computation and use of resources for the read/write operations). Accordingly, techniques for parallelization without massively expanding the surface area of the circuit are required.

BRIEF SUMMARY

Some embodiments provide an integrated circuit (IC) for implementing a machine-trained network (e.g., a neural network). The IC of some embodiments includes a set of input processing circuits that prepares input data for the neural network, a neural network computation fabric (also referred to as a neural network inference circuit or a neural network hardware accelerator) that can be configured to apply a neural network to a set of input data, a microprocessor circuit (e.g., a CPU) that controls the input processing circuits and configures the neural network computation fabric according to neural network program instructions, and a unified memory that is accessible by the input processing circuits, neural network computation fabric, and microprocessor circuit. The neural network computation fabric of some embodiments includes (i) a set of cores that compute dot products of input values (also referred to as activation values) and corresponding weight values and (ii) a channel that aggregates these dot products and performs post-processing operations (as well as other operations for different types of computation), in order to compute the outputs of neural network computation nodes.

A typical neural network operates in layers, with each layer including numerous nodes. Examples of neural networks include feed-forward neural networks, regulatory feedback networks, radial basis function networks, recurrent networks, transformer networks, etc. In convolutional or fully-connected neural networks (a type of feed-forward network), a majority of the layers include computation nodes with a linear function followed by a non-linear activation function (applied to the result of the linear function). The linear function is a dot product of input values (either the initial inputs based on the input data for the first layer, or outputs of the previous layer for subsequent layers) and predetermined (trained) weight values, along with bias (addition) and scale (multiplication) terms, which are also predetermined based on training. As such, for convolutional neural networks, the dot products are the primary computation that uses the most circuit resources.

In some embodiments, at startup of the IC, the microprocessor loads neural network configuration data (e.g., weight values, scale and bias parameters, etc.) from off-chip storage and generates instructions for the neural network computation fabric to write the neural network parameters to memory. In addition, the microprocessor loads the neural network program instructions for the computation fabric to its own memory. These instructions are applied by the computation fabric to input data (e.g., images, audio clips, etc.) in order to execute the neural network. The instructions include, e.g., the memory locations to which input and/or intermediate values are written, configuration data specifying how to compute specific neural network nodes, etc. Upon the input processing circuit writing input data (e.g., data captured by a sensor on a device that incorporates the IC) to the unified memory, the microprocessor provides neural network program instructions to the computation fabric. Once the final output of the neural network is computed, the fabric provides this output back to the microprocessor, so that the microprocessor (or other circuitry on the device) can evaluate this output and perform any actions based on the output.

The microprocessor executes a controller, in some embodiments, that provides the neural network program instructions to the computation fabric. Some embodiments provide these instructions to the computation fabric incrementally. For instance, in some embodiments, the system controller on the microprocessor initially loads the instructions for the first portion of the neural network (either a first layer of the network or a first portion of the first layer), then waits for a signal from the fabric indicating that these instructions have been completed. Once the first portion of the network is completed by the fabric, the system controller provides the fabric with the instructions for the second portion (either a second portion of the first layer, or the second layer of the network), and so on until the network has been fully executed. In some embodiments, the controller loads all of the weight values for the neural network into memory accessible by the computation fabric. However, for certain larger networks (e.g., large language models), the number of weights is too large for the memory to hold data for all of the weights at once. In this case, the system controller of some embodiments incrementally loads weight data into memory (i.e., by overwriting weights previously stored in memory).

As mentioned, the neural network computation fabric includes numerous cores as well as a global channel that connects the cores, with these various data processing circuits configured by a hierarchical set of control circuits. These data processing circuits operate to compute neural network operations in an efficient, low-power manner, according to the configuration data provided by the control circuits. In some embodiments, the global channel is divided conceptually into interconnected segments, with each segment corresponding to a cluster of cores.

The neural network computation circuit of some embodiments computes numerous neural network nodes simultaneously, with the computation for one node spread across multiple cores (and subsequently the global channel). That is, each of several cores of the computation fabric computes a partial dot product from a subset of the input values and weight values for the node. In some embodiments, a set of input values are used as the input to multiple nodes in a layer, so a core simultaneously computes the dot products of these input values with multiple sets of weight values. Similarly, a set of weight values (referred to as a filter, or filter slice when that filter is divided across multiple cores) are used as the weights for numerous nodes with different sets of input values, so in some embodiments the cores load sets of weight values (or encoded data representing the weight values) from memory once and then compute dot products of these weight values with numerous different sets of input values.

For a dot product computed across more than one core, these multiple cores compute partial dot products and provide these partial dot products to the global channel. In the simplest case, all of the partial dot products for a given computation node are computed in the same clock cycle and provided at the same time to the global channel. In some cases, however (e.g., for dot products with a very large number of terms), each core computes more than one partial dot product, requiring multiple clock cycles. Based on configuration data specifying which outputs from the cores are to be added together (and whether multiple partial dot products are required from the same core), the global channel aggregates these partial dot products to compute the complete dot product for each node, then applies various post-processing functions (e.g., the bias, scale, and non-linear activation functions) to compute the output of each node.

In some embodiments, each segment of the global channel includes a dot product bus, a set of post-processing circuits, and an output bus. The dot product bus, in some embodiments, includes a number of independent dot product bus lanes that each receives partial dot products from the cores, aggregates these dot products together, and provides the aggregated dot products to the post-processing circuits. In some embodiments, configuration data from the control circuitry specifies to which post-processing circuit each aggregated dot product is sent. Each lane of the dot product bus spans all of the channel segments, each of which aggregates the partial dot products from its own cores. These aggregated values are then aggregated together further by additional circuits of the dot product bus lane, and configuration data specifies whether to pass the aggregated dot products in one direction of the segment or the other, or whether that segment is the final aggregator for the dot product (in which case that aggregated dot product is provided to a post-processing circuit in that segment).

In some embodiments, each segment includes the same number of post-processing circuits as dot product bus lanes, with each post-processing circuit receiving the output of a different dot product bus lane as its primary input. The post-processing circuits for a given lane, in some embodiments, include a dot product input processing circuit, a math function input processing circuit, and a post-processing unit. In addition, for each of one or more groups of post-processing circuits per segment, the segment includes an accumulation circuit that enables accumulation of values across multiple lanes.

The dot product input processing circuits, in some embodiments, aggregate dot product values across multiple clock cycles, if needed, for certain types of dot products. The dot product input processing circuits of some embodiments each have the ability to combine dot products from two separate cycles if a dot product is too large to be computed in a single cycle across the cores of the computation fabric. In addition, if a particular filter slice needs to be split across multiple partial dot product computation circuits (because of too many non-zero weight values, as described in greater detail below), the dot product input processing circuit is configured to account for that. Furthermore, some embodiments enable the use of activation values that are double the size of the standard quantized activation for the circuit (e.g., 8-bit rather than 4-bit) by using dot products from multiple cycles and bit-shifting the first set of input data.

The post-processing units receive data from the dot product input processing circuits (or math input processing circuits, for non-convolutional layers such as pooling or element-wise operation layers) and perform the non-dot product functions of convolutional layer computation nodes. For a typical computation node of a convolutional (or fully-connected) layer, this includes a bias and/or shift factor, a scaling factor, and a non-linear activation function. In some embodiments, the outputs of the linear function are quantized or truncated to a particular number of bits (e.g., 4 or 8 bits). Using a small, fixed number of bits for the outputs of each computation node allows for (i) power and resource savings by enabling smaller computations and (ii) certainty in the scheduling of computations (i.e., by knowing that all input values will be within a particular range) that enables further power and resource savings in design.

The non-linear activation function, in some embodiments, is implemented using either a saturation circuit that clips output values (for simple activation functions such as the Rectified Linear Unit (ReLU)), a lookup table (LUT) or a configurable piecewise linear function circuit. The piecewise linear function circuit receives configuration data to specify the segments of a piecewise linear function, so that different activation functions can be configured for different layers of a network. This configuration data, in some embodiments, specifies the endpoint values of each segment so that for a given input, the piecewise linear function circuit can determine to which segment the input belongs, compute the slope between the endpoints, and use these values to calculate the output value for the given input.

The output bus carries the computation node outputs from the post-processing units back to the cores, to be stored in the memory of the cores and used as inputs for the next layer of neural network computation nodes. In some embodiments, the output values may be computed by post-processing units in one cluster but carried to a core in another cluster to be stored. For efficiency, the compiler of some embodiments (a software program that generates the configuration data for enabling the IC to execute a particular neural network) attempts to optimize the location of the post-processing unit for each computation node output relative to the cores used to compute the constituent partial dot products for that computation node and the destination core for the output value.

As mentioned, to compute output values for a set of computation nodes of a convolutional layer, the cores compute partial dot products in parallel that are provided to the dot product bus of the local channel segment. In some embodiments, the cores include memory that stores the weight values (or encoded weight data representing the weight values, also referred to as filter slice data) and input values, an input buffer into which input values are loaded for the partial dot product computations, a set of weight value buffers into which weight values (or the filter slice data representing the weight values) are loaded for the partial dot product computations, a controller or set of controller circuits for (i) writing input values and weight value data into the memory (e.g., upon receipt of the input values from the output bus as output values of a previous set of computation nodes) and (ii) loading the input values and weight value data from memory into the respective buffers, and a set of partial dot product computation circuits.

In some embodiments, the number of partial dot product computation circuits in each core is equal to (i) the number of weight value buffers in the core (or half of the number of weight value buffers, if primary and secondary buffers are used), (ii) the number of independent lanes of the dot product bus, (iii) the number of post-processing circuits of each segment of the global channel, and (iv) the number of independent lanes of the output bus. Thus, for a typical neural network computation node, the partial dot products computed by the partial dot product computation circuits having a particular index are aggregated by the dot product bus lane with the same index, that aggregated dot product is provided for post-processing to one of the post-processing units with the same index (i.e., the post-processing unit with that index in one of the channel segments), and the computation node output value generated by the post-processing unit with that index is delivered back to one of the cores via the output write bus lane with the same index.

Each core includes one input value buffer and numerous weight value buffers in some embodiments. In convolutional neural networks, a set of input values are used as the inputs to a number of different nodes, and each layer has numerous different filters (sets of weight values). For parallelization within the cores, such a set of input values are loaded into the input value buffers of the cores used to compute the dot product for a node (by computing partial dot products that are then aggregated across the cores via the dot product bus, as described above), while the weight data for each of these different nodes is loaded into the weight value buffers (for a node computed across multiple cores, the weight data for a given node is loaded into the weight value buffers with the same index in each of the cores). The partial dot product computation circuits corresponding to these weight value buffers then simultaneously compute the partial dot product computations for the loaded input values.

In some embodiments, the weight values for each layer of the network may be ternary values (e.g., each weight is either zero, a positive value, or the negation of the positive value) or quinary values (e.g., each weight is either zero, a positive value, twice the positive value, the negation of the positive value, or twice the negation of the positive value). In addition, in some embodiments at least a fixed percentage (e.g., 75%) of the weight values are equal to zero.

Using ternary weight values allows for the weights to be treated as $\{0, 1, -1\}$, with a potential multiplication by the actual positive weight value in the post-processor, such that the multiplication of each input value by its weight value can be handled with a simple circuit that avoids actual multiplier circuits. Using quinary weight values allows for the weights to be treated as $\{0, 1, 2, -1, -2\}$, again with the potential multiplication by the actual positive weight value. The remainder of the partial dot product computation in a core can then be computed with an adder tree.

Some embodiments handle quinary weights by configurably doubling each input value prior to the computation of the dot product, then using the same circuit structure as for ternary weights. Specifically, some embodiments provide each input value (after reduction of the number of input values enabled by the sparsity constraints, as described below) to a left shift circuit that doubles the input value. The input value and its double are provided to a selection circuit (e.g., a 2:1 multiplexer) that selects either the input value (if the corresponding weight value is zero, the positive value, or the negation of the positive value) or the doubled input value (if the corresponding weight value is twice the positive value or twice the negation of the positive value). The output of this multiplexer is then provided to the adder tree, which can treat all positive weight values the same and all negative weight values the same (because the difference between +1/+2 or −1/−2 has been handled by configurably doubling the input values).

The sparsity requirement allows for some embodiments to reduce the size of the partial dot product computation circuits by mapping each of a first number of input values (e.g., 128, 144) to a second number of dot product inputs (e.g., 36 or 40), such that each input value with a non-zero corresponding weight value is mapped to a different one of the dot product inputs (also referred to herein as input reduction circuits). With a guarantee of at least 75% weight sparsity (i.e., at least 75% of the weight values for any set of input values are zero), the number of dot product inputs is set at 25% (or more than 25%, for redundancy) of the number of input values provided to the partial dot product computation circuit. In some embodiments, the weight sparsity is guaranteed by the training algorithm used to train the weights to perform a specific purpose, and the neural network computation circuit is adaptable for any set of weights that meets the guarantee. In some cases, individual partial dot product computations will not meet the sparsity requirement, and other solutions (e.g., aggregating dot products across multiple filter slices or across multiple clock cycles) are used.

Specifically, in some embodiments, each partial dot product computation circuit includes at least two sets of wires for each input value, with each of the sets of wires for a given input value providing that input value to two or more different dot product inputs. That is, each input value in the input buffer is provided to two or more different dot product inputs of each partial dot product computation circuit within a core. In some embodiments, a cuckoo hashing algorithm (or other such algorithm) is used to optimally map the wires to the various dot product inputs. This algorithm, in some embodiments, computes two (or three) hashes for each input value that map into two (or three) different dot product inputs and wires each input value to these two (or three) dot product inputs. Other embodiments use other techniques to select the indices of the dot product inputs to which each input value is wired.

These input reduction circuits (which are, e.g., sub-circuit blocks of the partial dot product computation circuits) receive the input values in the input buffer (i.e., 2 or more copies of each input value) and select the specified number (e.g., 36, 40, etc.) of the input values such that each input value with a non-zero weight is selected (and thus provided to the adder tree). The weight values are known before the network is executed by the computation fabric (i.e., at compile time), and thus the compiler can determine which of the two (or three) multiplexers that receive each input value with a non-zero corresponding weight at runtime will select that input value, such that each such input value is selected by exactly one multiplexer. In some embodiments, the compiler uses the same cuckoo hashing algorithm for this mapping as was used to determine the wiring. Specifically, for each filter slice in a core, the compiler of some embodiments assigns each input value with a non-zero corresponding weight value to one of the input reduction circuits that receives the input value. However, if a first input value with a nonzero corresponding weight is assigned to an input reduction circuit that already has a second input value with a nonzero corresponding weight assigned, then the second input value is assigned to its second (or third, if necessary) input reduction circuit. If this new mapping conflicts with the assignment of a third input value with a nonzero corresponding weight, then the third input value is assigned to another of its input reduction circuits, and so on.

In some embodiments, the input reduction circuits for a particular filter slice use a number of multiplexers (e.g., 40 8:1 multiplexers) that perform the selection. Each multiplexer selects one of the input values that is passed to adder tree. In some embodiments, the data specifying which of the input values each multiplexer selects for a given filter slice (at least for each multiplexer configured to select an input value having a non-zero corresponding weight value), is stored as encoded weight value data.

Some embodiments expand the input reduction circuits in order to accommodate larger input values (e.g., twice the size of the normal quantized input values). For instance, in some embodiments, the input reduction circuits are designed to be able to handle both 4-bit input values and 8-bit input values (accepting half of the number of 8-bit values as 4-bit values). To accommodate the larger input values in a single pass, some embodiments split the input reduction circuit and adder trees and then configurably multiply the output of one of the adder trees by a constant value (e.g., multiply by 16 if using 8-bit values instead of 4-bit values).

The input values are stored in such a way that when the smaller (e.g., 4-bit) values are loaded into the input buffer in a core, each input buffer slot holds a single input value. When the larger (e.g., 8-bit) values are loaded into the input buffer, each input buffer slot holds either the most significant half of an input value or the least significant half, with the slots alternating (e.g., the even slots holding the least significant bits and odd slots holding the most significant bits or vice versa). Thus, all of the even input buffer slots are wired to provide their input values to one half of the input reduction circuits while the odd input buffer slots provide their input values to the other half of the input reduction circuits (using the same wiring pattern for each half). Each half of the input reduction circuits selects the same halves of the input values for large input values (i.e., if the most significant bits of an input value are selected by a particular multiplexer in one half of the input reduction circuits, then the corresponding multiplexer in the other half selects the least significant bits of the same input value). The least significant bits and most significant bits are then added separately (using the same ternarized or quantized weight values as described above), and the sum of the most significant bits is multiplied by the constant value (e.g., 16).

This structure, while beneficial for the larger input values, would on its own constrain the selection of the smaller input values. Wiring, e.g., 128 input values into 40 8:1 multiplexers provides greater flexibility for the compiler to successfully identify a set of selections that ensures all of the input values with non-zero corresponding weights can be selected than wiring two separate groups of 64 input values into separate groups of 20 8:1 multiplexers. As such, some embodiments include a set of selection circuits that enable different wiring for larger input values and smaller input values. These selection circuits are shared between the different filter slices in a core, as the wiring is the same for each filter slice (the selection data, however, differs for each filter slice depending on its weight values). The selection circuits ensure that for larger input values each half of the input reduction circuits receives only data from the odd input buffer slots or only data from the even input buffer slots, whereas for smaller input values the data from even and odd input buffer slots is provided to multiplexers in both halves of the input reduction circuits.

Some embodiments also enable configurable swapping of input values between neighboring input reduction circuits (i.e., between neighboring multiplexers selecting the input values for a single filter slice). As described, each input reduction circuit (e.g., each 8:1 multiplexer) receives a group of input values (with each input value being provided to multiple input reduction circuits) and selects one input value from the received group to provide to the adder tree. In some embodiments, each input reduction circuit includes multiple multiplexers, rather than a simple 8:1 multiplexer, to enable the swaps of input values. This configurable swapping of input values increases the likelihood that all input values with non-zero corresponding weight values of a filter slice can be passed through to the adder circuit, irrespective of the location of the non-zero values in the input buffer (which depends on the location of the input values in the input channel).

To implement the configurable swapping of input values, some embodiments divide each group of input values into two halves (e.g., two subgroups of 4 input values for a group of 8 input values). From each of these halves, the input reduction circuit selects one of the input values (e.g., using two 4:1 multiplexers). For each pair of input reduction circuits, one of the selected values from each input reduction circuit is provided to selection circuits (swap circuits) within both of the input reduction circuits. Each of these swap circuits (e.g., 2:1 multiplexers) is configured to select either the input value from its own group of input values or from the neighboring input reduction circuit's group. Finally, an additional selection circuit (e.g., another 2:1 multiplexer) selects either (i) the input value selected for one of the subgroups of the input reduction circuit that was not provided to the swap circuits or (ii) the input value from the swap circuit of that input reduction circuit. While still providing the same number of input values to the adder tree (i.e., one value per input reduction circuit), the use of the swap circuits enables selection of two input values from two groups of input values (e.g., two from a group of 16 input values) rather than requiring one value from each of the two groups.

Some embodiments implement the swap using a single bit that is provided to each of the swap circuits for a given filter slice. Using this single bit (which requires the storage of one bit per filter slice in the encoded weight data) provides for, effectively, two available wirings of the input values to the input reduction circuits.

Other embodiments, however, implement the swaps using a single bit for each pair of input reduction circuits, such that each pair of input reduction circuits can swap input values configurably. Thus, for a group of 40 input reduction circuits (20 pairs), 20 bits are used. For the larger (e.g., 8-bit) input values, each half of the input reduction circuits for a filter slice needs to receive the same swap values (i.e., if the most significant bits of an input value are swapped to a different input reduction circuit, then the least significant bits should also be swapped in the other half of the input reduction circuit set so that the two halves of the input value remain aligned). In this case, half the number of bits is needed.

In either case, rather than store the swap bits for each filter slice, some embodiments define a lookup table that is shared across all of the filter slices for a layer (or portion of a layer that is executed simultaneously, referred to as a pass). The lookup table stores the swap bits for a limited number (e.g., 4, 8, 12) of swap configurations, and the encoded weight data for each filter slice stores a set of bits to select one of these swap configurations (e.g., 3 bits to select between 8 swap configurations). In some embodiments, the swap configurations stored in the lookup table are fixed for the entire network, while in other embodiments new swap configurations can be loaded for each group of filters. In some such embodiments, the compiler identifies the optimal group of swap configurations such that the input reduction circuits for each filter slice in a group of filters can pass all of the input values with non-zero corresponding weight values to their respective adder circuits using one of the swap configurations.

The use of small amounts of data for the weights (e.g., less than 1 bit per weight of the neural network in some cases)

and consistently-sized (e.g., 4-bit or 8-bit) input values allows for optimizing the storage of these values in the core memories. In some embodiments, the weight and input values are aligned both within a core and between cores in such a way as to optimize (i) the efficient retrieval and usage of these values to compute the dot products of the neural network computation nodes and (ii) the minimization of the configuration instructions that the controller circuit hierarchy sends to the core controllers in order to execute this retrieval and usage of the values.

The compiler of some embodiments determines the storage location of each of the weight and input values according to sets of rules defined for how these values should be aligned in the memory. In some embodiments, the weight data for all layers of the neural network are stored in the memory at startup (boot time) of the IC (as the weight values are the same for all inputs processed by the neural network), whereas the input values are determined (and stored) during runtime (these values are different for each input processed by the neural network). However, for certain neural networks (e.g., large language models (LLMs)), the large number of weights (even after quantization and sparsification) means that the fabric memory cannot hold all of the weight data at once. In this case, some embodiments load a first set of encoded weight data (i.e., weight data for the first layer or several layers of the network) into the memory at bootup, but then overwrite this weight data with the weight data for later layers during execution of the network. In this case, each execution of the network (e.g., for each subsequent token in the case of an LLM) requires weight values to be loaded prior to execution of the network as well as during runtime.

Each core of the neural network computation fabric of some embodiments includes the same circuit structure, including the same amount of memory (e.g., random access memory). In each core, this memory is divided between weight memory and activation memory. The weight memory partition is typically larger than the activation memory partition because the weight memory stores data for all of the weights for the network (or as much as will fit at one time for larger networks) whereas the activation memory only stores the input/output values for a small number of layers at a time. In some embodiments, at least two layers of activations are stored at a time (i.e., the inputs for a current layer as well as the outputs for that layer, which are the inputs to the next layer). Because some layers have too many filters for the entire layer to be computed in a single pass, the input activation values for that layer cannot be overwritten immediately by the output activation values for that layer (as these inputs will be needed for second/third/etc. passes to generate additional output activation values for the layer).

In some embodiments, the compiler determines how many and which cores store the activation values for each layer of the network. The cores that store the input values for a layer are referred to as "source cores" for the layer and the cores to which the output values for the layer are written are referred to as the "destination cores" for the layer (these are then the source cores for the next layer). In general, the compiler will select cores within the same cluster before expanding to additional clusters (i.e., if only four source cores are to be used, the compiler will choose a single cluster rather than two cores of one cluster and two cores of a second cluster). Irrespective of the number of source cores used for a layer, in some embodiments the activation values are aligned across cores, with the same memory locations used in each source core to store the input activation values for the layer. Depending on the structure of the input activation values for a layer, the number of input activation values stored in each core may differ slightly. However, some embodiments always start the input activation values for a layer at the same memory location in each source core and use zero-padding in the source cores with fewer activation values.

For convolutional neural networks, the input activation values for each layer (or at least each convolutional layer) are conceptually represented as a three-dimensional array. This three-dimensional array is structured as numerous two-dimensional grids (referred to as input channels). For instance, the initial input for an image is three two-dimensional pixel grids (e.g., a 1280×720 RGB image will have three 1280×720 input channels, one for each of the red, green, and blue channels). The number of input channels for each subsequent layer is determined by the number of filters used in the previous layer (assuming standard convolutional layers). The size of the channels for the subsequent layer depends on the number of computation nodes in the previous layer, which is based on the size of the filters and how those filters are convolved over the previous layer input activations.

For a typical convolutional layer, each filter is a small kernel of weights (often 3×3 or 5×5) with a depth equal to the number of input channels of the layer. The dot product for each computation node of the layer multiplies the weights of a filter by a subset of the coordinates of the input activation values. For example, the input activations for a 3×3×Z filter are the activation values located at the same 3×3 square of all Z input activation grids for a layer.

To optimize the dot product computations, all of the input activations for a single channel are stored in the same source core, and the total number of channels is divided evenly across the source cores (i.e., if there are Q source cores, then each source core stores the activations of 1/Q of the grids). If the number of input channels is not evenly divisible by the number of source cores, then some embodiments use channels of zeros to even out the number of activations in each core.

These activations within a core are not necessarily arranged with all of the activation values of a grid stored contiguously. Instead, within each core, some embodiments store all of the activations for a particular coordinate (i.e., an x-y coordinate) within the grids assigned to that core contiguously. That is, each activation has an x-coordinate, y-coordinate, and z-coordinate in the three-dimensional array, with the z-coordinate indicating the channel to which the activation belongs. Thus, in some embodiments, the activation memory for a layer in a particular core starts with the activations at (0,0) for all of the input channels assigned to that core. In some embodiments, if there are more channels assigned to a core than the number of activation values that a memory location (i.e., a RAM word) can store, then these activation values are split up into separate sets of activations, and only a single memory location worth of activation values at the same coordinate are stored contiguously. As a result, a given memory location in one source core for a layer will store activations for the same x-y coordinates as that memory location in any of the other source cores.

As mentioned, the memory in the cores is divided into weight data storage and input value storage. In some embodiments, the weight data is stored in an encoded form that minimizes the amount of data required to store the weights (in some cases, less than 1 bit is required per neural network weight). Whereas the input data uses a fixed number of bits per value (e.g., 4 bits or 8 bits), the amount of memory required for a given number of weights is variable in some embodiments, depending on the number of non-zero weight values (with non-zero weight values requiring more data than weight values equal to zero).

Specifically, some embodiments store each layer of weight data (within a core) in a block organized by filter. An initial header, in some embodiments, specifies whether the activations for the layer are smaller (e.g., 4-bit) or larger (e.g., 8-bit), as this determines both (i) which wiring is used between the input buffer and the input reduction circuits and (ii) whether the same selection is made for the two halves of each input reduction circuit set. In addition, this initial header specifies whether quinary weights are used, as if the weights for a layer are entirely ternary then no additional data needs to be stored for the ternary weights.

Within a sub-block allocated to a particular filter, some embodiments store a filter identifier section, a non-zero weight map section, and an additional weight data section. The filter identifier section and non-zero weight map section of each filter block have a fixed width, while the additional weight data section of some embodiments is variable depending on the number of non-zero weights in the filter. Weight decoding circuitry in the core reads this weight data from memory, decodes the weight data, and stores the decoded weight data in the filter slice buffers.

As described above, each of the filter slice buffers within a core has an index corresponding to a partial dot product computation circuit in that core, a dot product bus lane, and a post-processing unit in each of the channel segments. The slice identifier section of a filter slice data block identifies (i) the index of the filter slice buffer into which the decoded data of the block should be loaded and (ii) whether this data is loaded into the primary or secondary filter slice buffer with that index (or both).

In some embodiments, the non-zero weight map section of a filter slice block within the weight data includes one bit for each of these input reduction circuits, indicating whether or not the input reduction circuit is receiving (and passing through to the corresponding adder tree) an input with a non-zero corresponding weight value. As such, the filter slice identifier section and the non-zero weight map section have a fixed width that depends on the number of input reduction circuits. In some embodiments, when handling larger (e.g., 8-bit) activations that require the same values to be passed to both halves of the set of input reduction circuits, the non-zero weight map includes half the number of bits, as the data can be replicated for the other half of the input reduction circuit set. In some embodiments, a bit in an overall filter header specifies whether data for a set of filters should be replicated based on the use of larger activations.

The additional weight data section of a filter slice block, in some embodiments, only stores additional data for the non-zero weights. This data includes (i) a bit indicating whether the weight is positive or negative, (ii) a bit indicating whether the weight should be doubled (in some embodiments, this is only present when the weights for the layer are identified as quinary), and (iii) select bits for the corresponding input reduction circuit. The select bits specify which of the input values received by that input reduction circuit is passed through to the adder tree, while the positive/negative bit indicates whether or not to negate that input value. Because this additional weight data is only stored for the non-zero weight values, the first set of additional weight data (e.g., the first 4 bits) could correspond to any of the input reduction circuits.

The filter slice buffers of some embodiments store a full set of weight data (e.g., a non-zero map bit, a positive/negative bit, a doubling (left shift) bit (if using quinary weights), and multiplexer select bits) for each of the input reduction circuits, irrespective of whether that input reduction circuit receives an input with a non-zero corresponding weight or not (this still reduces the amount of weight data, from data for every weight in a filter to data for only approximately one-fourth of the weights in the filter). As such, decoding circuitry is used to expand the limited stored weight data into a full set of weight data for each input multiplexer.

This decoder, in some embodiments, (i) aligns the stored additional weight data correctly in the filter slice buffer for the non-zero weights and (ii) fills in additional weight data for the zero-value weights. The non-zero weight map indicates the correct alignment of the stored additional weight data, and the bits of the non-zero weight map are also stored alongside this additional data within the filter slice buffer. In some embodiments, the decoder also uses the non-zero weight map to determine the location of the next filter slice block within the core memory (because the non-zero weight map specifies the amount of additional weight data for the current filter slice block).

As described, a portion of the weight data is used by the reduction circuits to select inputs with non-zero corresponding weight values. These input values are then configurably doubled (for quinary weights) and passed to ternary multiply-accumulate (MAC) circuits in some embodiments, which are used as the leaves of the adder tree that performs the dot product computation. In some embodiments, the ternary MAC circuits (or other circuit used to incorporate the ternary and/or quinary weight values into the dot product) uses the two's complement technique to negate input values with a negative corresponding weight value. This technique inverts all of the bits of the input value and adds 1 to this inverted value. However, the use of this technique requires a half adder circuit for each ternary MAC circuit, in order to add 1 to the inverted value. In order to save additional circuit space, some embodiments determine (at compile time) the number of negative weight values for each dot product computation and add this number to the dot product at the end of the computation. Thus, rather than a half adder circuit for each pair of input values, a single adder circuit is used after the adder tree to add this number to the dot product. The neural networks of some embodiments also include a bias factor that is added to the dot product anyway, so this number can be added to the bias with minimal cost in terms of circuit surface area. For each input value, the resulting inputs to the adder tree effectively pass (i) the value zero if the corresponding weight value is zero, (ii) the input value if the corresponding weight value is positive, and (iii) the binary inversion of the input value if the corresponding weight value is negative (with input values having been doubled prior to the ternary MAC circuits if needed for quinary weight values). The non-zero map bit (indicating whether a weight value is zero or non-zero) and the positive/negative bit (indicating whether a non-zero weight value is positive or negative) are used as inputs to the ternary MAC circuit in some embodiments. Specifically, the non-zero map bit specifies whether or not to pass the value zero rather than the actual input (or inverted input), while the positive/negative bit specifies whether to pass the binary inversion.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Some embodiments provide an integrated circuit (IC) for implementing a machine-trained network (e.g., a neural network). The IC of some embodiments includes a set of input processing circuits that prepares input data for the neural network, a neural network computation fabric (also referred to as a neural network inference circuit or a neural network hardware accelerator) that can be configured to apply a neural network to a set of input data, a microprocessor circuit (e.g., a CPU) that controls the input processing circuits and configures the neural network computation fabric according to neural network program instructions, and a unified memory that is accessible by the input processing circuits, neural network computation fabric, and microprocessor circuit. The neural network computation fabric of some embodiments includes (i) a set of cores that compute dot products of input values (also referred to as activation values) and corresponding weight values and (ii) a channel that aggregates these dot products and performs post-processing operations (as well as other operations for different types of computation), in order to compute the outputs of neural network computation nodes.

Figure 1:
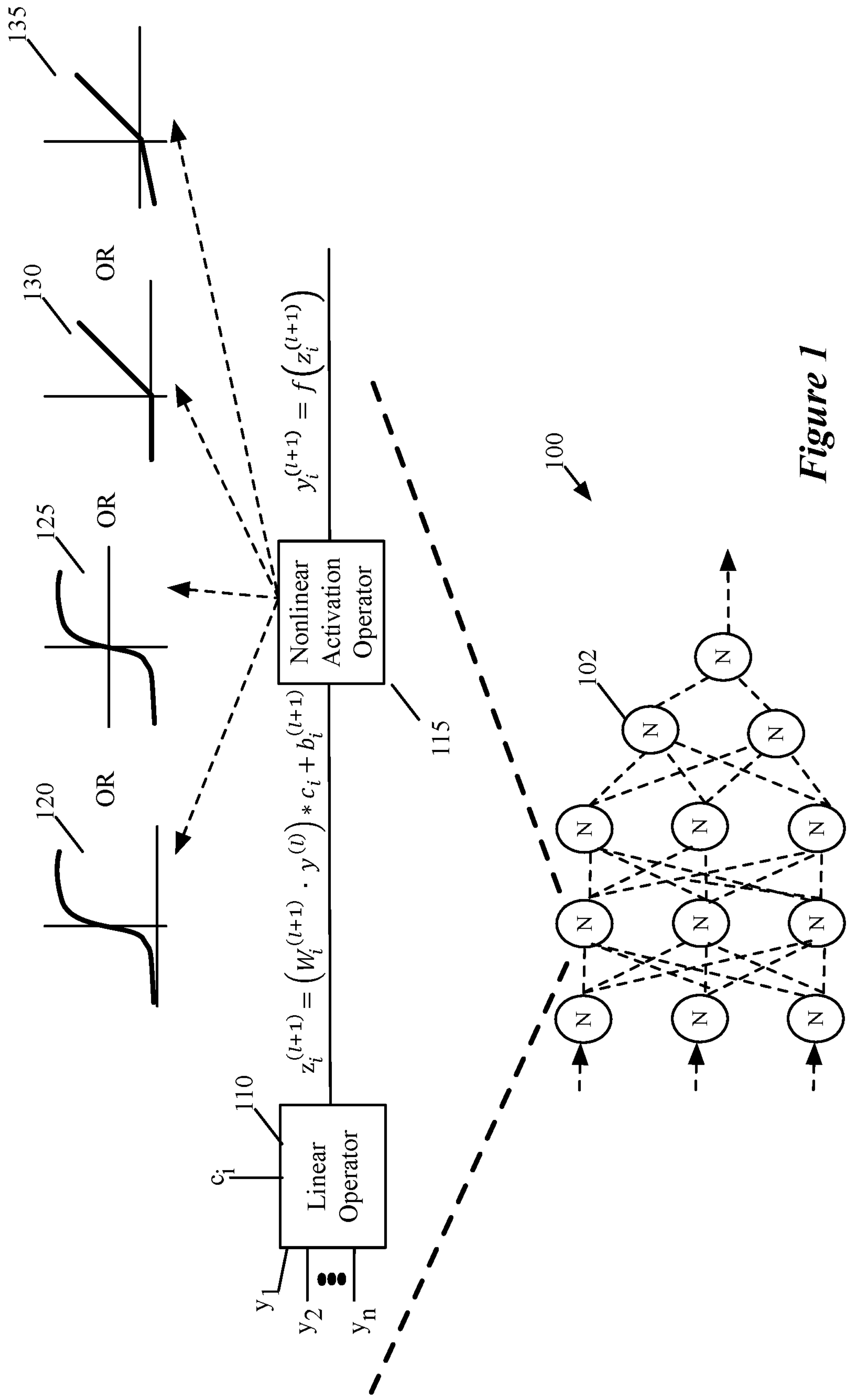
FIG. 1 illustrates an example of a multi-layer machine-trained network of some embodiments.

FIG. 1 illustrates an example of a multi-layer machine-trained network of some embodiments. This figure illustrates a feed-forward neural network 100 that has multiple layers of processing nodes 102 (also called neurons). In all but the first (input) and last (output) layer, each node 102 receives two or more outputs of nodes from earlier processing node layers and provides its output to one or more nodes in subsequent layers. The output of the node (or nodes) in the last layer represents the output of the network 100. In different embodiments, the output of the network 100 is a number in a range of values (e.g., 0 to 1), a vector representing a point in an N-dimensional space (e.g., a 128-dimensional vector), or a value representing one of a predefined set of categories (e.g., for a network that classifies each input into one of eight possible outputs, the output could be a three-bit value).

In this example, the neural network 100 only has one output node. Other neural networks of other embodiments have several output nodes that provide more than one output value. Furthermore, while the network 100 includes only a few nodes 102 per layer, a typical neural network may include a varying number of nodes per layer (with some layers having several thousand nodes) and significantly more layers than shown (e.g., several dozen layers). In addition, the neural networks of other embodiments may be types of networks other than feed forward networks (e.g., recurrent networks, regulatory feedback networks, radial basis function networks, etc.).

The illustrated network 100 is a fully-connected network in which each node in a particular layer receives as inputs all of the outputs from the previous layer. However, as mentioned, the neural networks of some embodiments are convolutional feed-forward neural networks. In this case, the intermediate layers (referred to as "hidden" layers) may include convolutional layers, pooling layers, element-wise operation layers, fully-connected layers, and/or normalization layers. The convolutional layers of some embodiments use a small kernel (e.g., 2×2, 3×3, 5×5, etc.) to process blocks of input values (output values from a previous layer) in a set of two-dimensional grids (e.g., channels of pixels of an image, input feature maps) with the same set of parameters. The kernels (also referred to as filters) are three-dimensional, and multiple kernels are used to process each group of input values in a layer (resulting in a set of three-dimensional output grids, also referred to as output feature maps). Pooling layers combine clusters of outputs from one layer into a single node at the next layer, as part of the process of reducing an image (which may have a large number of pixels) or other input item down to a smaller size (e.g., a vector output). In some embodiments, pooling layers can use max pooling (in which the maximum value among the clusters of node outputs is selected) or average pooling (in which the clusters of node outputs are averaged).

Figure 2:
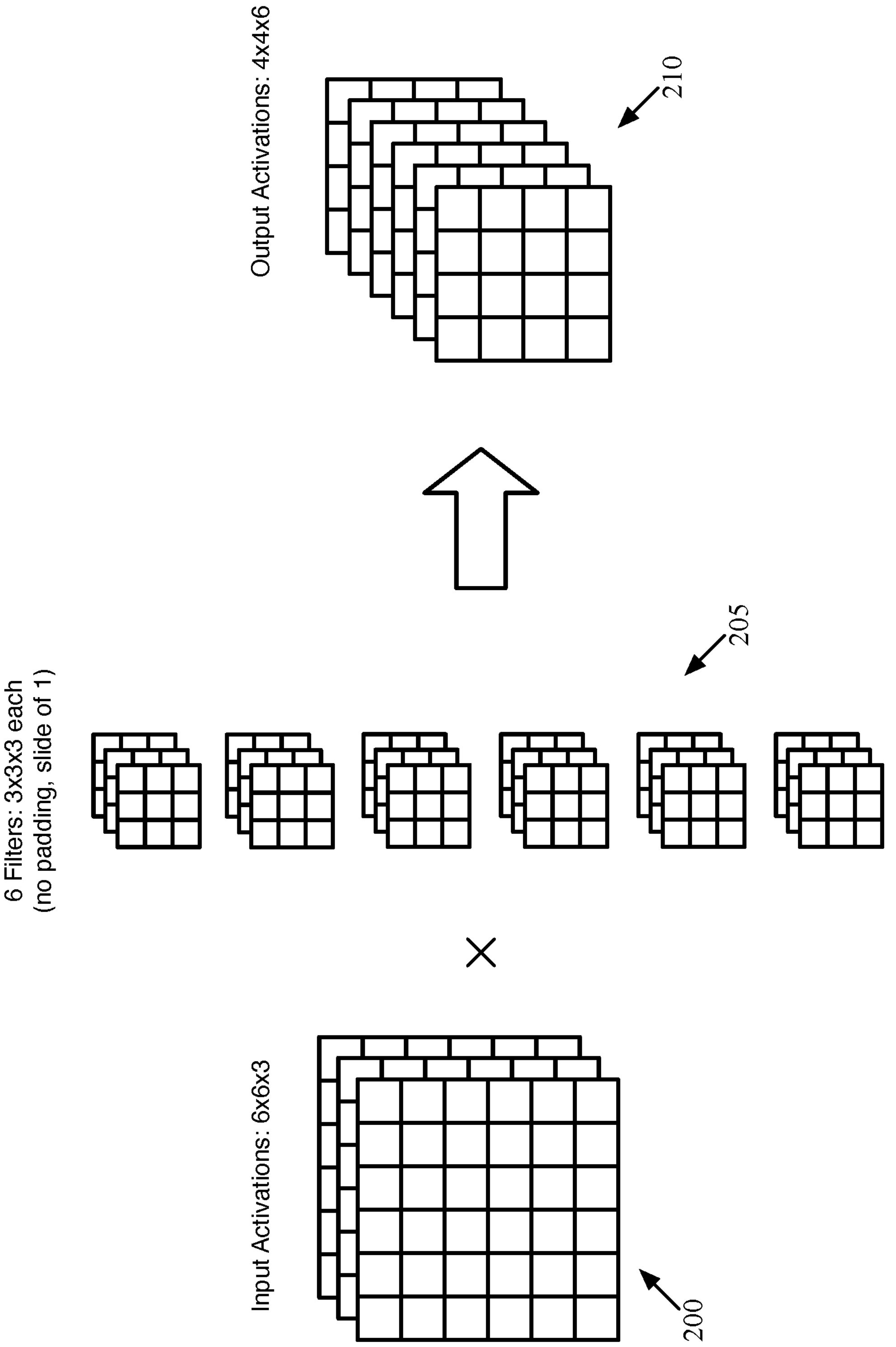
FIG. 2 conceptually illustrates a representation of a convolutional layer of a convolutional neural network.

FIG. 2 conceptually illustrates a representation of a convolutional layer of a convolutional neural network. The convolutional layer receives a set of input activation values 200 organized as a three-dimensional array. This three-dimensional array is typically either (i) a set of input values for the network, if the convolutional layer is the first layer of the network, or (ii) a set of output values of a previous layer of the network (e.g., a previous convolutional layer, a pooling layer, etc.). The array can be conceptualized as a set of two-dimensional grids, also referred to as input feature maps or input channels for the layer, as shown in the figure. In this example, the dimensions of the input values are 6×6×3 (i.e., three 6×6 input channels).

Each computation node of the convolutional layer involves a linear component (e.g., a dot product followed by scaling and bias functions) as well as a non-linear component, as further described below. The input to each computation node is a subset of the input activation values, and the dot product for the computation node involves multiplying those input activation values by the weights that make up one of the filters of the layer. As shown, in this example the layer includes six filters 205, each of which is 3×3×3. Each value in one of the filters is a trained weight value. Thus, in the example shown in this figure, each filter includes 27 weight values.

The size of the filters in the x and y directions can vary (3×3 and 5×5 are common sizes), but in some embodiments the depth is required to match the depth of the input activations (in this case there are three input channels, so the depth is three). The number of filters in a given layer can also vary—as a general concept, each filter is attempting to identify the presence or extent of a particular feature in the input feature maps. For instance, in image analysis, a filter in an early layer might test for the presence of an edge in a particular direction while a filter in a later layer tests for the presence of a more specific object type in the image (e.g., a nose).

To generate the output activations, each of the filters 205 is applied to numerous subsets of the input activation values 200. Specifically, in a typical convolution layer, each 3×3×3 filter is moved across the three-dimensional array of activation values, and the dot product between the 27 activations in the current subset and the 27 weight values in the filter is computed. This process starts in the top left corner (e.g., x=0-2, y=0-2) of the grid, and includes the full depth of the array. The filter moves across the rows, in this case using a slide of 1 (i.e., moving one column per computation node, such that the second dot product uses activations at x=1-3, y=0-2). When the end of a row is reached, the filter is moved back to the first columns (i.e., x=0-2) and down one row (i.e., y=1-3), and so on until the bottom right corner of the array is reached. Though not the case in this example, some embodiments use zero-padding at the edges of the grids (e.g., to allow for better detection of features at the edges of images).

The output activation values 210 are arranged in a 4×4×6 array in this example. The outputs from a single filter are arranged in a single grid (also referred to as an output feature map or output channel), and because the example has six filters 205, the output activations have six output feature maps. Using a slide value of 1 with no zero-padding results in a 4×4 output feature map for each filter. These output activation values 210 are then the input activation values for the next layer of the neural network.

As shown in FIG. 1, each node in the neural network 100 has a linear component 110 and a nonlinear component 115. The linear component 110 of each hidden or output node in this example computes a dot product of a vector of weight coefficients and a vector of output values of prior nodes (i.e., as described above for convolutional layers), multiplies this by a scaling value (which may be set to 1), and adds an offset. In other words, in a convolutional or fully-connected layer, a node's linear operator computes a scaled weighted sum of its inputs (which are outputs of the previous layer of nodes) plus an offset (also referred to as a bias). Similarly, the linear component 110 of each input node of some embodiments computes a dot product of a vector of weight coefficients and a vector of input values, scales this dot product, and adds an offset. In other embodiments, each input node receives a single input and passes that input as its output. Each node's nonlinear component 115 computes a function based on the output of the node's linear component 110. This function is commonly referred to as the activation function, and the outputs of the node (which are then used as inputs to the next layer of nodes) are referred to as activations.

The notation of FIG. 1 can be described as follows. Consider a neural network with L hidden layers (i.e., L layers that are not the input layer or the output layer). The variable/can be any of the hidden layers (i.e., $l \in \{1, \ldots,$ L−1} index the hidden layers of the network, with l=0 representing the input layer and l=L representing the output layer). The variable $$z_i^{(l+1)}$$

represents the output of the linear component of a hidden node i in layer l+1. As indicated by the following Equation (A), the variable $$z_i^{(l+1)}$$

is computed as the dot product of a vector of weight values $$W_i^{(l+1)}$$

and a vector of outputs $y^{(l)}$ from layer l multiplied by a constant value $c_i$, and offset by a bias value $$b_i^{(l+1)}:$$

$$z_i^{(l+1)} = \left(W_i^{(l+1)} \cdot y^{(l)}\right) * c_i + b_i^{(l+1)} = \sum_{k=1}^{n} \left(w_{ik}^{(l+1)} * y_k^{(l)}\right) * c_i + b_i^{(l+1)}. \quad \text{(A)}$$

The scaling value $c_i$ is a value to which all the weight values for the node are normalized. In some embodiments, the scaling value $c_i$ is 1. The symbol * is an element-wise product, while the symbol · is the dot product. The weight coefficients $W^{(l)}$ are parameters that are adjusted during the network's training in order to configure the network to solve a particular problem (e.g., object or face recognition in images, voice analysis in audio, depth analysis in images, etc.). In some embodiments, the training algorithm imposes certain constraints on the weight values. Specifically, some embodiments impose a ternary constraint that requires all of the weight values for any given layer to be either zero, a positive value, or a negation of the positive value (e.g., 0, 1, and −1). In addition, some embodiments require that at least a threshold percentage of the weight values (for a given layer or for the entire network) are equal to zero (e.g., 75%, 80%, etc.).

The output $y^{(l+1)}$ of the nonlinear component 115 of a node in layer l+1 is a function of the node's linear component, and can be expressed as by Equation (B) below:

$$y_i^{(l+1)} = f\left(z_i^{(l+1)}\right). \quad \text{(B)}$$

In this equation, $f$ is the nonlinear activation function for node i. Examples of such activation functions include a sigmoid function 120 ($f(x)=1/(1+e^{-x})$), a tan h function 125, a ReLU (rectified linear unit) function 130, or a leaky ReLU function 135, as shown.

Traditionally, the sigmoid function and the tan h function have been the activation functions of choice. More recently, the ReLU function ($f(x)=\max(0, x)$) has been proposed for the activation function in order to make it easier to compute the activation function. See Nair, Vinod and Hinton, Geoffrey E., "Rectified linear units improve restricted Boltzmann machines," ICML, pp. 807-814, 2010. Even more recently, the leaky ReLU has been proposed in order to simplify the training of the processing nodes by replacing the flat section (i.e., x<0) of the ReLU function with a section that has a slight slope. See He, Kaiming, Zhang, Xiangyu, Ren, Shaoqing, and Sun, Jian, "Delving deep into rectifiers: Surpassing human-level performance on imagenet classification," arXiv preprint arXiv:1502.01852, 2015. In some embodiments, the activation functions can be other types of functions, like cup functions, periodic functions, piecewise linear functions, etc.

Equation (B) can be expressed in the following expanded format of Equation (C):

$$y_i^{(l+1)} = f\left(z_i^{(l+1)}\right) = f\left[\left(\sum_{k=1}^{n} w_{ik} * y_k\right) * c_i + b_i^{(l+1)}\right]. \quad \text{(C)}$$

In this equation, $w_{ik}$ are weight values associated with the inputs $y_k$ of the node i in layer l+1.

Before a multi-layer network (e.g., a convolutional neural network) can be used to solve a particular problem, the network is put through a supervised training process that adjusts the network's configurable parameters (e.g., the weight values, biases, etc.). The training process iteratively selects different input value sets with known output value sets. For each selected input value set, the training process typically (1) forward propagates the input value set through the network's nodes to produce a computed output value set and then (2) backpropagates a gradient (rate of change) of a loss function (output error) that quantifies in a particular way the difference between the input set's known output value set and the input set's computed output value set, in order to adjust the network's configurable parameters (e.g., the weight values). In addition, some embodiments quantize the network (constraining the weight values to sets of allowed values and/or accounting for quantization of output values to a certain number of bits) and use various techniques, such as the alternating direction method of multipliers (ADMM), to train the quantized weight values and ensure that at least a threshold percentage of the weight values are set to zero.

In some embodiments, the weight values and/or activation values within the network are quantized for use on a particular device. Specifically, some embodiments quantize activation values to a particular number of bits (e.g., 4 bits) during the execution of the network. For weight values, some embodiments use binary, ternary, or quinary weight values. Binary weight values are typically trained such that each weight is either 0 or 1, ternary weight values are typically trained such that each weight value is one of the set {0, 1, −1}, and quinary weight values are typically trained such that each weight value is one of the set {0, 1, −1, 2, −2}. In any of these quantization cases, the weight values may be multiplied by a scale value determined for a layer or channel. To save memory, some embodiments train the networks to be extremely sparse, with a large majority (e.g., 85%, 90%) of the weights set to 0 (rather than 1 or −1). In some such embodiments, the weights are stored on the device (e.g., in the memory of a neural network inference circuit embedded in the device) in an encoded manner such that zero-value weights require less memory than non-zero weights. These networks can still be very predictive, but at the margins decreasing sparsity (e.g., from 90% to 85%) improves prediction accuracy.

Such a neural network inference circuit is part of an integrated circuit (IC) in some embodiments. The ICs of some embodiments are configurable to implement different networks trained to perform a particular function, and such networks may include replicated layers (trained with quantization). For instance, the ICs may implement networks for object or facial recognition in images, voice recognition in audio samples, etc. The IC of some embodiments includes a set of input processing circuits, a neural network computation fabric that can be configured to apply a neural network to an input, a microprocessor (e.g., for controlling the input processing circuits and configuring the neural network computation fabric), and a unified memory that is accessible by all of these circuits.

Figure 3:
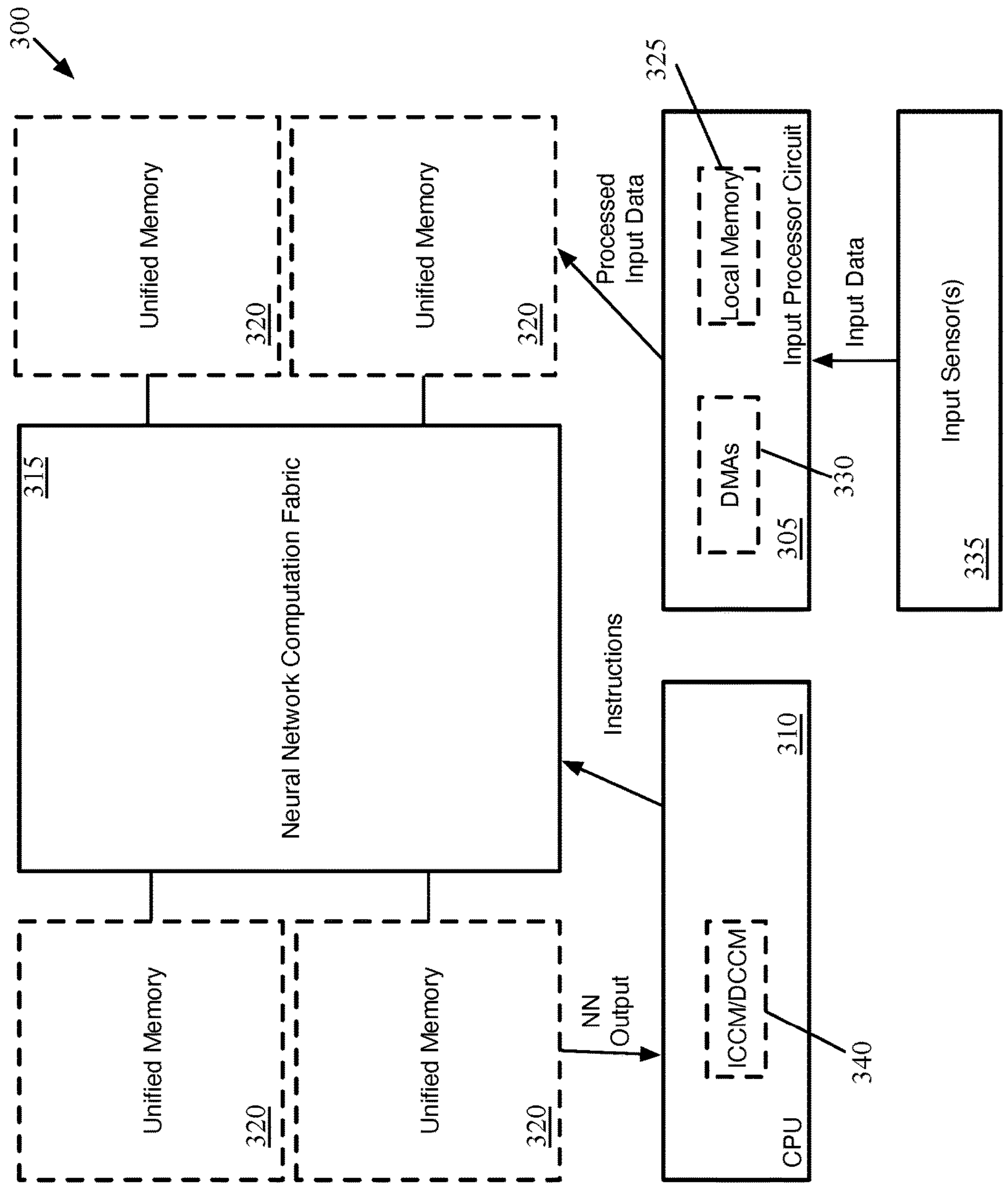
FIG. 3 conceptually illustrates an integrated circuit of some embodiments.

FIG. 3 conceptually illustrates such an IC 300 of some embodiments. As shown, the IC includes an input processor circuit 305, a microprocessor (CPU) 310, a neural network computation fabric 315, and a set of unified memory 320. In addition, the input processor circuit 305 includes local memories 325 (e.g., a small amount of memory for input processing instructions) and direct memory accesses 330 (which enable the input processing circuit 305 to access the unified memory 320 without CPU involvement). The CPU 310 includes closely coupled memory 340 for instruction (ICCM) and data (DCCM) which can be used for booting up the IC (e.g., boot loaders and/or firmware are loaded out of read-only memory (not shown) into the ICCM and/or DCCM), as well as typical components for accessing the unified memory.

The unified memory 320, as mentioned, is shared by the CPU 310, the input processor circuit 305, and the neural network computation fabric 315. This unified memory 320 is shown in four blocks in this figure; as described below, in some embodiments the neural network computation fabric includes multiple cores that each access their own respective portions of the unified memory. In some embodiments, the unified memory 320 is made up of banks of static random-access memories (SRAMs). In addition, the unified memory includes multiple interfaces for the different circuits 305-315 to access the memory for read/write operations. In some embodiments, the unified memory includes direct access ports for the cores of the computation fabric 315 to access their associated memory banks, as well as a separate interface for enabling the CPU 310 and input processor circuit 305 to access all of the memory banks.

In some embodiments, the IC is integrated into a device (such as an Internet of Things (IOT) device) with one or more input sensors 335. These input sensors can include cameras (e.g., for capturing video images on which the neural network computation fabric 315 performs face or object recognition, etc.), microphones (e.g., for capturing audio on which the neural network computation fabric 315 performs voice recognition, speech processing, etc.), or other types of input sensors. In other embodiments, the input sensors 335 are located on a separate device that is linked with the IC 300.

In some embodiments, at bootup of the IC 300, the firmware loads a neural network program object. This causes the CPU 310 to load neural network configuration data (e.g., weight values, scale and bias parameters, lookup table masks for each layer, memory locations for the weight and input values to use for computing each layer of the network, etc.) from off-chip storage and to store weight values and instruction arguments to the unified memory 320. In different embodiments, the weight values (or a subset of the weight values) and/or instruction arguments may be stored in the unified memory 320 by the CPU 310 directly or by the CPU 310 generating instructions for the neural network computation fabric 315 to write this data (the weight values and/or instruction arguments) to the unified memory 320. Some embodiments, rather than storing instruction arguments in the unified memory 320, instead use a specific memory local to the computation fabric 315 to store instruction arguments. However, the benefit of using the unified memory 320 for this purpose is that doing so allows for larger networks (e.g., with more layers that would require more instruction arguments).

In addition, the CPU 310 loads the neural network program instructions for the computation fabric to its own memory. These instructions are applied by the computation fabric 315 to input data in order to execute the neural network. These runtime instructions include, e.g., indications as to which pre-loaded sets of instruction arguments to use for each set of calculations, etc.

The input processor circuit 305 receives input data (e.g., still images or video frames, sounds, etc.) from the input sensor(s) 335, and processes these according to processing instructions received from the CPU 310 or stored in local memory 325. These instructions identify, in some embodiments, any sort of initial processing to apply to the raw data (e.g., decompression of compressed data, etc.), if any, as well as how to store the input data in the unified memory 320 to be read by the computation fabric 315. Because the input processor circuit 305 and the computation fabric 315 share the unified memory 320, the input data does not need to be copied from one circuit's local memory to another. Instead, the input processor circuit 305 stores an input once into the unified memory 320 and the computation fabric 315 reads the input from the same location in the unified memory 320. For an image, e.g., the storage instructions might specify the specific location that pixel values (e.g., RGB values) should be arranged and stored in the unified memory 320. The input processor circuit 305 also sends signals to the CPU 310 to indicate when it has fully buffered an input (e.g., a frame of video) so that the input can be read by the computation fabric 315.

In addition to instructing the input processor circuit 305 how and when to store input data for use by the computation fabric 315, the CPU 310 provides the neural network program instructions to the computation fabric. In some embodiments the CPU 310 provides these instructions in stages (e.g., one layer or portion of a layer at a time). Once the final output of the neural network is computed, the fabric 315 stores this output in the unified memory 320, so that the CPU 310 (or other circuitry on the device) can perform post-processing operations on the output (e.g., evaluate the output and perform any actions based on the output).

The computation fabric of some embodiments will now be described. The computation fabric provides a set of circuits for performing the various computations required for neural networks (e.g., dot product computations, scaler and bias operations, element-wise operations, activation functions, softmax functions, etc.), with the network parameters (weight values, bias values, layer arrangement, filter size, etc.) configurable. In some embodiments, the computation fabric imposes certain requirements on the networks, such as a maximum size of the network (i.e., a maximum size of the dot product computations), that the weight values be ternary (e.g., 0, $\alpha$, and $-\alpha$ for each layer of the network) or quinary (e.g., 0, $\alpha$, $-\alpha$, $2\alpha$, and $-2\alpha$ for each layer of the network), and/or that at least a particular percentage of the weight values be equal to zero.

Figure 4:
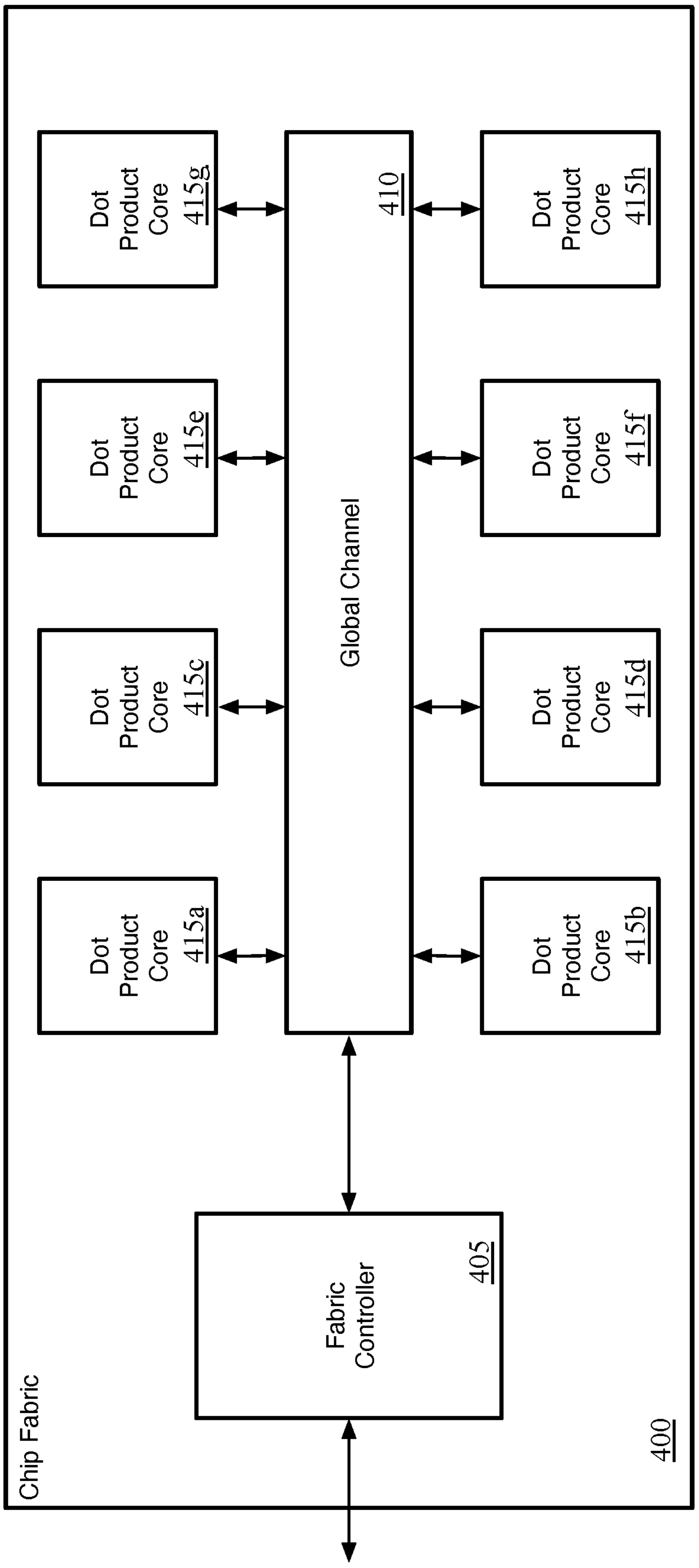
FIG. 4 conceptually illustrates the neural network computation fabric of some embodiments.

FIG. 4 conceptually illustrates the general structure of the neural network computation fabric 400 (also referred to as the neural network inference circuit, chip fabric, or neural network hardware accelerator) of some embodiments. The chip fabric 400 of some embodiments includes a fabric controller 405, a global channel 410, and a set of dot product cores 415*a-h*. The connections between the various components 405-415 represent the flow of both control data (e.g., configuration data for a particular neural network layer) and computation data at runtime in some embodiments.

The fabric controller 405 is responsible for managing the operation of the rest of the chip fabric 400 (e.g., the dot product cores 415) in some embodiments. The fabric controller 405 loads instruction arguments (e.g., weight and activation value locations, which cores to use for a particular computation, etc.) from the unified memory (or a local memory on the chip) based on instructions received from the CPU, maps instructions into a sequence of memory-mapped register writes, synchronizes the downstream controllers (e.g., controllers for the various cores 415), etc. The instructions managed by the fabric controller 405 are configured at compile time, in some embodiments, based on the parameters of the network being implemented by the chip fabric 400. In some embodiments, the fabric controller 405 interacts with the microprocessor of the IC as well (i.e., the fabric controller 405 handles the communication with the CPU 310 shown in FIG. 3). During execution of the neural network in some embodiments, the fabric controller 405 receives instructions as opcodes along with pointers to the location in the unified memory (or local memory) of the arguments for that opcode. The fabric controller retrieves these arguments in order to determine the full instruction. Because some instructions can have dozens of arguments and the same instructions are sent each time the network is executed for a new input (e.g., many times per second), storing the arguments locally (rather than the CPU sending the arguments with each instruction) saves processing power and system bus bandwidth.

The chip fabric also includes numerous dot product cores 415*a-h* as well as a global channel 410 that connects the cores, with these data processing circuits 410 and 415*a-h* configured by the fabric controller 405 (and a set of hierarchical control circuits, in some embodiments). The data processing circuits 410 and 415*a-h* operate to compute neural network operations in an efficient, low-power manner, according to the configuration data provided by the control circuits.

The dot product cores 415*a-h* include circuitry for computing partial dot products in some embodiments, which is described in further details below. In some embodiments, this circuitry includes memory and/or buffers for storing weights and activations, controllers for reading these values out of memory, and adder trees for computing the partial dot products based on the weight and activation inputs. The core memory, controllers, adder trees, and other core circuitry of some embodiments are described below in greater detail.

The global channel 410 is responsible for providing a communications bus for control and computation data between the fabric controller 405 and the cores 415, as well as from one core to another. The global channel 410, among other operations, accumulates partial dot products from multiple cores when computing dot products that require more computations than can be performed in a single core, and performs post-processing on these dot products. In addition, the global channel 410 carries activations (i.e., computation node outputs) after post-processing for storage (and for use as inputs to subsequent computation nodes) in other cores 415. In some embodiments, the global channel 410 includes an accumulating bus for accumulating the dot products and a non-computation bus for providing activations, weights, and other configuration data to the cores and other computation circuits. In some embodiments, the linear function post-processing and non-linear function for each neural network node are also performed by circuits in the global channel 410, as described further below.

The chip fabric 400 of some embodiments computes numerous neural network computation nodes simultaneously, with the computation for one node often spread across multiple cores (and subsequently the global channel). In some cases, if a neural network layer is small enough, then computation for that layer may be confined to a single core 415. However, if multiple cores are used for a given layer (any number of cores may be used in some embodiments), then each dot product computed for that layer is spread across all of the cores 415 in use.

That is, for a dot product computed across more than one core 415, each of these cores computes a partial dot product from a subset of the input values and weight values for the node, then provides these partial dot products to the global channel 410. In some embodiments, a set of input values are used as the input to multiple nodes in a layer, so a core simultaneously computes the dot products of these input values with multiple sets of weight values. Similarly, a set of weight values (referred to as a filter, or filter slice when that filter is divided across multiple cores) are used as the weights for numerous nodes with different sets of input values, so in some embodiments the cores load sets of weight values once and then compute dot products of these weight values with numerous different sets of input values.

In the simplest case, all of the partial dot products are computed in the same clock cycle and provided at the same time to the global channel 410. In some cases, however (e.g., for dot products with a very large number of terms or using larger than standard activation values, or when filters have too many nonzero weight values), each core 415 computes more than one partial dot product for a single computation node, requiring multiple clock cycles (also referred to as time-multiplexing of the dot products). Based on configuration data specifying which outputs from the cores are to be added together (and whether multiple partial dot products are required from the same core), the global channel 410 aggregates these partial dot products to compute the complete dot product for each node, then applies various post-processing functions (e.g., the bias, scale, and non-linear activation functions) to compute the output of each node.

Figure 5:
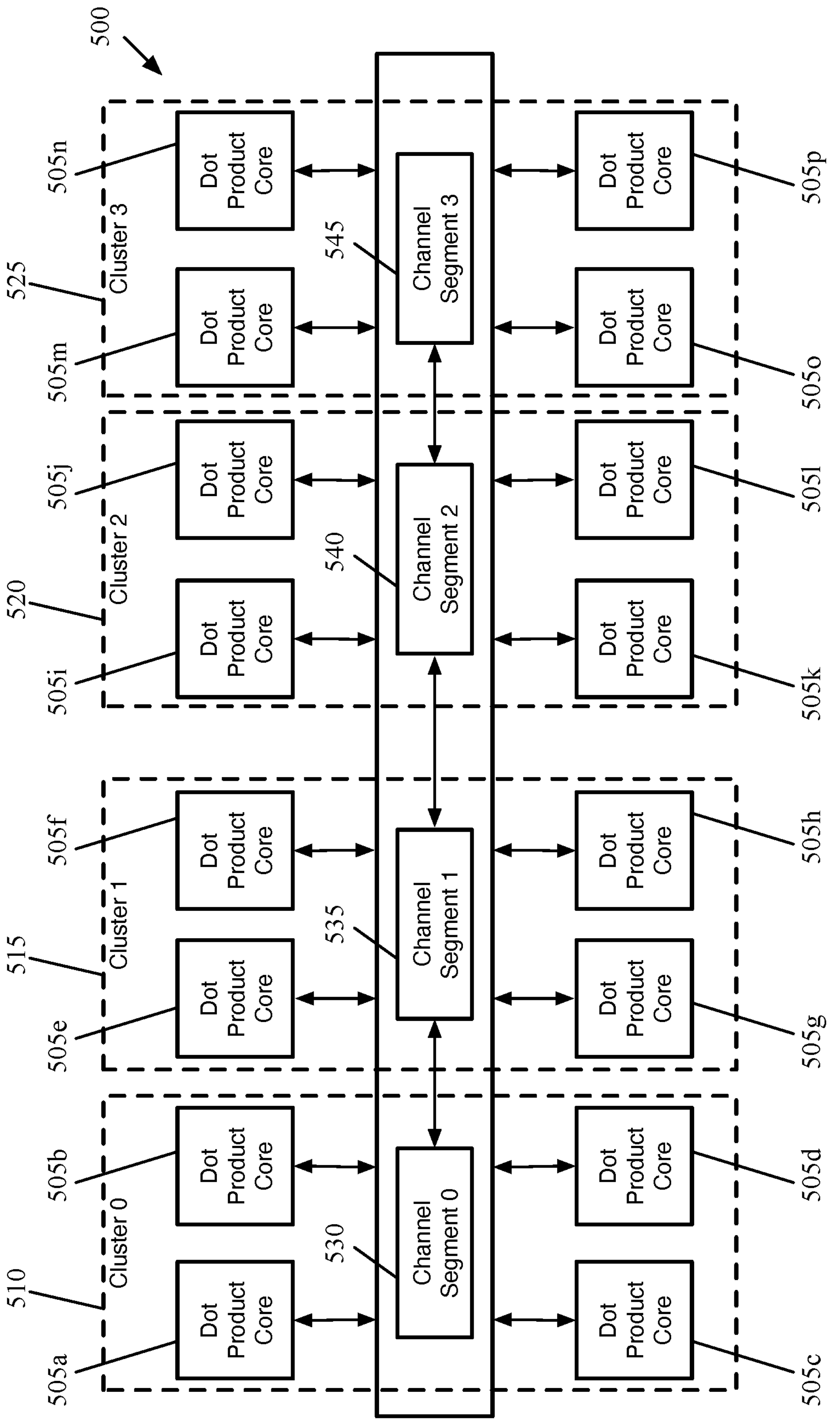
FIG. 5 illustrates a neural network computation fabric of some embodiments with sixteen dot product cores grouped into four clusters.

In some embodiments, the dot product cores are grouped into clusters, and the global channel includes separate segments for each such cluster. FIG. 5 illustrates a neural network computation fabric 500 of some embodiments with sixteen dot product cores 505*a-p* grouped into four clusters 510-525. In addition, the global channel includes four channel segments 530-545. Each of these channel segments includes the same circuitry in some embodiments, with the exception that buses in the first channel segment 530 and last channel segments 545 only connect to corresponding buses in one other channel segment while the buses in the intermediate channel segments 535 and 540 connect to corresponding buses in two neighboring channel segments.

The data processing circuitry of each of the channel segments 530-545 includes a dot product bus, a set of post-processing circuits, and an output bus in some embodiments. The dot product bus receives partial dot products from the cores, aggregates these dot products together, and provides the aggregated dot products to the post-processing circuits. The post-processing circuits perform the non-dot product computations of the neural network computation nodes, which may include a bias (addition) factor, a scaling (multiplication) factor, and a non-linear activation function (e.g., for a node in a convolutional or fully-connected layer). The outputs of the post-processing circuits are the computation node outputs (activations). The output bus, or activation write bus, carries the outputs of the post-processing circuits to the cores 505*a-p* to be stored as inputs for the next computation layer.

In some embodiments, each cluster 510-525 or group of clusters (e.g., clusters 510 and 515 being one group and clusters 520 and 525 being a second group) can execute a separate neural network. This allows the fabric to execute multiple networks simultaneously in some embodiments. For instance, a single chip of an IOT device could run both a facial recognition network and an object recognition network, a facial recognition network and a language parsing network, etc.

Figure 6:
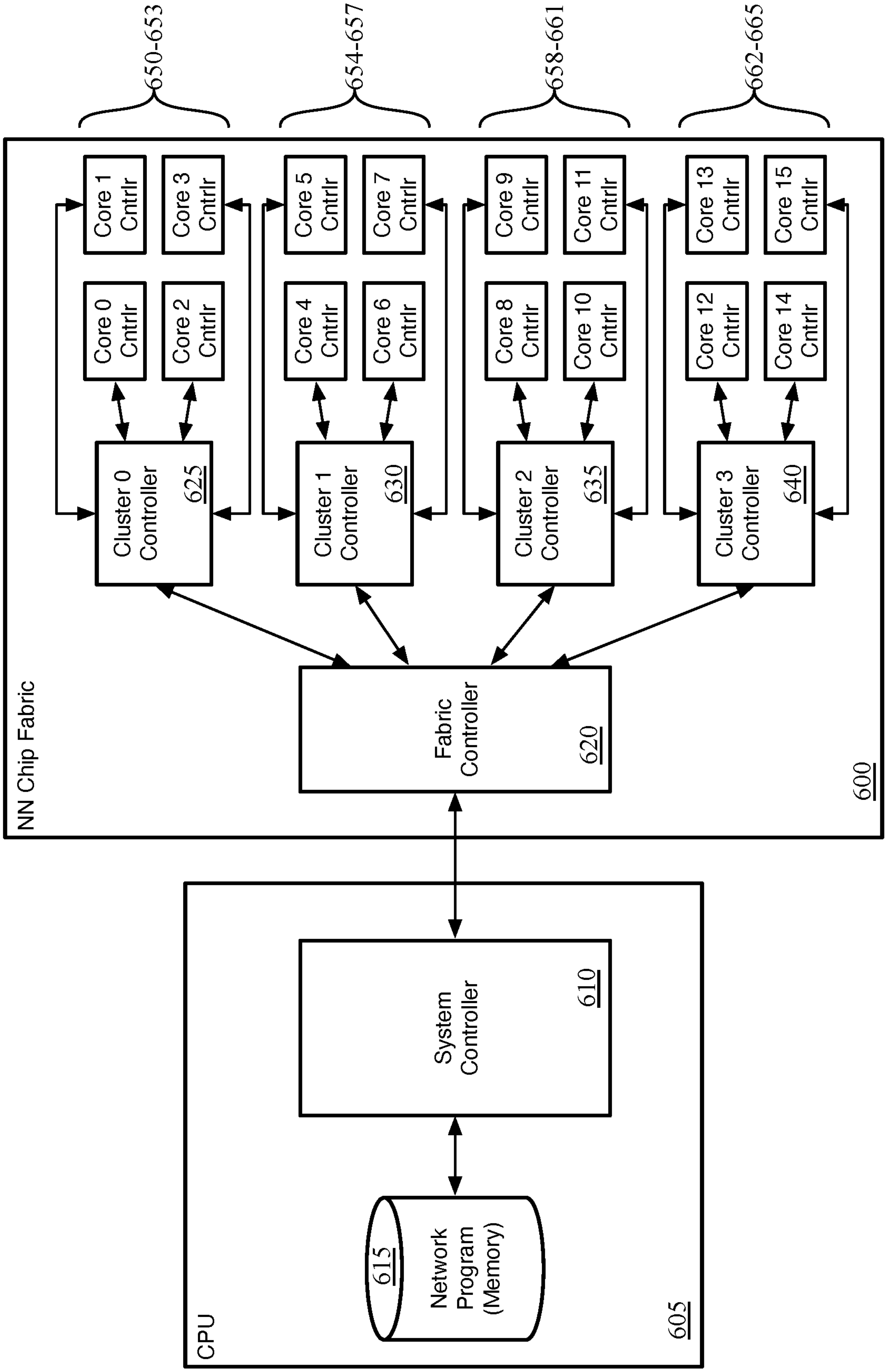
FIG. 6 conceptually illustrates a set of controller circuits for configuring a neural network chip fabric of some embodiments to execute a neural network.

Before describing the structure of the computation circuitry in greater detail, the hierarchical control and configuration of the neural network chip fabric will be described. FIG. 6 conceptually illustrates the set of controller circuits for configuring a neural network chip fabric 600 of some embodiments to execute a neural network. As shown, a CPU 605 executes a system controller 610 and stores a neural network program 615 (i.e., the compiled version of the neural network) in its memory.

The system controller 610 provides the neural network instructions to the chip fabric 600 (per the stored network program 615) for the chip fabric to execute the program on incoming input data (e.g., images, etc.). In some embodiments, the system controller 610 provides these instructions to the chip fabric 600 incrementally. For instance, in some embodiments, the system controller 610 initially loads the instructions for a first portion of the neural network (either the first layer of the neural network or a portion of the first layer), then waits for a signal from the chip fabric 600 indicating that these instructions have been completed. As described above, in some embodiments the system controller 610 provides instructions to the fabric controller 620 specifying which pre-loaded sets of instruction arguments should be retrieved and used for a layer or portion of a layer. The fabric controller 620 retrieves these instruction arguments in order to coordinate execution of the instructions on the chip fabric.

If a layer of the network is small enough to be completed in a single pass, then the compiler of some embodiments schedules the entire layer for one pass. However, in some embodiments, there is a maximum number of filters that can be loaded in a single pass (e.g., 64) due to the structure of the chip fabric. In addition, in some embodiments there is a maximum number of output sets that can be written to the same core in the same pass, so this can also constrict the number of filters in a pass. Other types of layers, such as activation matrix by activation matrix multiplication layers, element-wise operation layers, pooling layers, or activation rearranging layers, do not use filters and thus no weight values need to be loaded into memory for these layers. The chip fabric computes the output for all of the nodes for each filter loaded into memory so that these weight values need only be loaded once per execution of the network (i.e., each pass loads all of the input activations for the layer in the correct order for the outputs to be computed). However, if a layer has more than the maximum number of filters, then the layer will be divided across multiple passes. For the other (non-convolutional) layers, the chip fabric computes the output for all nodes of the layer. Once the first portion of the network is completed, the system controller 610 provides the fabric 600 with the instructions for a second portion (e.g., a second layer, or a second portion of the first layer), and so on until the chip fabric has fully executed the network.

The chip fabric 600 includes a hierarchical control structure for configuring the data processing circuitry (i.e., the dot product cores and global channel segments) to execute the neural network instructions from the system controller 610. As shown, the chip fabric 600 of some embodiments includes (i) a fabric controller 620 that interacts with the system controller 610 on the CPU 605, (ii) a set of cluster controllers 625-640, and (iii) a set of core controllers 650-665. Some embodiments include one cluster controller for each cluster of the chip fabric and one core controller for each core (in this case the chip fabric 600 has four clusters with four cores each).

The fabric controller 620 provides the point of interaction with the CPU 605 for the chip fabric 600, receiving neural network program instructions from the system controller 610 and sending signals to the system controller 610 to indicate when instructions have been completed. Upon receiving neural network instructions (e.g., for a layer of the network or portion of a layer), the fabric controller 620 parses the instructions to identify the active cores (and thus the active clusters) for the instructions, and unpacks additional arguments stored in local instruction memory on the chip fabric 600 or in unified memory. In some embodiments, in order to minimize power usage, the instructions provided from the CPU are high-level commands that the fabric controller parses in order to determine more detailed instructions for the lower-level controllers. Doing so limits control signal power consumption on the chip while encapsulating implementation details of the lower-level (cluster, core) circuits.

For example, in some embodiments the instructions from the system controller 610 to the fabric controller 620 specify to execute a particular pass of a particular layer of the network, and the fabric controller memory (either on-chip or in unified memory) includes the required information to execute this specific pass. In some embodiments, this information is conveyed by the system controller instructions specifying to execute a particular type of pass or layer (e.g., convolution) based on the arguments found at a particular memory location of the fabric controller's memory. The specified memory location stores arguments such as the source cores for the computations (i.e., the cores that will perform the dot product calculations), the destination cores for the output values (i.e., the cores to which the output values are stored), the memory locations in the cores at which to find the weight and/or input values for the computations (in some embodiments, the weight values are loaded into memory initially such that these memory locations are the same across all of the source cores), information for calculating the non-linear activation function for the layer (e.g., the lookup table mapping information), etc.

Because layers may potentially include thousands of output activation values, having the CPU specify a core and RAM location for each such activation value would require a lot of power. Instead, as described, some embodiments specify only a few parameters required for the chip fabric to determine the memory locations for each activation value (e.g., the cores at which the values will be stored, the starting memory address that is the same for each core, and the dimensions of the activation layer). In addition, similar principles apply to the use of input values already stored in RAM (e.g., the outputs of the previous layer or layers) for the dot products of the current layer. The weight values and their location in memory, the location of the input values, the lookup table configuration for a layer, etc. are all the same for each network input (e.g., each frame of video) as the network is statically scheduled, so resources can be saved by storing all of this information on the chip at bootup (when the network is small enough), with a minimal amount of instruction information sent from the CPU for each layer or pass (i.e., only the location in the fabric controller of the arguments for the current layer). When the network is too large (i.e., has too many weight values), some embodiments store all of the information except for the entirety of the weight values on the chip at bootup. In this case, a portion of the weights (i.e., the weights for the first layer or several layers) are stored on the chip at bootup, but these weights are overwritten during the execution of the network as weights for the next set of layers are loaded to the chip memory. Once the network is completed for a network input (e.g., a frame of video, a portion of audio, a text input for a large language model), the initial set of weights are again loaded to the chip memory.

The fabric controller provides cluster instructions to the cluster controllers for the identified clusters that are in use for the current neural network layer, and waits for completion signals from the clusters indicating that the current set of instructions has been executed (and thus, that the fabric controller can notify the system controller on the CPU that the current set of instructions is complete, causing the system controller to provide the next set of instructions). Avoiding use of some of the clusters, when possible, provides power savings, as these cores can be powered down, or at least the memories in the cores put to sleep. Even for networks that require the use of all of the cores of the chip fabric, often the initial layers have smaller dot product computations that require fewer cores. In addition, in some embodiments, the fabric controller synchronizes the cluster controllers, ensuring that dot products computed across multiple clusters are aggregated together correctly.

In some embodiments, the cluster instructions provided by the fabric controller are not fully parsed instructions, pushing some of this work to the cluster and/or core controllers. For instance, the fabric controller may only provide the starting memory address for the activations and the activation layer dimensions, allowing the cluster controllers to determine at which core (and the RAM location within that core) each activation value is to be stored. The fabric controller also broadcasts these instructions in some embodiments, while including certain bits that specify the difference in setup between the clusters (or whether certain clusters even need to act on the instructions). Some embodiments broadcast the instructions only to the clusters involved in the computation (which could include clusters with source cores, destination cores, or both). This broadcasting reduces latency and power consumption as compared to sending separate sets of instructions to each cluster.

Each of the cluster controllers 625-640 receives instructions from the fabric controller 620 and configures its own segment of the global channel in addition to parsing the instructions to identify configuration data for each of the cores in its cluster. That is, each cluster controller 625-640 that receives cluster instructions for a given high-level instruction directly configures the dot product bus, the post-processing units, and the activation write bus in its channel segment. In addition, these cluster controllers 625-640 determines which of its cores require the instructions and provides these instructions to the core controllers for these identified cores.

Much as the fabric controller 620 parses the high-level instructions from the system controller 610, the cluster controllers 625-640 of some embodiments decompose the instructions from the fabric controller 620 to determine the configuration data to provide to its channel segment circuits (dot product bus, post-processing units, and activation write bus) as well as the sets of instructions for each of its cores. The cluster controllers 625-640 configure the channel segment circuits to, e.g., aggregate the partial dot products from the cores correctly (both within a channel segment and across channel segments), provide these aggregated dot products to the post-processing units in the correct channel segment, perform math functions on activation values, perform convolutional layer post-processing operations, and provide the output of the post-processors to the correct core. In some embodiments, this information both comes from the fabric controller (e.g., the lookup table mapping for the non-linear activation function) as well as from information stored in cluster controller memory.

The use of separate cluster controllers enables the ability of the chip fabric to execute multiple separate networks simultaneously in some embodiments. The fabric controller 620 can provide instructions to the first cluster controller 625 for a layer of a first neural network and, so long as those instructions do not require the use of other clusters, the first cluster can execute the entire neural network layer in a self-contained manner. At the same time, the fabric controller 620 could provide instructions to the second cluster controller 630 for a layer of a second neural network, with the second cluster executing the entire neural network layer in a self-contained manner. The third and fourth cluster controllers 635 and 640 could receive instructions for third and fourth networks as well, to execute at the same time as the first two. In addition, other combinations of clusters can execute multiple networks simultaneously (e.g., the first two clusters executing a first network and the second two clusters executing a second network, the first two clusters executing a first network while the third and fourth clusters each separately execute second and third networks, etc.

The cluster controllers 625-640, as mentioned, also provide the appropriate configuration data to each of the core controllers 650-665, which coordinate the dot product processing in the core (as well as the direct delivery of input activation values to the global channel for pooling, element-wise operations, etc.). In some embodiments, the cluster controllers do not fully parse the instructions to specify each individual memory read or write, but instead provide the higher-level instructions to each core controller. In addition, some embodiments broadcast the instructions from a particular cluster controller to each of the core controllers within the cluster (or the core controllers for each of the cores active in the current pass), while including certain bits that specify the difference in setup between the cores. This broadcasting reduces latency and power consumption as compared to sending separate sets of instructions to each core.

The core controllers 650-665 then parse these instructions to determine the specific configuration data for the operations of the core. This configuration data includes memory locations for various read operations to read and align weight and activation values for dot product operations, read operations to read and output weight value for activation math function operations in the global channel, enable bits for the dot product operations, memory locations for write operations after activations have been computed, etc. Once the instructions are fully executed, the core controllers 650-665 send completion signals to the cluster controllers

625-640. Similarly, once the cluster controllers 625-640 receive these completion messages, they send similar messages to the fabric controller 620, which can then notify the system controller 610 executing on the CPU 605 that the instructions are complete. In some embodiments, the last set of neural network instructions is a set of memory read operations, for the computation fabric to deliver the neural network output results to the system controller for any post-processing operations (e.g., a softmax operation to generate a probability, etc.). After this, the system controller puts the fabric to sleep until the next set of input data is to be processed, in some embodiments. If only a portion of the fabric is involved in executing the neural network (e.g., because one or more clusters execute a different neural network in parallel), then that portion of the fabric is put to sleep in some embodiments.

Figure 7:
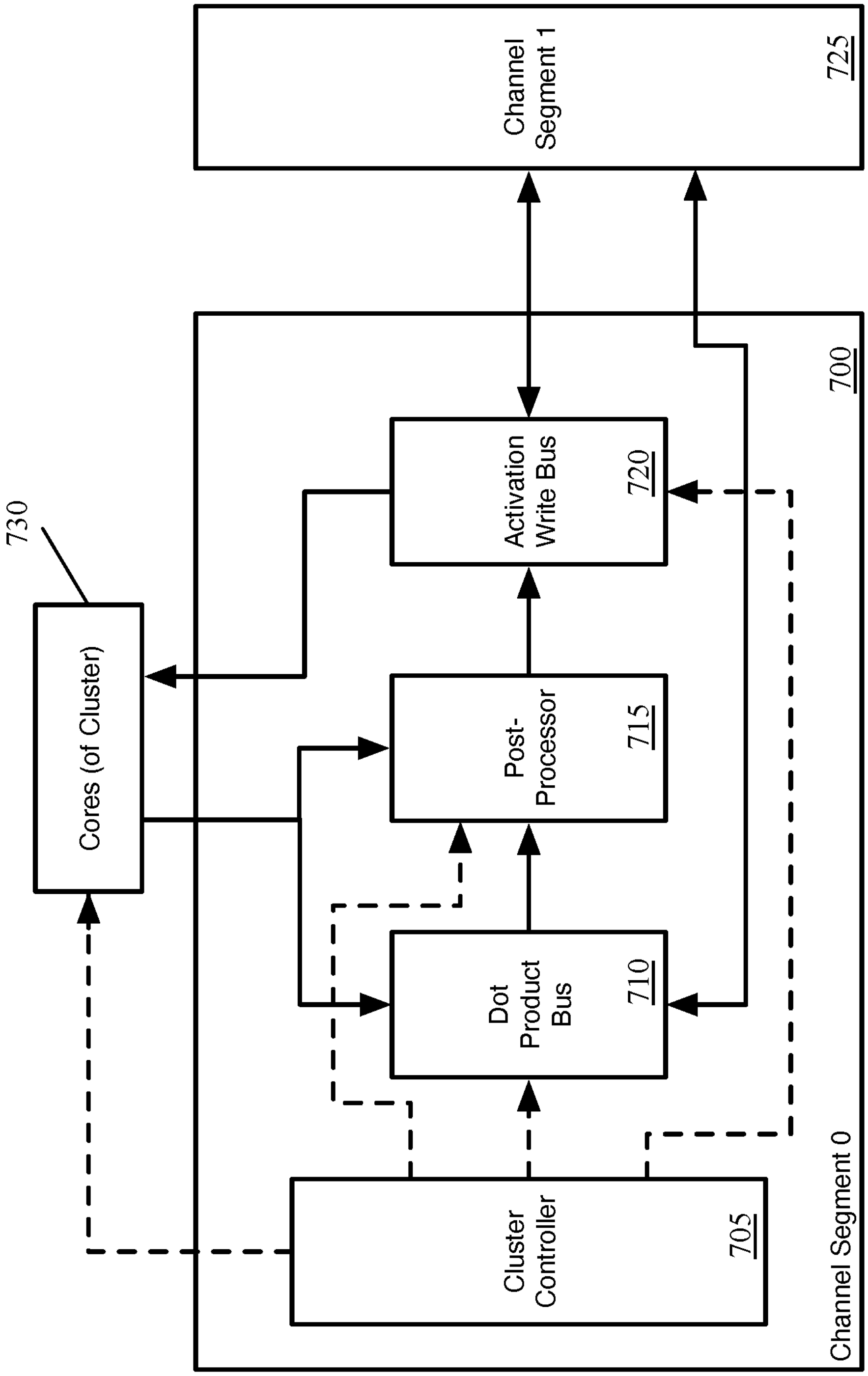
FIG. 7 conceptually illustrates the circuit blocks of a channel segment of some embodiments.

Returning to the neural network computation circuitry, FIG. 7 conceptually illustrates the circuit blocks of a channel segment 700 of some embodiments (e.g., one of the channel segments 530-545 shown in FIG. 5). The channel segment 700 includes a cluster controller 705, a dot product bus 710, a post-processor 715, and an activation write bus 720 (also referred to as an output bus). In addition to the channel segment 700, the figure also illustrates an additional channel segment 725 and the cores 730 of the local cluster for the channel segment 700, as the circuit blocks of the channel segment 700 exchange dot product and configuration data with these other segments. In this diagram, the dashed lines represent the flow of configuration data while the solid lines represent the flow of neural network computation node data for convolution or fully-connected layer nodes (i.e., nodes that use a dot product-based linear function). Additional neural network computation data, such as that flowing directly from the cores 730 to the post-processor 715 for pooling nodes or element-wise operators, is not shown.

The cluster controller 705 configures the dot product bus 710, post-processor 715, and activation write bus 720 as per the configuration instructions received from the fabric controller in some embodiments. For the dot product bus 710, this configuration data specifies, in some embodiments, (i) which partial dot products are to be added together as part of the same neural network computation node and (ii) to which post-processing unit each aggregated dot product is sent (the post-processor 715 of some embodiments includes numerous post-processing units with the same circuitry). In other embodiments, the post-processing unit that receives each aggregated dot product is not specified as configuration data because there are an equal number of dot product bus lanes and post-processing units, so that the data from each lane is provided as the primary input to a different post-processing unit.

For the post-processor 715, the configuration data of some embodiments indicates (for each of the post-processing units) whether a dot product computation node or other computation node (e.g., pooling, element-wise operator) is being executed, the scaler and bias factors for a linear computation, the activation function to use (which may be specified, e.g., as a lookup table or a piecewise linear function), as well as other data. For the activation write bus 720, the configuration data indicates to which cores each output value is to be delivered, in some embodiments.

As mentioned, the solid lines indicate the flow of neural network computation data, for a node in a convolutional or fully-connected layer. The cores 730 (as well as, in some cases, cores of other clusters) compute partial dot products. For a given computation node, these partial dot products may be computed across multiple cores. In some embodiments, if more than one core is used to compute the dot products for a neural network layer, then the partial dot products for each node are computed across all of these active cores.

These partial dot products are output to the dot product bus 710, which aggregates the partial dot products from the cores 730 of the local cluster. The dot product bus 710, in some embodiments, includes a number of independent dot product bus lanes that each receives partial dot products from the cores, aggregates these together, and provides the aggregated dot products to the post-processing circuits. In some embodiments, each lane of the dot product bus corresponds to (i) one of the adder trees in each of the cores (i.e., dot product bus lane N receives the partial dot products from each of the adder trees of index N in the cores), and (ii) one of the post-processing units associated with each of the clusters (i.e., dot product bus lane N provides its aggregated output to the post-processing unit N in one of the clusters, with the specific cluster for each lane specified by the configuration data).

Each lane of the dot product bus 710 spans all of the channel segments, and the dot product bus lanes in each channel segment aggregate the partial dot products from the cores of its local cluster. The dot product bus 710 in the channel segment 700 also exchanges locally-aggregated dot products with its neighboring segments for further aggregation if needed (i.e., if the source cores for the dot product computation span multiple clusters). In this case, the channel segment 700 only has one neighboring segment 725, but internal channel segments (e.g., the segments 535 and 540 in FIG. 5) will have two such neighboring segments. The configuration data from the cluster controller 705 specifies whether to send these dot products in one direction or the other along the global channel for each dot product bus lane, or to aggregate the dot products from the neighboring channels locally, depending on where post-processing will occur for each dot product.

The post-processor 715 includes numerous post-processing units that receive the dot products from their corresponding dot product bus lane and perform the non-dot product functions of the neural network computation nodes. For a typical computation node of a convolutional (or fully-connected) layer, these functions include an addition operation to account for the bias factor, a multiplication operation to account for the scaling factor, and a non-linear activation function. In some embodiments, the outputs of the linear function are quantized or truncated to a particular number of bits (e.g., 4 bits, 5 bits, 8 bits) by the activation function. Using a small, fixed number of bits for the outputs of each computation node allows for (i) power and resource savings by enabling smaller computations and (ii) certainty in the scheduling of computations (i.e., by knowing that all input values will be within a particular range) that enables further power and resource savings in design. The non-linear activation function, in some embodiments, is implemented as a lookup table or a piecewise linear function based on configuration data, rather than a hardwired function. This enables the IC to execute different neural networks that use different activation functions and, in some embodiments, allows for different activation functions to be used in different layers of the neural network or even for different filters in the same layer.

The activation write bus 720 receives the computation node activation outputs from the post-processing units and carries these outputs back to the cores 730, to be stored in the memory of the core and used as inputs for the computation nodes of the next layer of the neural network. The activation write bus connects to the cores 730 in the local cluster as well as the activation write bus in the neighboring channel segment 725. As with the dot product bus 710, the activation write bus 720 of some embodiments includes lanes, with each post-processing unit of the post-processor 715 sending its output to a different one of these lanes.

In some embodiments, the output values may be computed by the post-processor 715 in one cluster but carried by the activation write bus 720 to a core in another cluster to be stored. For efficiency, the compiler of some embodiments attempts to optimize the location of the post-processing unit for each computation node output relative to the cores used to compute the constituent partial dot products for that computation node and the destination core for the output value. The activation write bus 720 of some embodiments also includes a right shift circuit for each core that is used to align the output values for the core, in order for the values to be stored in contiguous blocks within the core RAM.

Figure 8:
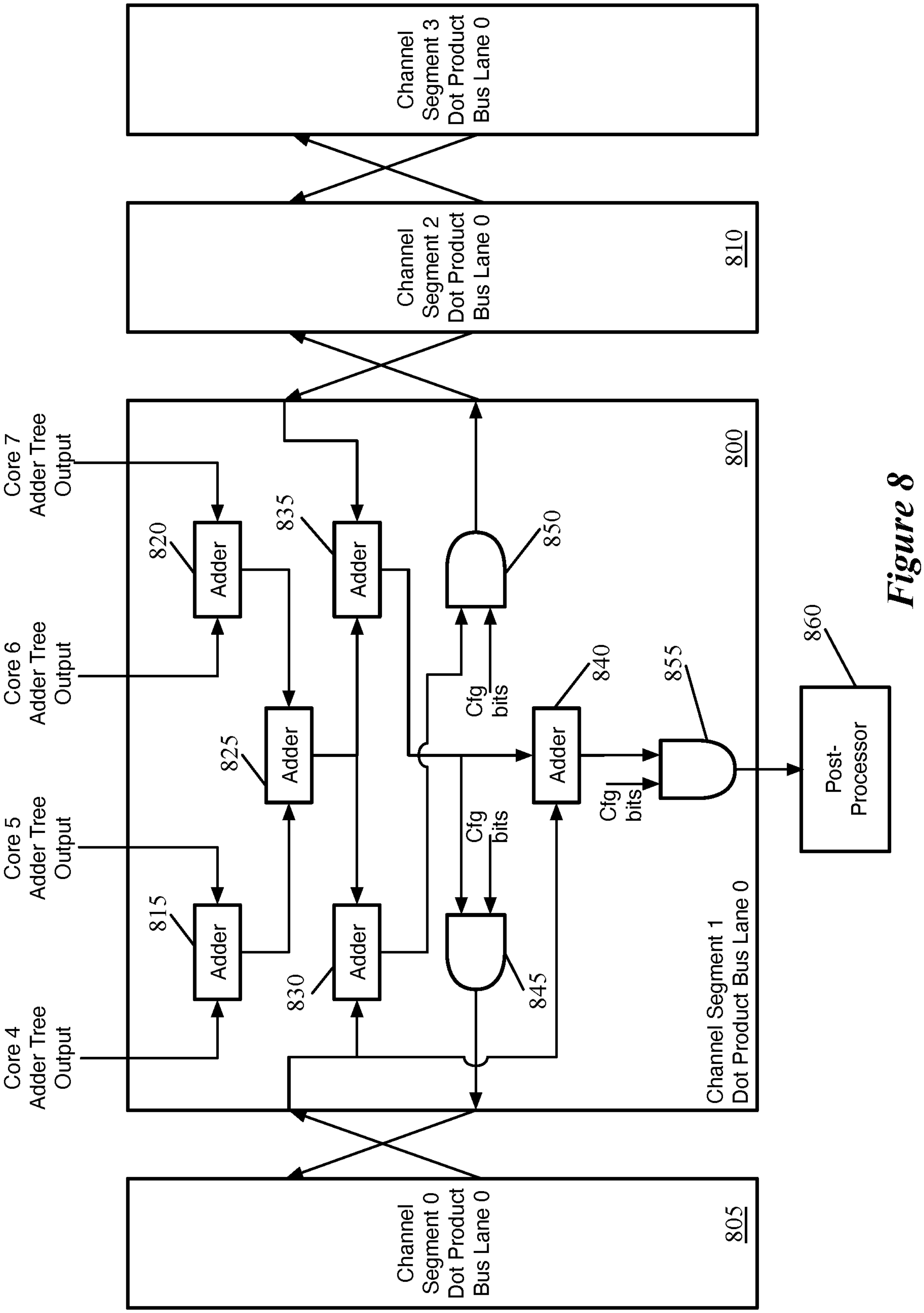
FIG. 8 conceptually illustrates a portion of the dot product bus of some embodiments.

Now that the primary circuit blocks of the global channel have been introduced, these circuits of some embodiments will be explained in greater detail. FIG. 8 conceptually illustrates a portion 800 of a dot product bus of some embodiments. In this example, the segment for which the dot product bus portion 800 is shown is an internal segment (in that it has two neighboring segments 805 and 810). The dot product bus of some embodiments includes, within each segment, numerous (N) non-interacting lanes, and the portion 800 is a segment of one of these lanes. In some embodiments, each segment includes the same number of lanes, and lane ne Nin one segment is connected to lane n in its neighboring segments for the aggregation of dot products across clusters. In some embodiments, the number N of dot product bus lanes is equal to the number of filter slice buffers into which weight data is loaded, the number of adder trees computing partial dot products in each core, the number of post-processing units in each post-processor block of a channel segment, and the number of activation write bus lanes. Thus, each computation node has its partial dot product computed by the same adder tree in each of one or more cores, which is aggregated across the corresponding dot product bus lane to calculate the complete dot product. This complete dot product is (in the typical case) provided to the corresponding dot product post-processing unit, which provides its output to the corresponding activation write bus lane to be carried to the appropriate core.

The dot product bus portion 800 includes a set of adders 815-840 as well as a set of AND gates 845-855. The first three adders 815-825 form an adder tree to aggregate the partial dot products output by the corresponding adder trees of the four cores of the local cluster for the channel segment. In some embodiments, if a core does not compute a partial dot product for a particular computation node, then that core outputs a 0 value to the dot product bus. This aggregated partial dot product is output to both of the adders 830 and 835.

These adders 830 and 835 handle the computation of dot products that are “moving” downstream (to a lower-numbered segment, in this case segment 805) and upstream (to a higher-numbered segment, in this case segment 810). The adder 830 receives the aggregated dot product from the corresponding downstream dot product bus lane 805 and combines it with the locally aggregated dot product from the adder 825. If either (i) the cores of the downstream cluster(s) do not participate in the dot product computation or (ii) the dot product will be completely aggregated in this channel segment and sent to a dot product post-processor downstream, then this value received from the downstream dot product bus lane 805 is gated to 0 (i.e., by the equivalent of AND gate 850 in the downstream segment).

Correspondingly, the adder 835 receives the aggregated dot product from the corresponding upstream dot product bus lane 810 and combines it with the locally aggregated dot product from the adder 825. If either (i) the cores of the upstream cluster(s) do not participate in the dot product computation or (ii) the dot product will be completely aggregated in this channel segment and sent to a post-processor upstream, then this value received from the upstream dot product bus lane 810 is gated to 0 (i.e., by the equivalent of AND gate 845 in the upstream segment).

The output of the adder 830 is sent to the AND gate 850, which ANDs this output with configuration bits from the local cluster controller based on where the post-processing for the completed dot product will be performed. If the post-processing segment is upstream, then these configuration bits are 1 (resulting in the aggregated dot product being passed upstream), whereas if the post-processing segment is either downstream or local, then these configuration bits are 0 (resulting in 0 values being passed upstream).

Similarly, the output of the adder 835 is sent to the AND gate 845, which ANDs this output with configuration bits from the local cluster controller based on where the post-processing for the completed dot product will be performed. If the post-processing segment is downstream, then these configuration bits are 1 (resulting in the aggregated dot product being passed downstream), whereas if the post-processing segment is either upstream or local, then these configuration bits are 0 (resulting in 0 values being passed downstream).

The final adder 840 receives (i) the output of the adder 835 and (ii) the aggregated dot product from the downstream segment 805 of the dot product bus lane. It should be noted that the directions could be reversed in other embodiments with an equivalent effect, with this adder 840 instead receiving the output of the adder 830 and the aggregated dot product from the upstream segment 810 of the dot product bus lane. This adder aggregates the complete dot product (accounting for the partial dot products from the local cores and upstream cores via the output of adder 835 and the partial dot products from the downstream cores via the output from the segment 805).

The output of the final adder 840 is provided to the post-processor 860 (e.g., to the post-processing unit that corresponds to the lane of the dot product bus). However, AND gate 855 is used to gate this output to 0 if the post-processing for this dot product bus lane is not local (i.e., either upstream or downstream). In summary, the dot product bus lane segment 800 is configured (via the AND gates 845-855) to (i) add the local cluster partial product with the downstream partial product and pass this aggregated partial product upstream if the post-processing segment is upstream, (ii) add the local cluster partial product with the upstream partial product and pass this aggregated partial product downstream if the post-processing segment is downstream, and (iii) add the local cluster partial product with the downstream and upstream partial products and pass this completed dot product to the local post-processing block if the post-processing will be performed locally. In some embodiments, the post-processing segment is selected by the compiler, with the primary factor in this selection being that the post-processing segment is centrally located among the source clusters (i.e., the cores that compute the partial dot products) and a secondary factor being that the selected segment is as close to the destination core(s) as possible, in order to reduce the power required for the computation and write operations.

In addition to the circuitry shown in FIG. 8, the dot product bus also includes a control block in some embodiments. This block is responsible for outputting a signal to the post-processor block to indicate when the output of the dot product bus is valid (i.e., when the dot products are aggregated by the dot product bus), so that the post-processor acts on the data from the dot product bus.

Figure 9:
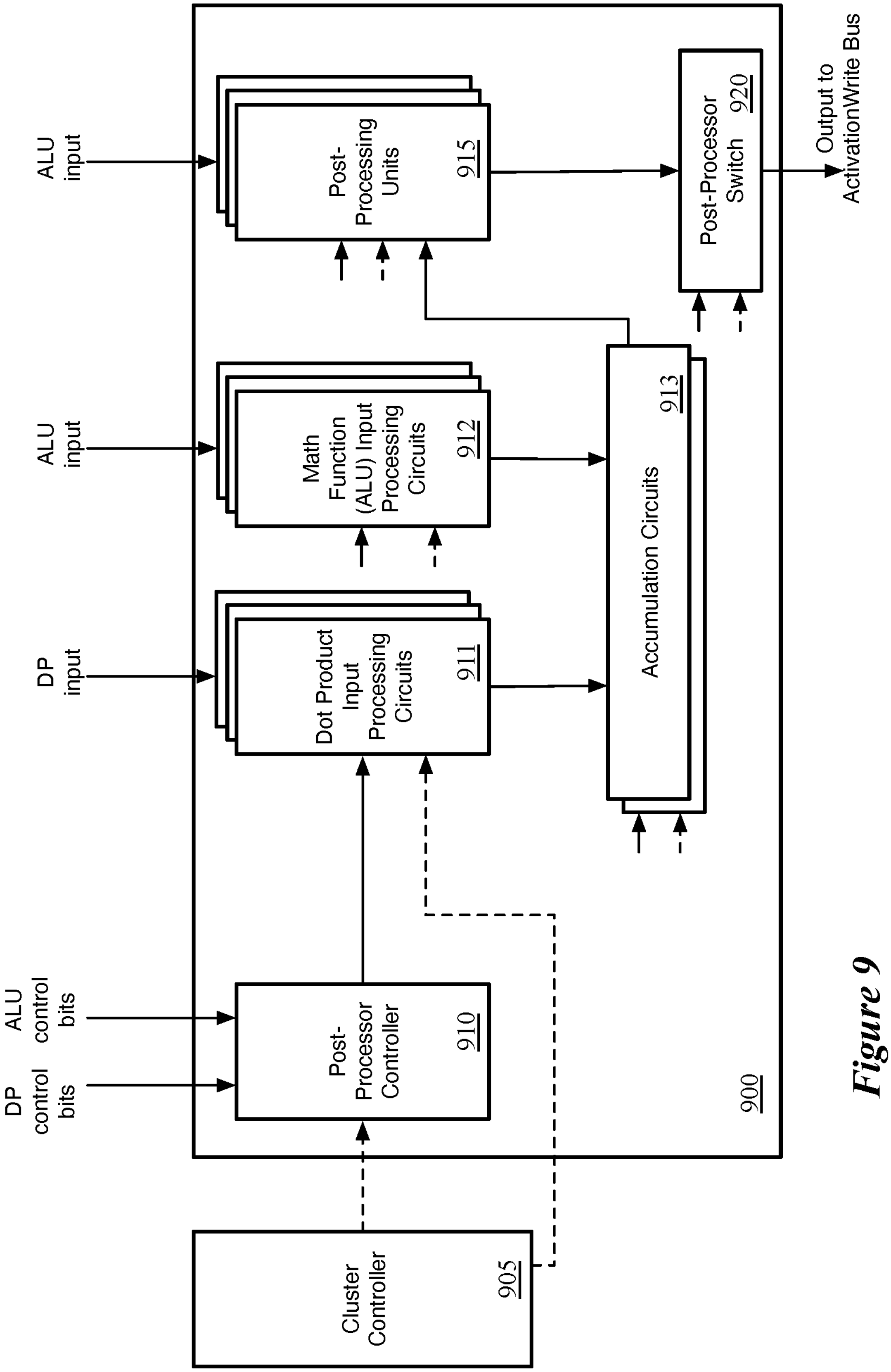
FIG. 9 conceptually illustrates the post-processing circuit block for a channel segment of some embodiments, along with the local cluster controller that provides configuration data to this post-processor.

FIG. 9 conceptually illustrates the post-processing circuit block 900 for a channel segment of some embodiments, along with the local cluster controller 905 that provides configuration data to this post-processor 900. As shown, the post-processing circuit block 900 includes as sub-blocks a post-processor controller 910, a set of dot product input processing circuits 911, a set of math function (arithmetic logic unit) input processing circuits 912, a set of accumulation circuits, a set of post-processing units 915, and a post-processor switch 920. The cluster controller 905 provides configuration data to some or all of these sub-blocks in order to synchronize operations and to provide these sub-blocks with configuration data for a current layer.

The post-processor controller block 910 aggregates control signals from the dot product bus (e.g., for convolution and fully-connected layers) as well as an arithmetic logic unit (ALU) bus from the cores (e.g., for pooling, copy, element-wise, and activation by activation matrix multiplication operations). These control bits include accumulate and valid signals for the dot product bus (which indicate to the post-processor whether the incoming data is a final dot product, as dot products are not sent every clock cycle) as well as accumulate, valid, and end of row signals for the ALU bus. The ALU bus carries activation values directly from the cores without having dot products performed, to be used for pooling and element-wise operations. The accumulate and valid signals indicate to the post-processor whether the incoming ALU data is to be used, while the end of row signals indicate that different configuration data should be used for certain post-processing operations when the end of a row of input values is reached (e.g., on account of padding, etc.). The post-processor controller block 910 aggregates these signals, as mentioned, and outputs signals to the post-processing units 915 to indicate when the post-processing units are receiving valid dot product or ALU data. Each of the sub-blocks 911-920 is shown as receiving configuration and/or control signals from both the cluster controller 905 and the post-processor controller 910, but it should be understood that in some embodiments some or all of the circuit sub-blocks actually only receive data from one or the other of these controllers 905 and 910.

The post-processor 900 includes numerous dot product input processing circuits 911, math function input processing circuits 912, and post-processing units 915. In some embodiments, the post-processor block 900 within a segment includes the same number of each of these sub-blocks as there are dot product bus lanes and activation write bus lanes (which is also the number of adder trees in each core for computing partial dot products). The dot product input processing circuits 911 receive dot product inputs from the dot product bus for convolution and fully-connected neural network layers, while the math function input processing circuits 912 receive activation inputs (ALU inputs) via the ALU bus directly from the cores of its cluster for other types of layers (e.g., pooling, element-wise addition or multiplication, activation by activation matrix multiplication).

In some embodiments, each dot product input processing circuit 911 receives a single dot product input, from its corresponding segment in the dot product bus. However, to accommodate certain situations in which one or more filter slices assigned to a core is not sparse enough (i.e., too many of the weight values of a portion of the filter used to compute a partial dot product are nonzero), the dot product input processing circuits 911 of some embodiments each receive two dot product inputs. Specifically, some of the dot product bus lane outputs are sent to two or more of the dot product input processing circuits 911 (in some such embodiments, different dot product bus lane outputs are sent to different numbers of dot product input processing circuits, with each dot product input processing circuits receiving two such outputs). In some embodiments, each math function input processing circuit 912 receives a set of activation value inputs, from one core or from multiple cores in its cluster. The math function input processing circuit 912 uses different inputs depending on the operation the circuit is configured to perform for a given layer.

The dot product input processing circuits 911 and math function input processing circuits 912 provide their inputs to a set of accumulation circuits 913. In some embodiments, these accumulation circuits (i) select whether to pass on data from one or the other of the input processing circuit blocks 911 and 912 and (ii) either pass on the selected input data without changing the data or perform accumulation operations across multiple lanes of the selected input data (thereby reducing the number of outputs). These outputs from the accumulation circuits 913 are provided to the post-processing units 915, which perform various additional post-processing operations on the data (e.g., scale and/or shift operations, non-linear activation functions). In some embodiments, activation values can also be passed directly from the ALU input to the post-processing circuit output without any computations (e.g., for copy or activation tensor reshaping operations). Additional details of these post-processing sub-blocks are described further below by reference to FIGS. 10 and 11.

The post-processing switch 920 of some embodiments compresses the post-processing unit outputs (i.e., the activation outputs) to be sent to the activation write bus. In some embodiments, the chip fabric can be configured for different size activation outputs (e.g., 4-bit, 8-bit, and/or 16-bit), but the activation write bus requires the outputs to be in contiguous blocks. As such, for output sizes smaller than the maximum, the post-processing switch compresses these together to eliminate the meaningless bits (e.g., compressing two 4-bit activation outputs onto the wires for one 8-bit activation output).

Figure 10:
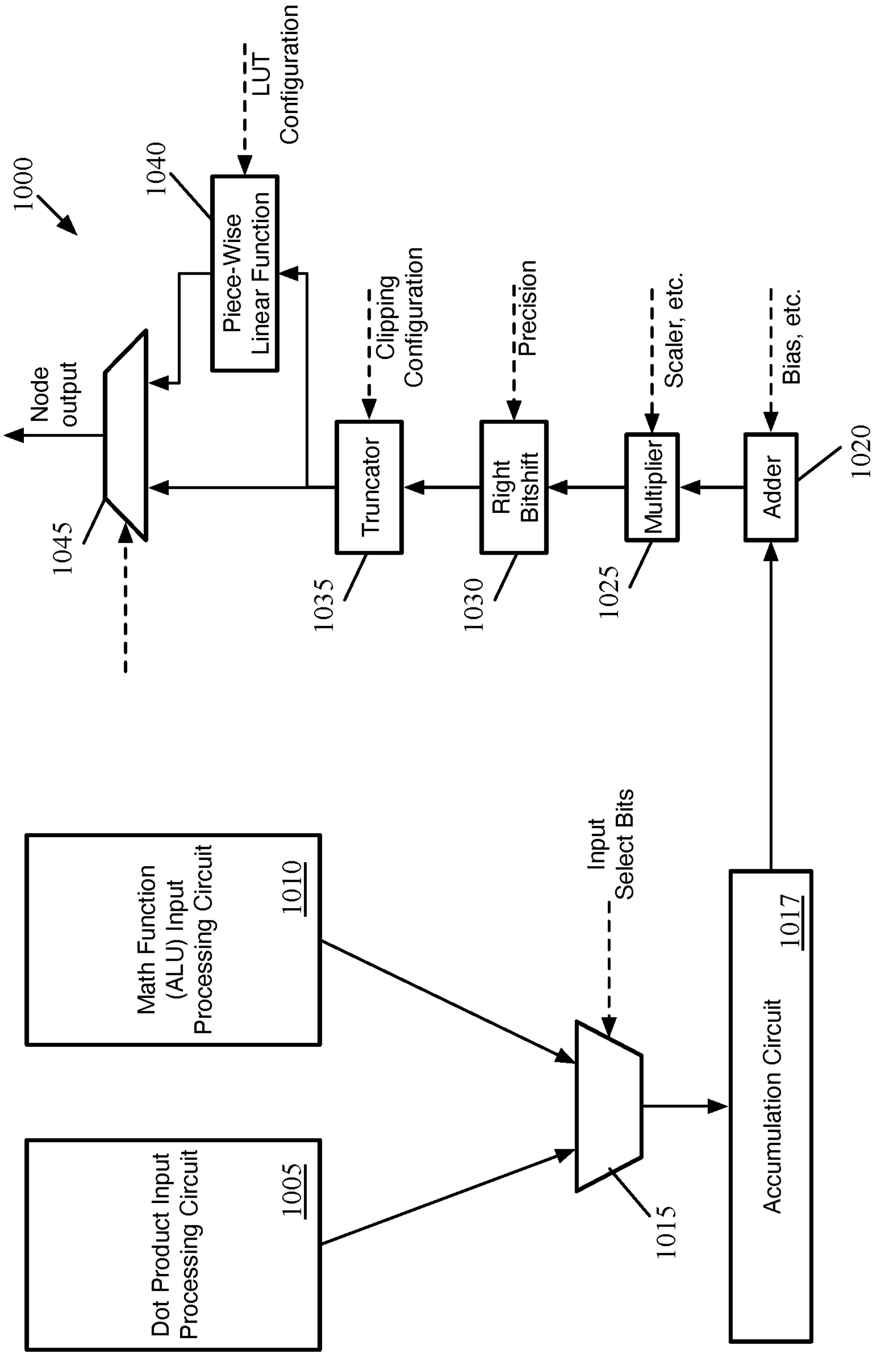
FIG. 10 conceptually illustrates the structure of a post-processing unit of some embodiments.
Figure 11:
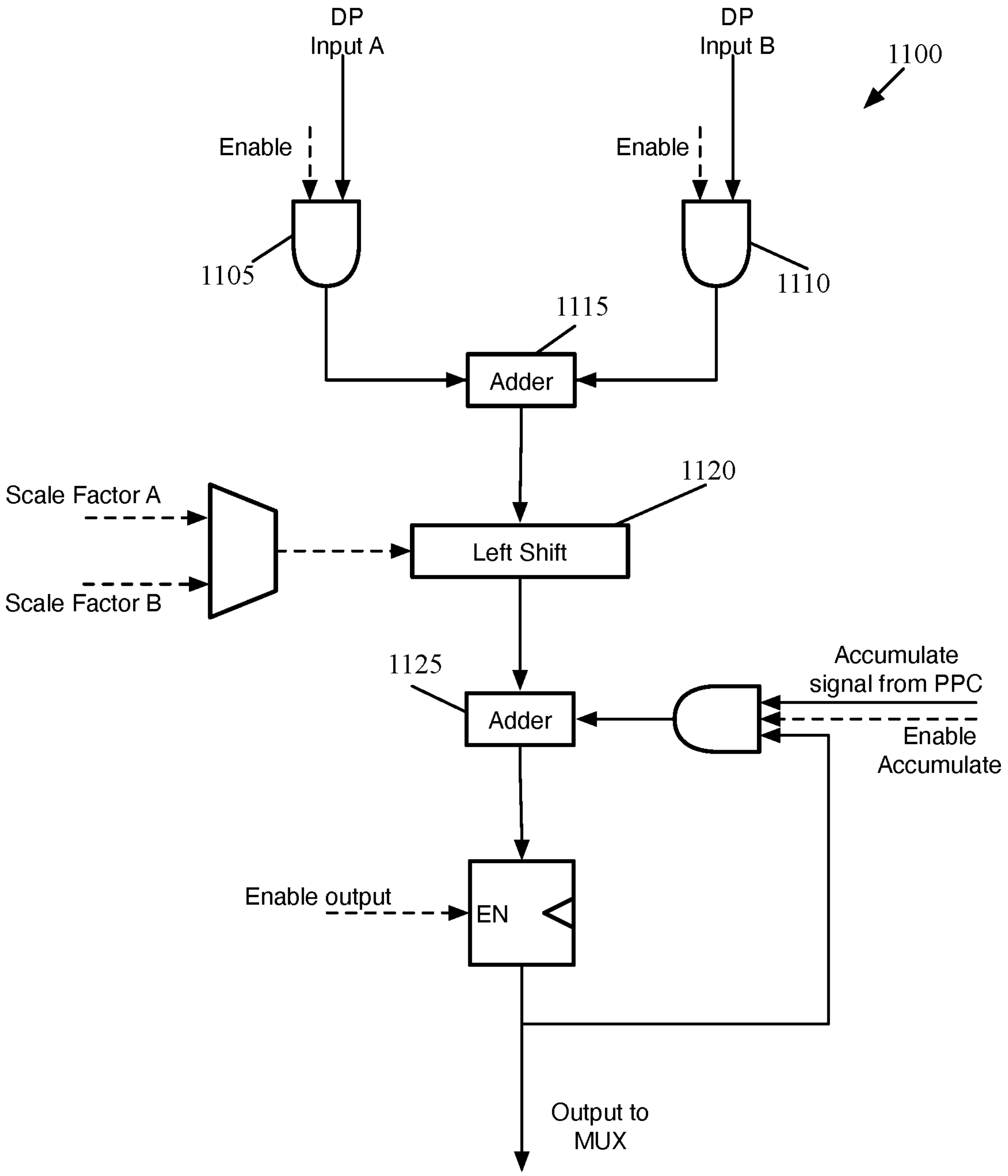
FIG. 11 conceptually illustrates a dot product input processing circuit of some embodiments.

As mentioned, FIGS. 10 and 11 illustrate the post-processing units in more detail. FIG. 10 conceptually illustrates the structure of a post-processing unit 1000 of some embodiments. As shown, the post-processing unit 1000 includes a dot product input processing circuit 1005, an ALU input processing circuit 1010, a multiplexer 1015 that selects between the outputs of these two circuits, and a set of post-processing operation circuits.

The dot product input processing circuit 1005, described in further detail by reference to FIG. 11, is used to combine dot products from two separate cycles if a dot product is too large to be computed in a single cycle across the cores of the computation fabric. In addition, if a particular filter slice needs to be split across multiple cores (because of too many non-zero weight values), the dot product input processing circuit is configured to account for that by using inputs from multiple dot product buses. Furthermore, some embodiments compute dot products with activations that are double the size of the standard quantized activation (e.g., 8-bit rather than 4-bit) by using dot products from multiple cycles and bit-shifting the first set of input data. As described in detail below, some embodiments use other techniques (i.e., using half of the number of activations within a core) to compute dot products of larger activation values when possible.

The math function input processing circuit 1010 is used to perform operations for neural network layers that do not use dot products (i.e., that are not part of convolutional or fully-connected layers). Neural network layers that do not use dot products include, for example, pooling layers of convolutional networks (e.g., average pooling and max pooling layers) as well as layers that perform element-wise operations (e.g., element-wise operation layers or activation by activation matrix multiplication layers). In some of these embodiments, the cores provide input values directly to the math function input processing circuits 1010 without computing dot products and the math function input processing circuits are configured to perform the appropriate operations on these inputs.

The output of each of these circuits 1005 and 1010 is sent to a multiplexer 1015, and a set of configuration bits is used to select between these two possible inputs. The selected input value is then sent to an accumulation circuit 1017. Though FIG. 10 shows a single dot product input processing circuit 1005, math function input processing circuit 1010, and post-processing unit 1000, it should be understood that these structures are repeated for each lane of these circuits within a cluster. The accumulation circuit 1017, on the other hand, receives the values from multiple dot product input processing circuits 1005 and math function input processing circuits 1010. Some embodiments include a single accumulation circuit 1017 per cluster that receives all values from all of the dot product input processing circuits or math function input processing circuit while other embodiments include multiple such circuits (e.g., 4 circuits, each receiving data from one-fourth of the input processing circuits). In some embodiments, the accumulation circuit 1017 can be configured to accumulate data across these inputs, thereby reducing the number of total computed values. The accumulation circuit 1017 can also store intermediate values in a register and accumulate data across multiple clock cycles (e.g., when performing matrix multiplication for larger input activation matrices). The accumulation circuit 1017 also can be configured to act as a pass-through, outputting the same number of values that it receives without accumulating across lanes at all.

The value output by the accumulation circuit 1017 (in many cases, the unmodified output of either the dot product input processing circuit 1005 or the math function input processing circuit 1010) is sent to an adder 1020 and then to a multiplier 1025. For dot product outputs, the adder 1020 adds the bias of the linear function for the node and the multiplier 1025 multiplies this by the scaling factor for the linear function. The value sent to the adder 1020, in some embodiments, is a combination of (i) the bias value computed during the training of the neural network, (ii) a number of negative weight values, and/or (iii) a batch normalization shift factor. As described in more detail below, in some embodiments the weight values are ternary (i.e., either 0, a positive value, or a negation of that positive value) or quinary (the ternary values as well as double the positive and negative values).

The partial dot product calculation in the cores treats these ternary weights as {0, 1, and −1} in some embodiments, and uses a ternary MAC circuit that performs one's complement addition to account for negative weights. The bias factor in the configuration data then accounts for the number of negative weights, to effectively turn the one's complement addition into two's complement addition. Furthermore, for larger input and output values (e.g., 8-bit input and output values), the bias factor has to add a larger amount for the negative weights. For the 8-bit case (in which the dot product of the weights with the most significant nibble of the inputs is shifted by 4 bits), the bias factor adds 17 for each negative weight. In addition, if using quinary weights, the bias factor adds 2 for the appropriate negative weights. This bias factor, in some embodiments, is precomputed by the compiler and provided as configuration data to the adder 1020.

The scaling value sent to the multiplier 1025 as configuration data, in some embodiments, is a combination of at least (i) a batch normalization scaling value computed during the training of the neural network (which is often 1) and (ii) the positive value of the ternary weight (which was removed in order to scale the weight values used in the dot product to 1 and −1).

In some embodiments, a multiplexer is used to select between an added value specific to the post-processing unit (i.e., allowing for different bias/shift values for different computation nodes in a layer) and an added value shared across all of the post-processing units in a layer. In general, convolution and fully-connected layers use a node-specific added value (especially when accounting for the number of negative weights), but pooling and element-wise operator layers may use the same value for all of the nodes (often zero). For the scaling factor, a set of multiplexers is used in some embodiments to select between a node-specific scaling value and two possible shared scaling values. In some embodiments, pooling layers will use the same shared scaling value for each node (e.g., to divide by the number of nodes over which average pooling is performed), but at the end of a row will need a different scaling value to account for padding.

The right bit shift operator 1030 ensures that, post-multiplication, the value has the desired precision (i.e., shifting the binary point). As an example, a number with three bits before the binary point and two bits after multiplied by a similar such number would result in a number with six bits before the binary point and four bits after. However, if a number with only two bits after the binary point is desired, the right bit shift removes the last two bits. In some embodiments, the right bit shift receives a set of configuration bits that map to different allowed precisions.

The truncator 1035 performs a clipping operation in some embodiments to truncate the output value of the linear operator down to a desired number of bits. In some embodiments, this can be a 4-bit value, a 5-bit value (a 4-bit signed value), an 8-bit value, or a 16-bit value. In such embodiments, the output has 16 wires, and values of less than 16-bits have 0s for the appropriate number of most significant bits. In other embodiments, the maximum output is 8 bits, in which case 4-bit, 5-bit, and 8-bit values are possible outputs. Different clipping operations that may be used, in different embodiments, can include a modulo operation (that effectively zeroes out a particular number of the most significant bits), clipping values above a maximum down to that maximum (e.g., if outputting a 5-bit value, all values above 15 are clipped down to 15 (1111), etc. In some embodiments, the truncator 1035 receives (as output from the right bit shifter 1030) more bits than it outputs (e.g., receiving 32 bits but outputting a maximum of 16 bits). The truncator 1035 can be configured to implement a ReLU activation function, by clipping negative values to 0 and any values larger than a maximum (e.g., 15, 255, etc.) to that maximum value.

The full (e.g., 16-bit, 8-bit) output of the truncator 1035 is passed to the multiplexer 1045, while a subset or all of the output bits (e.g., 8 bits) are also split off to the piecewise linear function 1040. The piecewise linear function 1040 implements the non-linear activation function of some embodiments, as well as other functions that can be approximated through a piecewise linear function (e.g., exponential functions used to perform a softmax operation). The piecewise linear function circuit 1040 receives control bits as well as configuration information that defines a particular piecewise linear function. In different embodiments, the configuration data defines the segments of a piecewise linear function by providing intercept data, slope data, segment length data, or a combination thereof. The piecewise linear function configuration, in some embodiments, is the same for all nodes in a layer, which only requires one set of slope/intercept/endpoint values to be sent as configuration data. It should be noted that, in other embodiments, a lookup table or other circuit block is used rather than the piecewise linear function to implement the activation functions. The multiplexer 1045 output is the neural network node output, which is gated by a valid signal (not shown) to indicate when the post-processing unit is outputting a completed activation value to be carried by the activation write bus to the appropriate core and stored in the activation memory of that core.

FIG. 11, as mentioned, conceptually illustrates a dot product input processing circuit 1100 of some embodiments. As shown, the circuit 1100 receives the output of two dot product bus lanes (dot product input A and dot product input B). These inputs are each gated by AND gates 1105 and 1110, which use enable bits from the cluster controller to specify which dot product to use as input (or both), in certain cases. As mentioned above, in some embodiments each post-processing unit receives the output of a different corresponding dot product bus lane as its first dot product input (i.e., DP input A). That is, if there are N filter slice buffers and adder trees in each core as well as N dot product bus lanes and N post-processing units in a cluster, then the nth post-processing unit receives its first dot product from the nth dot product bus lane (which aggregates the partial dot products computed by the nth adder tree of each core). The second dot product input (i.e., DP input B) for each post-processing unit is from a different lane and can be used when filter slices need to be split across two different filter slice buffers (e.g., due to having too many non-zero weight values).

In this example, the activation size has the option of being either a first size (e.g., 4-bit) or twice that size (e.g., 8-bit). In the simplest case, in which (i) the dot product for a node has few enough input/weight values to be performed in one cycle, (ii) the activation size is the smaller size, and (iii) there are no sparsity violations with the filter slices assigned to each core, then the remainder of the circuit 1100 effectively acts as a pass-through for the first dot product input. The AND gate 1105 enables this first dot product input, while the AND gate 1110 gates the second dot product to 0. However, in other situations, the adder 1115, left-shift operator 1120, and adder 1125 enable the dot product calculation for a neural network node to be completed and provided to the other post-processing operations. In addition, the left shift circuit 1120 can also be used to align a dot product to ensure that the binary point is in the correct location for the input value. The operations of these circuits to compute more complex dot products are described in greater detail in U.S. Pat. No. 11,049,013, which is incorporated herein by reference.

Figure 12:
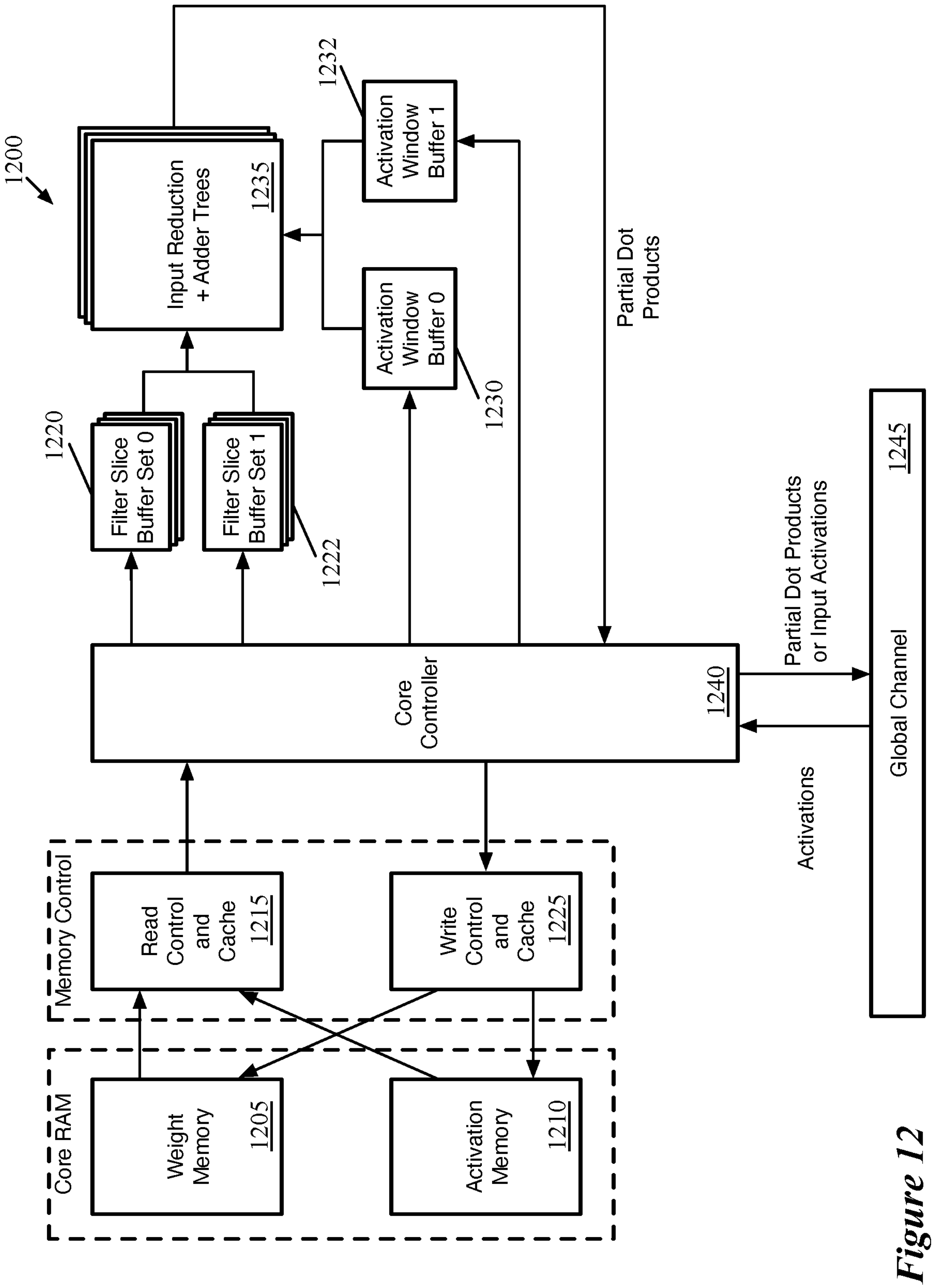
FIG. 12 conceptually illustrates the data flow within one of the cores of some embodiments for a dot product computation.

As mentioned, the dot product cores perform the majority of the dot product computation on the chip fabric of some embodiments. FIG. 12 conceptually illustrates the data flow 1200 within one of the cores of some embodiments for a dot product computation. This data flow will be described with certain specifics (e.g., weight and activation data sizes, number of separate adder trees simultaneously computing partial dot products, etc.) as examples, but it should be understood that different embodiments may use different sizes for weight data and/or activation values, different numbers of adder trees within a core, etc.

In some embodiments, the dot product cores store weight data values (e.g., weights for multiple nodes in multiple layers) in the weight memory 1205 and activation values in the activation memory 1210. These activation values can be the result of and/or inputs to convolutional layers, fully connected layers (which are effectively a type of convolutional layer in which the kernel is the size of the input grid), element-wise operation layers, pooling layers, matrix multiplication layers, etc. In addition, certain types of layers (e.g., a softmax layer) require storage of intermediate values and are executed by the chip fabric as multiple individual layers, in which case the activation memory 1210 stores these intermediate values.

In some embodiments, as shown, these memories 1205 and 1210 are part of a single block of memory for the core (e.g., banks of random access memories such as SRAMs). As described above, in some embodiments the core memory is part of the unified memory shared between the chip fabric, input processing circuit, and microprocessor. The manner in which the weight data and activation values are stored in some embodiments is described in detail below by reference to FIGS. 22-27.

The weight values are part of the network parameters and thus are determined at compile time (and do not change at runtime), while the activation values (the input values to a particular node or set of nodes being computed) are the output values from a previous computation (or, for the first layer, are otherwise based on the network input) and thus are determined at runtime. Thus, the weight memory 1205 is often larger than the activation memory 1210 (e.g., 512 KB to 64 KB), as the activation memory is at least partly overwritten for each new layer of the neural network while the weight memory 1205 stores the weights for all of the dot product computations performed by the core (or a subset of the dot product computations, if the number of weights is large enough that only a portion can be stored in the weight memory 1205 at one time). In some embodiments, the weights are encoded in such a manner that (at least for some networks) less than 1 bit of the weight memory 1205 is allocated per weight value (e.g., by encoding the weight values in such a way that many of the zeros are removed, while storing additional data for each non-zero weight value).

The read controller and read cache 1215 reads data from the weight memory 1205 into sets of filter slice buffers 1220 and 1222 that store the weight data to be used in the dot products. In some embodiments, as mentioned, a filter is a set of weights that is used to compute a dot product with a set of inputs (e.g., in order to identify a specific feature type within a portion of an image). Depending on the number of channels of the activation inputs, filters may be divided into multiple slices. Each filter, in some embodiments, is used repeatedly to compute dot products with numerous activation windows (e.g., contiguous sets of activation inputs). Some embodiments load data for 40 (or 36) weight values into each filter slice buffer, which are actually used to compute 128 dot product components (with the requirement that at least 75% of the weight values be zero, the actual adder tree only receives 40 inputs for each buffer of 128 activation values through the use of input reduction circuits, as described in detail below).

Some embodiments include both primary filter slice buffers 1220 and secondary filter slice buffers 1222, as shown in this figure. In a given clock cycle, at most one of these sets of filter slice buffers is used to compute dot products (e.g., using multiplexers to select only one of the sets of weight value data). For simpler dot product computations, only the primary filter slice buffer 1220 is needed, so there is no need to load weight values into the secondary filter slice buffers 1222. However, in other cases, both sets of filter slice buffers may be used, as described below (e.g., when dot products are too large to be computed in a single clock cycle using only the primary buffers).

The read controller and cache 1215 also reads data (layer input values) from the activation memory 1210 into the activation window buffers 1230 and 1232. In addition, the read controller 1215 arranges the input values within the activation window buffers 1230 and 1232 in some embodiments to match up with the weight values in the filters. In some embodiments, the input values in an activation window read into the buffers 1230 (and 1232) include all of the values (as opposed to the smaller percentage of values needed for a particular filter), because the activation window is multiplied by numerous filters simultaneously (i.e., some or all of the filters stored in the filter slice buffers). As such, even if only a particular group of 40 activation values from the activation window buffer 1230 reach a first adder tree, in many cases all of the activation values in the activation window buffer (e.g., all 128 values) are passed through to at least one of the adder trees 1235. The input values, in some embodiments, are quantized to have a fixed size (e.g., 4 bits), or set of fixed sizes (e.g., 4 bits or 8 bits) for ease and simplicity of computation.

As with the sets of filter slice buffers, some embodiments include both a primary activation window buffer 1230 and a secondary activation window buffer 1232. In a given clock cycle, at most one of these sets of activation window buffers is used to compute dot products (e.g., using multiplexers to select only one of the sets of activation input values). For simpler dot product computations, only the primary activation window buffer 1230 is needed, so there is no need to load activation inputs into the secondary activation window buffer 1232. However, in other cases, both activation window buffers may be used (e.g., when dot products are too large to be computed in a single clock cycle using only the primary buffer). In some embodiments, as shown, the same read controller and cache 1215 is used to read data from both the weight memory partition 1205 and the activation memory partition 1210. In such embodiments, the cache is used to store weight value data when reading the weights from the weight memory 1205. For each pass, this memory control circuit first reads the encoded weight data and provides this data to the core controller 1240 (which decodes weight data and loads the decoded weight data into the filter slice buffers), then reads input values and provides these values to the core controller 1240 (for the core controller to load the input values into the activation window buffer(s) interspersed with the computation of dot products by the adder tree circuits 1235).

The input reduction circuits and adder trees 1235 compute the dot products between the weight values represented in the filter slice buffers 1220 and the input values in the activation window buffer 1230. The details of these partial dot product computation circuits of some embodiments are described below by reference to FIGS. 13-20. These adder trees 1235 output partial dot products (e.g., larger values such as 10-bit or 15-bit values) that are provided to the dot product bus, which combines the partial dot products with other partial dot products as described above. In some embodiments, the number of filter slice buffers in each of the sets 1220 and 1222 is equal to the number of input reduction circuit sets and adder trees 1235 in the core, as well as the number of dot product bus lanes, dot product input processing circuits, math function input processing circuits, post-processing units, and activation write bus lanes in each segment. Thus, for a typical neural network computation node, the partial dot products computed by the adder trees 1235 in multiple cores having a particular index are aggregated by the dot product bus lane with the same index, that aggregated dot product is provided to one of the dot product input processing circuits having the same index (i.e., the dot product input processing circuit with that index in one of the channel segments) which performs any necessary aggregation across multiple clock cycles for the dot product, then provided for post-processing to the corresponding post-processing unit with the same index, and the output of the post-processing unit is transported by the activation write bus with the same index to its destination core.

The core controller 1240 configures and coordinates the operation of the read and write controllers 1215 and 1225 in addition to the filter slice buffers 1220, activation window buffer 1230, and adder trees 1235. Furthermore, the core controller 1240 receives the input activations and weights from the read controller 1215 and loads them into the correct slots in the sets of filter slice buffers 1220 and 1222 and the activation window buffers 1230 and 1232. Lastly, when the adder trees 1235 output their partial dot product values, the core controller 1240 sends these values to the dot product bus in the global channel 1245. Alternatively, the core controller 1240 directs the input activations to the ALU bus in the global channel for non-dot product computations (e.g., the element-wise multiplication used in matrix multiplication layers). When the activations for the next layer are output, the activation write bus carries these values to the core controller 1240, which provides them to the write controller and cache 1225 to be written to activation memory 1210.

To reduce the circuit area and power required for dot product computations (which use the majority of resources for neural network inference), the partial dot product computation circuits of some embodiments include sets of input reduction circuits that map each of a first number of input values to a second (smaller) number of dot product inputs (e.g., mapping 128 input values to 40 inputs), such that the dot product computations are smaller (and less data is needed to store the weight values) while ensuring that, for each filter, all input values with non-zero corresponding weight values are provided to the adder tree for that filter.

In some embodiments, for each adder tree (and thus for each filter slice), the corresponding input reduction circuit set includes at least two separate sets of wires for each activation buffer slot (which typically holds an input value), with each set of wires for a given buffer slot connected to a different input reduction circuit (so that each input value is provided to at least two different input reduction circuits for a given adder tree). With a guarantee of at least 75% weight sparsity (i.e., at least 75% of the weight values for any set of input values are zero), the number of input reduction circuits (and thus the number of dot product inputs) is set at 25% (or slightly more than 25%, for redundancy) of the number of input values that can be loaded in the activation window buffer. In some embodiments, the weight sparsity is guaranteed by the training algorithm used to train the weights to perform a specific purpose, and the IC is adaptable for any set of weights that meets the guarantee.

Figure 13:
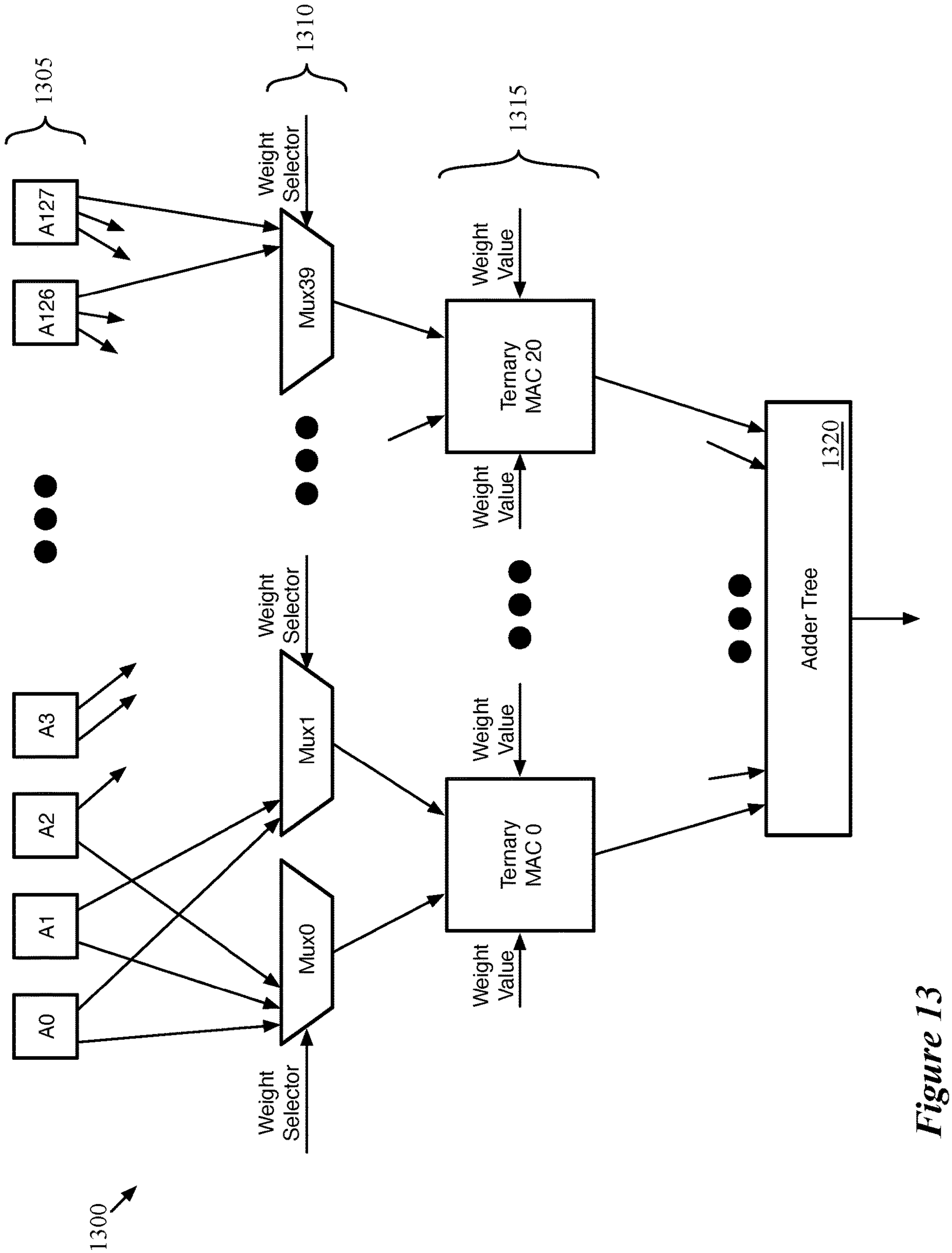
FIG. 13 conceptually illustrates an example of a partial dot product computation circuit for a guaranteed weight sparsity of at least 75%.

FIG. 13 conceptually illustrates an example of such a partial dot product computation circuit 1300 (for a single filter slice), including input reduction circuits 1310 and an adder tree 1320. The wiring of the input values for this dot product computation circuit is designed to optimize the likelihood that, so long as the weights meet the sparsity requirement, the compiler can ensure that at runtime each input value with a nonzero corresponding weight value is provided to a different dot product input for nearly any arrangement of the nonzero weight values. As shown, the dot product computation circuit 1300 includes a set of activation input values 1305, a set of input reduction circuits 1310, a set of ternary multiplier-accumulator (MAC) circuits 1315, and an adder tree 1320.

In this example, the dot product computation circuit 1300 includes 128 input value slots 1305. In different embodiments, the activation window buffer may have different sizes (e.g., 144 input value slots), which defines the size of the partial dot product computation. Each input value slot (e.g., each location in the activation window buffer) is connected to at least two of the forty input reduction circuits 1310. In this example, at least 70% sparsity is assumed for each set of weight values, and thus the 128 activation inputs can be reduced to 40 inputs for the actual dot product computation. This significantly reduces the circuit area required for the dot product computation, as the number of adders is reduced by ~69% (the adder tree effectively starts with 40 values rather than 128 values), in addition to reducing the amount of weight data that is stored in memory.

The input reduction circuits 1310 are multiplexers that each have eight inputs and receive a set of select bits (the weight selector input) from the core controller that specifies which of these eight inputs to pass to the dot product computation. In some embodiments the weight selector input is a 3-bit value that is stored as part of the weight data for each non-zero weight. Having forty 8-input multiplexers 1310 allows for 320 sets of wires from the activation buffer input slots 1305 to the multiplexers 1310, which allows for two wires for half of the input slots 1305 and three wires for the other half of the input slots.

The wire sets from the activation inputs 1305 to the multiplexers 1310 are arranged such that the compiler can verify that each input value with a nonzero corresponding weight is provided to a different one of the multiplexers 1310. The weight values are not known at the time of IC manufacture, and thus the wiring design is resilient to different arrangements of the nonzero weight values (that meet the sparsity requirement). Some embodiments use a cuckoo hashing algorithm (or other algorithm) to optimally map the wire sets from the activation inputs 1305 to the multiplexers 1310. In some embodiments, this algorithm computes two (or three) hashes (e.g., with two or three different hash functions) for each of the activation input locations 1305 that map to two (or three) different multiplexers 1310 (e.g., by computing the hash modulo 40). Each activation input location 1305 is wired to these two (or three) different multiplexers 1310 determined by the hashes. If one of the hash functions maps an activation input to a multiplexer that already has eight inputs, then some embodiments compute a third hash function for either that activation input or one of the activation inputs previously mapped to the multiplexer. In some embodiments, the arrangement of the wires is the same for each of the filter slices in each of the cores (i.e., if input buffer slot 43 is wired to multiplexer 3 and multiplexer 8 in one set of input reduction circuits for one filter slices, then this input buffer slot is also wired to multiplexers 3 and 8 for each other set of input reduction circuits).

Other embodiments use other techniques to select the multiplexers to which each input value is wired (e.g., having a chip designer select the arrangement of the wires), so long as each input is wired to two different multiplexers (and thus each multiplexer has input wires from eight different activation inputs). Additional constraints may be imposed as well, such as ensuring that no two activation inputs are wired to the same pair (or group of three) of multiplexers. In addition, it should be understood that these techniques can be applied to dot product computation circuits with different numbers of inputs, different numbers of multiplexers, and different numbers of wires per input.

The weight values are known before the network is executed by the computation fabric (i.e., at compile time), and thus the compiler can determine which of the two (or three) multiplexers that receive each input value with a non-zero corresponding weight at runtime will select that input value, such that each such input value is selected by exactly one multiplexer. In some embodiments, the compiler uses the same cuckoo hashing algorithm for this mapping as was used to determine the wiring. The select bits for the multiplexers 1310 are determined based on which of the inputs to the multiplexer carry input activation values with nonzero corresponding weight values, and are stored in the filter slice buffer. In some embodiments, these multiplexer select bits are stored in memory for each non-zero weight value (for multiplexers that do not receive any inputs corresponding to non-zero weights, the multiplexer select bits do not matter, and thus do not need to be stored in the encoded weight data). These multiplexers 1310 provide their output to a set of ternary multiply-accumulator (MAC) circuits 1315. The ternary MAC circuits effectively form the leaves of the dot product computation, and the number of such circuits is half the number of multiplexers 1310 (18 ternary MAC circuits 1315 in this example).

In some embodiments, the weight values for a particular dot product computation are all either zero, a positive value, or the negation of the positive value. In this case, the dot product does not require any actual multiplication at the leaves of the computation, as the positive and negative weight values can be treated as 1 and −1, with a single multiplication by the positive value afterwards. Similarly, if the weight values are all either zero, a positive value, the negation of the positive value, twice the positive value, or twice the negation of the positive value, then the positive and negative weight values can still be treated as 1 and −1, with input values that have corresponding weights of 2 and −2 being doubled. Removing the multiplication at the leaves saves significant circuit area for a chip with numerous such computation circuits.

To combine two input values while accounting for ternary weight values, the ternary MAC circuits 1315 add the two input values from the multiplexers 1310 while also receiving as inputs the corresponding weight data for these input values. In some embodiments, as described further below, each ternary MAC circuit receives two bits of weight data for each of its inputs. If both of the weights are positive, then the ternary MAC circuit outputs the sum of the two input values (and outputs the negative of this sum if both of the weights are negative). If only one of the weight values is negative, then its corresponding input value is subtracted from the other input value (with a positive corresponding weight value), and if both of the weight values are zero, then the ternary MAC circuit output is zero. Lastly, if only one of the weight values is zero, then the ternary MAC circuit outputs the input value (or the negative of the input value) with the corresponding nonzero weight value. The negative values are accounted for in the bias computation within the post-processing unit, as described above.

The outputs of the ternary MAC circuits provide the inputs to the adder tree 1320 that computes the output for the partial dot product computation. In some embodiments, this adder tree is a standard adder tree circuit that adds pairs of values over several layers. For example, the adder tree 1320 receives 20 inputs for 10 adders, which in turn provide outputs to 5 adders (with an additional output to be added in later), etc. In some embodiments, the inputs to the ternary MACs 1315 are 4-bit inputs (the length of the quantized activation values), and the ternary MACs 1315 output 6-bit values. Other embodiments receive 5-bit inputs or 6-bit inputs. The adder tree 1320 receives these (e.g., 6-bit) values and outputs a 10-bit value after several stages of addition. It should be noted that this description refers to handling of signed 4-bit input values. Some embodiments can also handle unsigned input values by converting them to signed input values before performing the addition operations. For example, some embodiments output and store 4-bit outputs, which can be signed or unsigned. Before performing the addition operations, an additional bit is added that either sign-extends (to convert signed 4-bit inputs to signed 5-bit inputs) or 0-pads (to convert unsigned 4-bit inputs to signed 5-bit inputs). Some embodiments also configurably double the inputs (converting 5-bit inputs to 6-bit inputs) when handling quinary weights.

As noted, ternary weights can be described as $\{0, \alpha_k, -\alpha_k\}$ (where $\alpha_k$ can vary by layer or even by filter) while quinary weights can be described as $\{0, \alpha_k, -\alpha_k, 2\alpha_k, -2\alpha_k\}$. If the $\alpha_k$ value is incorporated into a scaling factor applied to the entire dot product, then the ok value can be treated as 1 and the input values can be added or subtracted without multiplication when using ternary weights. However, the use of quinary weights means that a multiplication factor of 2 should be applied to the input values with weights equal to $-2\alpha_k$ or $2\alpha_k$.

Figure 14:
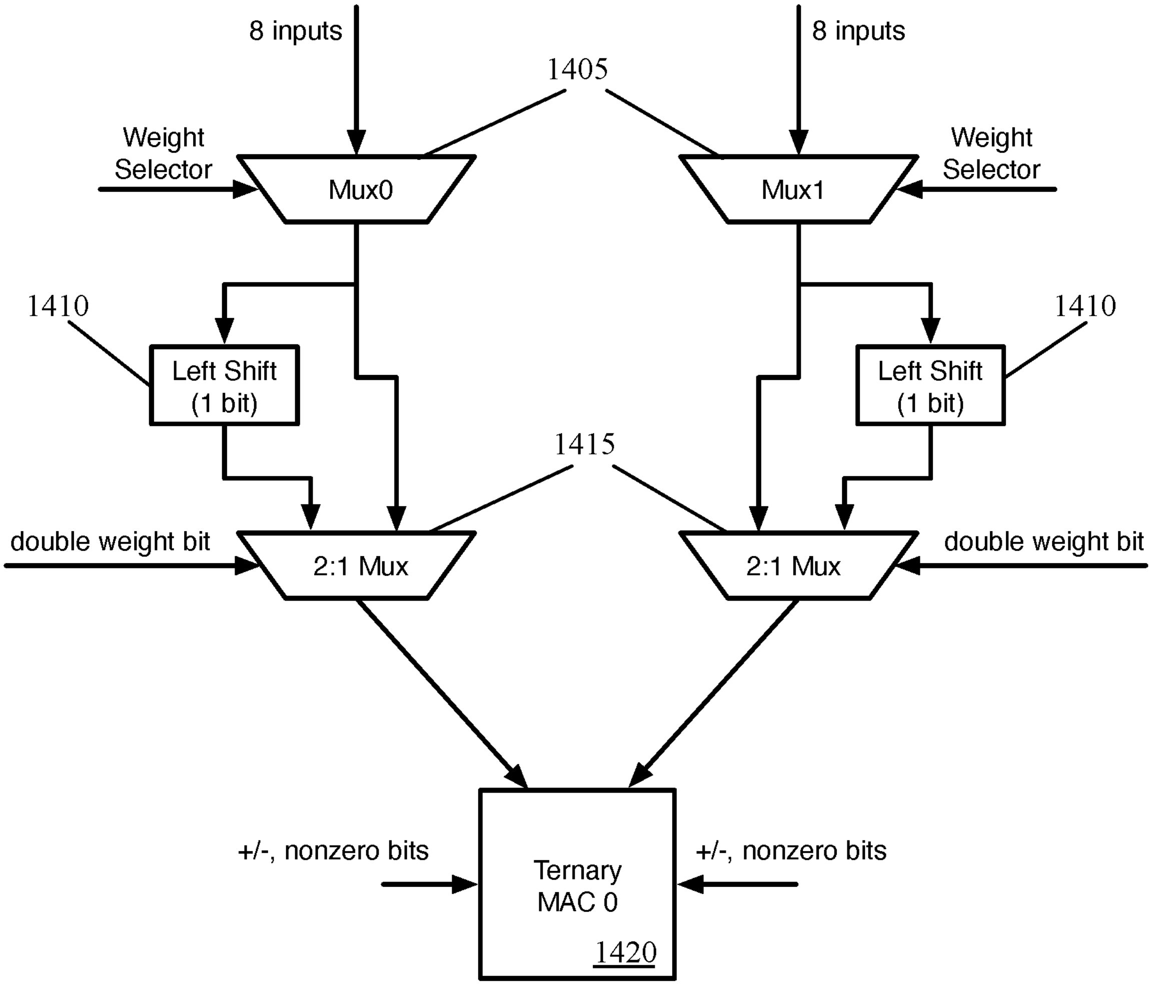
FIG. 14 conceptually illustrates the configurable doubling of input values for handling of quinary weights in some embodiments.

FIG. 14 conceptually illustrates the configurable doubling of input values for handling of quinary weights in some embodiments. To handle this configurable doubling with minimal added circuitry and added weight data, some embodiments insert a left shift operation and a selection circuit between each input reduction circuit and the ternary MAC circuits. This figure illustrates two input reduction circuits 1405 (e.g., 8:1 multiplexers) that each receives inputs from eight activation buffer slots and outputs one of these input values to the adder tree (e.g., a sign-extended 5-bit input value). It should be understood that, in some embodiments, the structure shown in this figure is repeated for each of the input reduction circuits (for each set of input reduction circuits, in each core).

As shown, each input value output by one of the input reduction circuits 1405 is provided to (i) a left shift circuit 1410 that shifts the input value left by one bit (i.e., effectively doubling the input value while adding one bit to the input value) and (ii) a selection circuit 1415 (e.g., a 2:1 multiplexer). The output of the left shift circuit 1410 is also provided to this selection circuit 1415 which, based on a single bit of weight information selects either (i) the original input value or (ii) the doubled input value. In some embodiments, when using quinary weights, for each non-zero weight value, the encoded weight data stores a single bit that indicates whether the corresponding input value should be doubled (i.e., whether the weight value is $2\alpha_k$ or $-2\alpha_k$ rather than $\alpha_k$ or $-\alpha_k$). As described below, another bit indicates whether the non-zero weight value is positive or negative. This adds one bit per non-zero weight value to the weight storage but provides the flexibility and network expressivity enabled by using quinary rather than ternary weights. The outputs of the selection circuits 1415 are then provided to a ternary MAC circuit 1420 that is the leaf node of an adder tree, as described above.

As noted above, some embodiments enable the use of larger activation values (i.e., double the size of a standard activation value for the chip fabric, such as using 8-bit rather than 4-bit values) by loading input values into both primary and secondary activation buffers, then using multiple clock cycles to compute a single dot product. In some embodiments, at least a subset of these larger-activation dot product computations can be calculated in a single clock cycle by dividing, for each filter slice, (i) the set of input reduction circuits and (ii) the adder tree into two halves. The output of one half of the adder trees is then configurably multiplied by a constant value (e.g., multiplied by 16 if using 8-bit values instead of 4-bit values).

Figure 15:
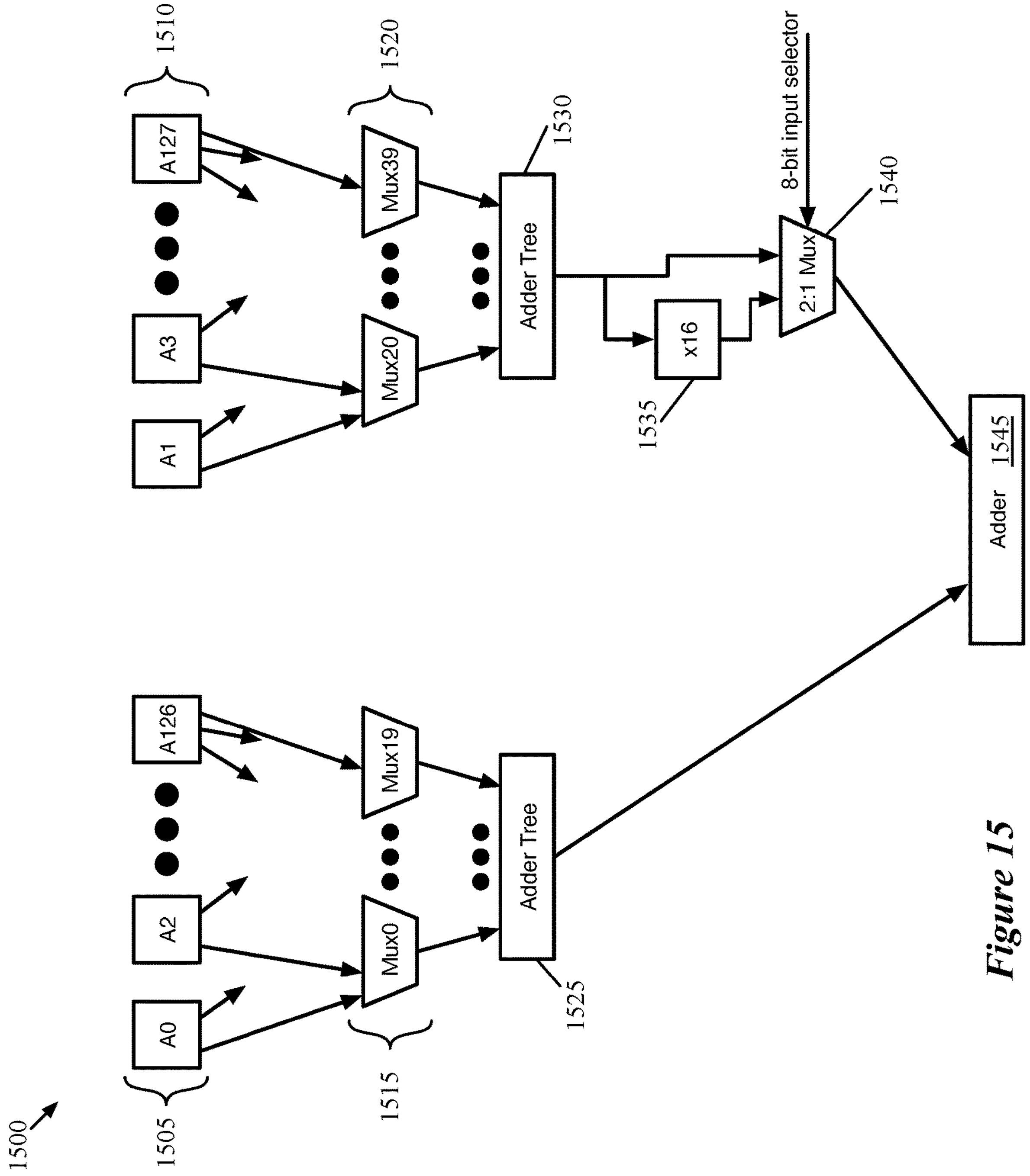
FIG. 15 conceptually illustrates a partial dot product computation circuit of some embodiments with the set of input reduction circuits and adder tree split into two halves to accommodate dot products with double the standard size activation values in a single clock cycle.

FIG. 15 conceptually illustrates a partial dot product computation circuit 1500 of some embodiments with the set of input reduction circuits and adder tree split into two halves to accommodate dot products with larger (double the standard size) activation values in a single clock cycle. In order to compute a dot product for a computation node in a single clock cycle, the partial dot product computation circuit 1500 requires that a filter slice have at most 20 (rather than 40) non-zero weight values.

The partial dot product computation circuit 1500 includes an even half activation window buffer 1505, an even subset of input reduction circuits 1515, and an even adder tree 1525 as well as an odd half activation window buffer 1510, an odd subset of input reduction circuits 1520, and an odd adder tree 1530. In addition, the partial dot product computation circuit 1500 further includes a multiplier (left shift) circuit 1535 and selection (2:1 multiplexer) circuit 1540 for configurably multiplying the output of the odd adder tree 1530 by a constant value (16), as well as an adder 1545 to add the outputs of the even and odd adder trees (with the output of the odd adder tree 1530 having been configurably multiplied by 16).

As further described below, the activation values are stored in memory in such a way that when the standard (e.g., 4-bit) values are loaded into the activation window buffer, each activation buffer slot holds a single input value. When larger (e.g., 8-bit) activation values are used, these are stored contiguously, and the least significant half (e.g., lower 4 bits) of each activation value are loaded into a slot in the even half activation window buffer 1505 while the most significant half (e.g., upper 4 bits) of each activation value are loaded into a slot in the odd half activation window buffer 1510. Thus, for instance, a first activation value is divided between buffer slot A0 in the even half buffer 1505 and buffer slot A1 in the odd half buffer 1510, a second activation value is divided between buffer slot A2 in the even half buffer 1505 and buffer slot A3 in the odd half buffer 1510, and so on. This allows for half the number of input values (e.g., 64) to be loaded into the overall activation window buffer.

The even half 1505 of the input buffer slots are wired to provide their input values to the even subset of the input reduction circuits 1515 (numbered here as Mux0-Mux19), while the odd half 1510 of the input buffer slots are wired to provide their input values to the odd subset of the input reduction circuits 1520 (numbered here as Mux20-Mux39). That is, rather than having 128 input values wired into 320 receive points (40 multiplexers with eight inputs each) per filter slice, this structure has 64 input values wired into 160 receive points. In both of these examples, half of the input values are wired to exactly two of the input reduction circuits while the other half of the input values are wired to exactly three of the input reduction circuits.

The wiring pattern connecting the slots of the even half activation window buffer 1505 to the even subset of input reduction circuits 1515 is duplicated for connecting the slots of the odd half activation window buffer 1510 to the odd subset of input reduction circuits 1520. That is, for each even half activation window buffer slot that is wired to two specific input reduction circuits in the even subset 1515, the corresponding odd half activation window buffer slot is wired to the two corresponding input reduction circuits in the odd subset 1520. Similarly, for each even half activation window buffer slot that is wired to three specific input reduction circuits in the even subset 1515, the corresponding odd half activation window buffer slot is wired to the three corresponding input reduction circuits in the odd subset 1520. This same wiring pattern is also repeated for each of the partial dot product computation circuits in each core.

When large (e.g., 8-bit) activation values are used, the same selection is made by each pair of corresponding input reduction circuits in the two subsets 1515 and 1520. That is, if the least significant half of a particular activation is selected by a particular input reduction circuit in the first subset 1515, then the most significant half of that same activation is selected by the corresponding input reduction circuit in the second subset 1520.

Figure 16:
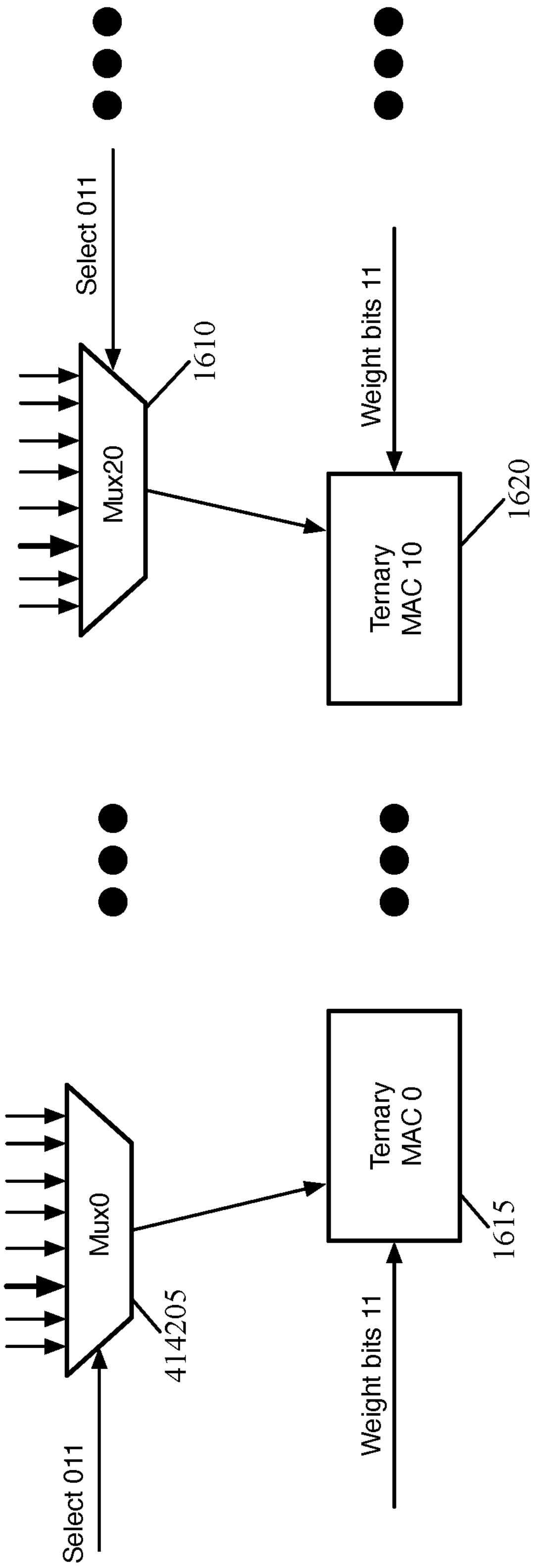
FIG. 16 conceptually illustrates corresponding input reduction circuits selecting most significant and least significant halves of the same activation value.

FIG. 16 conceptually illustrates this corresponding selection in practice. In this figure, a first multiplexer 1605 (i.e., the first multiplexer in the even subset of input reduction circuits 1515) receives eight inputs (i.e., the least significant halves of eight different activation values) and a corresponding second multiplexer 1610 (i.e., the first multiplexer in the odd subset of input reduction circuits 1520) receives eight corresponding inputs (i.e., the most significant halves of the same eight activation values). The same selection bits (011, in this example) are provided to the two multiplexers (e.g., based on the stored encoded weight data for the filter slice by which the activation values are multiplied to compute the dot product for the present computation node), causing both of these multiplexers to select the third input (i.e., the least significant and most significant halves of a single activation value). These selected half-activations are provided as input values to corresponding ternary MAC circuits 1615 and 1620, which serve as leaf nodes of the respective even and odd adder trees (i.e., adder trees 1525 and 1530). These two ternary MAC circuits also receive the same weight value information to specify the weight information for this activation value. As explained below, in some embodiments the weight value data is two bits, one of which specifies whether the weight value is non-zero and the other of which specifies whether the weight value is positive or negative (if non-zero). When handling larger (e.g., 8-bit) activations, the same weight data provided to the ternary MAC circuits of one of the adder trees (e.g., the even adder tree) is also provided to the corresponding ternary MAC circuits of the other adder tree (e.g., the odd adder tree). That is, the weight data should be the same for each half of the partial dot product computation circuit.

Returning to FIG. 15, each of the adder trees 1525 and 1530 computes a partial dot product computation as described above by reference to FIG. 13. The ternary MAC circuits that are the leaf nodes of these adder trees 1525 receive the same weights and apply these weights to the input values provided by the input reduction circuits 1515 and 1520 as described above. That is, if both weight values received by a ternary MAC circuit are positive, then the ternary MAC circuit adds the two input values. If one weight value is positive and the other negative, then the ternary MAC circuit subtracts the input value with the negative weight value from the input value with the positive weight value. Finally, if one weight value is zero, then the other input value (or its negative) is passed through the ternary MAC circuit.

The sum of the odd adder tree 1530 is configurably multiplied by a constant value, which in this case is 16 (because the activation values are 8-bit values). The output of the adder tree 1530 is provided to (i) the left shift circuit 1535 that shifts the sum by four bits (effectively multiplying the value by sixteen while adding four bits to the value) and (ii) the selection circuit 1540 (e.g., a 2:1 multiplexer). The output of the left shift circuit 1535 is also provided to this selection circuit 1540 which, based on a single bit of configuration data selects either (i) the output of the adder tree 1530 or (ii) that output multiplied by 16. In some embodiments, this single bit is stored as part of the encoded weight information for the filter slice (or for a group of filter slices, as the activation values are the same size for all filter slices in a layer). The output of the even adder tree 1525 and the odd adder tree 1530 (possibly multiplied by 16) is provided to the adder 1545 which adds the two values together as the output of the partial dot product computation circuit 1500. This output is provided to the corresponding dot product bus to be combined with corresponding partial dot products from other cores for the same filter.

The structure shown in FIG. 15, while beneficial for computing dot products of larger input values in a single clock cycle, would on its own constrain the selection of the smaller input values. Wiring, e.g., 128 input values into forty 8:1 multiplexers provides greater flexibility for the compiler to successfully identify a set of selections that ensures all of the input values with non-zero corresponding weights can be selected than wiring two separate groups of 64 input values into separate groups of twenty 8:1 multiplexers.

As such, some embodiments include a set of selection circuits that enable different wiring for larger input values and smaller input values. These selection circuits are shared between the different filter slices in a core, as the wiring is the same for each filter slice (the selection data, however, differs for each filter slice depending on its weight values). The selection circuits ensure that for larger input values each half of the input reduction circuits receives only data from the odd input buffer slots or only data from the even input buffer slots, whereas for smaller input values the data from even and odd input buffer slots is provided to multiplexers in both halves of the input reduction circuits.

Figure 17:
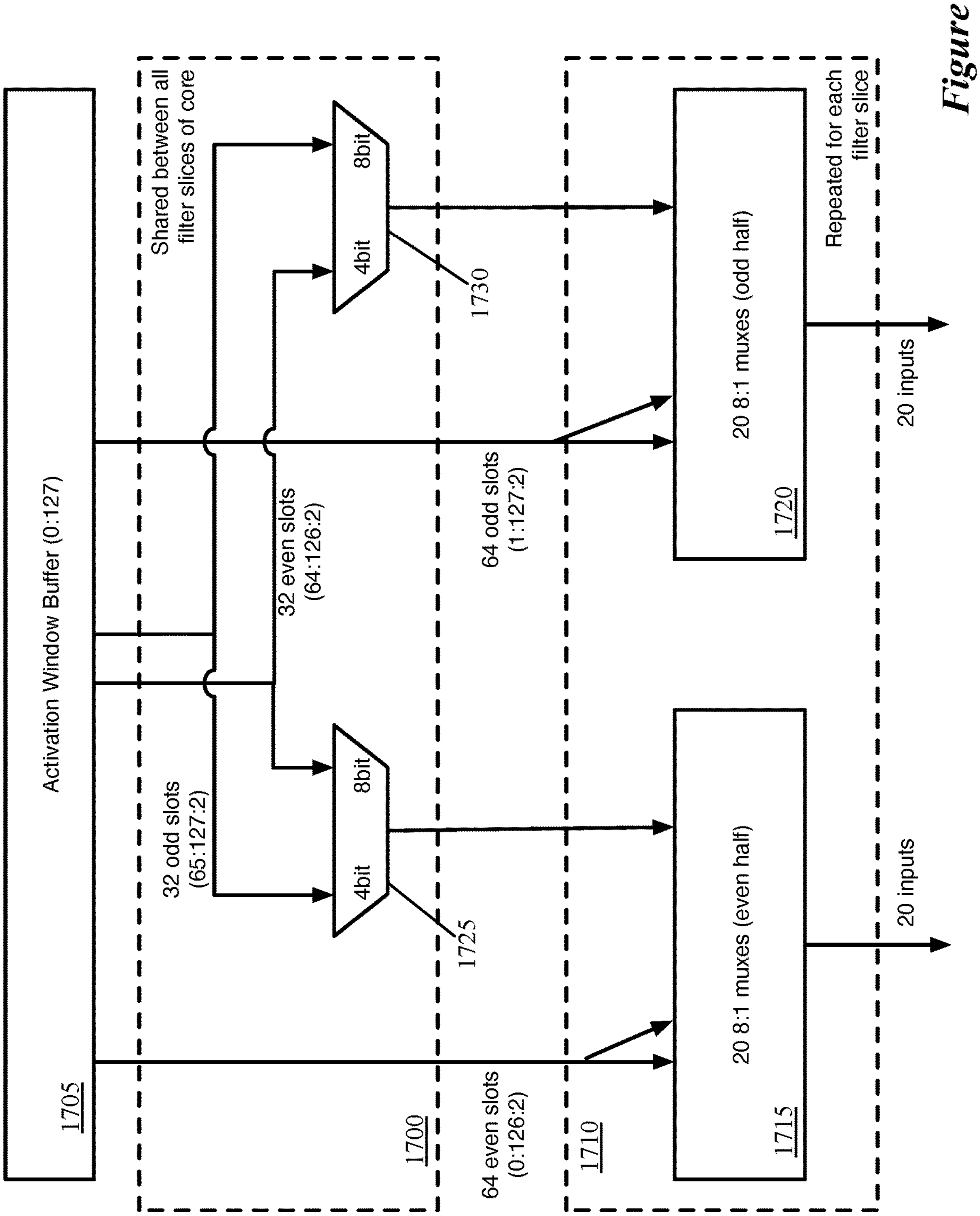
FIG. 17 conceptually illustrates a circuit structure some embodiments that enables different wiring for larger input values than for smaller input values.

FIG. 17 conceptually illustrates a circuit structure 1700 of some embodiments that enables different wiring for larger input values than for smaller input values. Specifically, the circuit structure 1700 enables, for each set of input reduction circuits associated with a separate filter slice, (i) the division of the input reduction circuit set into two separate subsets of input reductions when handling larger input values while remaining as a single undivided circuit set when handling smaller input values. This figure illustrates an activation window buffer 1705, the circuit structure 1700, and one set of input reduction circuits 1710. As described above by reference to FIG. 12, the activation window buffer 1705 is a single primary activation buffer for a dot product core. In this example, the activation window buffer 1705 includes 128 slots, numbered 0:127. In some embodiments, each slot has a width of 4 bits.

The circuit structure 1700 is a single structure for the dot product core as well, and thus is effectively part of the activation window buffer 1705. As described previously, the activation window buffer in each core is wired to many separate partial dot product computation circuits (i.e., sets of input reduction circuits followed by adder trees), each of which corresponds to a different filter slice buffer.

As shown in the figure, the set of input reduction circuits 1710 includes two subsets 1715 and 1720, with the first subset 1715 being for the even half of the activation buffer slots and the second subset 1720 being for the odd half of the activation buffer slots. Each of the 64 even slots of the activation buffer 1705 is wired to two of the 8:1 multiplexers in the first subset 1715 of the input reduction circuits, while each of the 64 odd slots of the activation buffer 1705 is wired to two of the 8:1 multiplexers in the second subset 1720 of the input reduction circuits. The wiring of these two sets of activation buffer slots is the same between the two subsets of input reduction circuits, in that each respective even slot is wired to a respective two multiplexers in the first subset 1715 and its respective corresponding odd slot is wired to the corresponding two multiplexers in the second subset 1720. For each of the subsets 1715 and 1720, these wires account for 128 of the 160 total inputs. As noted, this wiring is repeated for each of the input reduction circuit sets of the dot product core.

The circuit structure 1700 provides the other inputs to the set of input reduction circuits 1710. As shown, half of the even activation buffer slots and half of the odd activation buffer slots are wired to the circuit structure 1700, which includes two multiplexers 1725 and 1730. In this example, the activation buffer slots wired to the circuit structure 1700 are the latter half of the slots (i.e., even slots 64-126 and odd slots 65-127), but in other embodiments the first half or middle half of the slots could be wired to the circuit structure 1700.

The two multiplexers 1725 and 1730 select either the even half activation values or the odd half activation values based on whether the large (8-bit) or small (4-bit) activation values are used. When large activation values are used, the first multiplexer 1725 passes through the even activation buffer slots to the first subset 1715 of the input reduction circuits, so that these circuits receive only the even half of the activation buffer slots (two inputs from half of these even buffer slots and three inputs from the other half of the even buffer slots). In this situation, the second multiplexer 1730 passes through the odd activation buffer slots to the second subset 1720 of the input reduction circuits, so that these circuits receive only the odd half of the activation buffer slots (two inputs from half of these odd buffer slots and three inputs from the other half of the odd buffer slots).

When small activation values are used, the first multiplexer 1725 passes through the odd activation buffer slots to the first subset 1715 of the input reduction circuits. In this case, these circuits receive two inputs from each of the even activation window buffer slots and one input from half of the odd activation window buffer slots. In this situation, the second multiplexer 1730 passes through the even activation buffer slots to the second subset 1720 of the input reduction circuits. In this case, these circuits receive two inputs from each of the odd activation window buffer slots and one input from half of the even activation window buffer slots. In this case (for smaller activation values), the input reduction circuit set 1710 acts as a complete set (with half of the activation values wired to two input reduction circuits and half of the activation values wired to three input reduction circuits) rather than two separate subsets, making it easier for the compiler to find a solution that passes through all of the activation values with non-zero corresponding weight values to the adder tree.

To further ease the compiler in finding solutions to pass through all of the activations with non-zero corresponding weight values for any filter slice (so long as the number of non-zero weight values is less than or equal to the number of input reduction circuits), some embodiments enable configurable swapping of input values between neighboring input reduction circuits (i.e., between neighboring multiplexers selecting the input values for a single filter slice). Thus, if a first input reduction circuit receives eight input values with corresponding weight values equal to zero (or that are passed through other input reduction circuits) while a neighboring input reduction circuit receives two input values with corresponding non-zero weight values (that cannot be passed through other input reduction circuits), the neighboring input reduction circuit can swap one of its input values with the first input reduction circuit, enabling both of the input values to be passed through to the adder tree.

Figure 18:
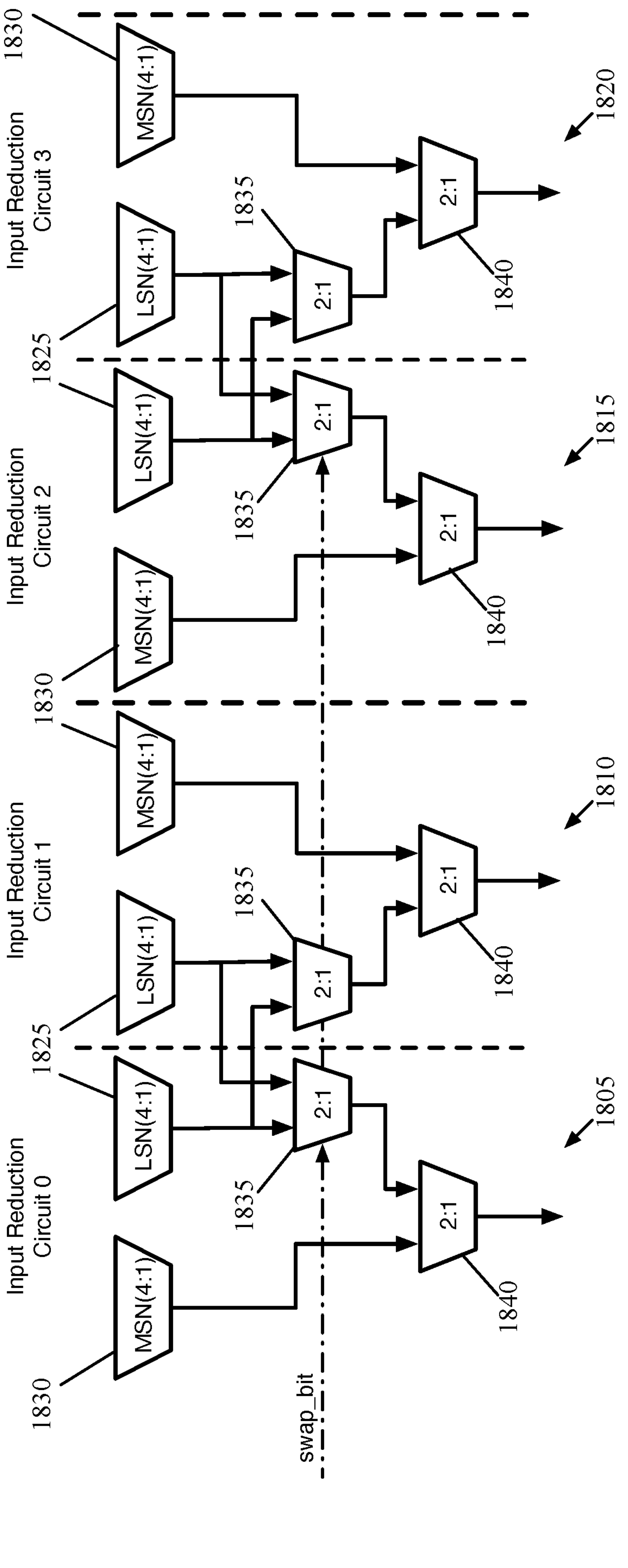
FIG. 18 conceptually illustrates the structure of input reduction circuits that enables configurable swapping of input values between pairs of the input reduction circuits according to some embodiments.

FIG. 18 conceptually illustrates the structure of input reduction circuits 1805-1820 that enables configurable swapping of input values between pairs of the input reduction circuits according to some embodiments. In this example, each input reduction circuit 1805-1820 is paired with one other (neighboring) input reduction circuit for the configurable swapping. Thus, input reduction circuits 1805 and 1810 can swap input values while input reduction circuits 1815 and 1820 can swap input values. Thus, for example, a set of 40 input reduction circuits has 20 pairs of circuits that can configurably swap input values.

As shown, rather than a simple 8:1 multiplexer, in some embodiments each input reduction circuit includes four different multiplexers. These multiplexers, for each input reduction circuit 1805-1820, include a least significant nibbles multiplexer 1825, a most significant nibbles multiplexer 1830, a swap circuit 1835, and a final selection circuit 1840. In this example, the first two multiplexers 1825 and 1830 are 4:1 multiplexers while the latter two multiplexers 1835 and 1840 are 2:1 multiplexers.

Each group of input values received by an input reduction circuit (e.g., 8 input values in the examples shown herein) is divided into two subgroups (e.g., two subgroups of 4 input values), designated as the least significant nibbles and the most significant nibbles (in the case that each input value is 4 bits wide). In some embodiments, the wiring of the activation buffer slots to the inputs is such that each input value is wired to a least significant nibbles multiplexer 1825 of one of the input reduction circuits and the most significant nibbles multiplexer 1830 of another input reduction circuit. The activation buffer slots that are wired to a third input reduction circuit are divided between the least and most significant nibbles multiplexers.

Each input reduction circuit 1805-1820 selects one of the inputs from each of the two subgroups (e.g., based on the encoded weight data that specifies these selections). For each pair of the input reduction circuits, one of the selected input values (in this case, the selected input from the least significant nibbles multiplexer 1825) is provided to both of the swap circuits 1835 of that pair of input reduction circuits. Thus, the swap circuits 1835 of the two input reduction circuits 1805 and 1810 each receive the two values selected by the two least significant nibbles multiplexers 1825 of these two input reduction circuits. Each of these swap circuits 1835 receives a swap bit specifying whether to pass through the input value from its own least significant nibbles multiplexer 1825 or that of the other input reduction circuit in the pair.

Lastly, the final selection circuits 1840 for each particular input reduction circuit 1805-1820 selects either (i) the input value selected by the most significant nibbles multiplexer 1830 of that particular input reduction circuit or (ii) the input value selected by the swap circuit 1835 of that particular input reduction circuit (which is either the input value selected by the least significant nibbles multiplexer 1825 of that particular input reduction circuit or the least significant nibbles multiplexer 1825 of the input reduction circuit paired with that particular input reduction circuit). The output of the final selection circuits 1840 are provided to the adder tree (after being configurably doubled in some embodiments to account for quinary weights, as described above).

The use of the swap circuits 1835 enables the input reduction circuits to pass the same number of values to the adder tree (e.g., 40 4-bit values for each set of input reduction circuits) while providing more flexibility to the compiler in identifying how to pass through all of the input values with non-zero weight values. With the use of the swap circuits 1835, the compiler has more flexibility to select two input values from each larger group of sixteen input values than without the swap circuits (though some restrictions are still imposed, in that only one input value in each subgroup of four input values received by one of the least significant or most significant nibbles multiplexers 1825 or 1830 may be selected).

As shown in FIG. 18, some embodiments implement the input value swap using a single bit that is provided to each of the swap circuits for a given filter slice. That is, for a particular filter slice (within a particular layer), either all of the pairs of input reduction circuits swap the selections of their respective least significant nibble multiplexers or none of the pairs of input reduction circuits swap these selections. Using this single bit, which requires the storage of one additional bit per filter slice in the encoded weight data, effectively provides for two different available wirings of the input values to the input reduction circuits.

It should also be noted that in this example only the outputs of the least significant nibbles multiplexers are available to be swapped. In other embodiments, the most significant nibbles multiplexers can also swap their outputs (via a separate swap bit). In some such embodiments, different pairs of input reduction circuits swap the most significant nibbles multiplexer outputs than for the least significant nibbles multiplexer outputs. For instance, in the example shown in FIG. 18, the first input reduction circuit 1805 would not be part of a most significant nibbles swap pair, the next two input reduction circuits 1810 and 1815 would configurably swap their most significant nibbles multiplexer outputs, and so on (so that there are only 19 pairs rather than 20 pairs in an input reduction circuit set). With a separate single swap bit, this configuration provides four different wirings of the input values to the input reduction circuits from which the compiler can choose for each filter slice.

Other embodiments implement the swaps using a single bit for each pair of input reduction circuits, such that each separate pair of input reduction circuits can swap input values configurably. For a set of 40 input reduction circuits, 20 separate swap bits are thus used for each filter slice if the smaller (e.g., 4-bit) input values are used. For larger (e.g., 8-bit) input values, each half of the input reduction circuits would require the same 10 swap bits, because the swap configurations should be the same for each half. That is, if the most significant bits of an input value are swapped to a different input reduction circuit, then the least significant bits should also be swapped in the other half of the input reduction circuit set so that the two halves of the input value remain aligned and can be multiplied by the same weight value when computing the dot product.

Figure 19:
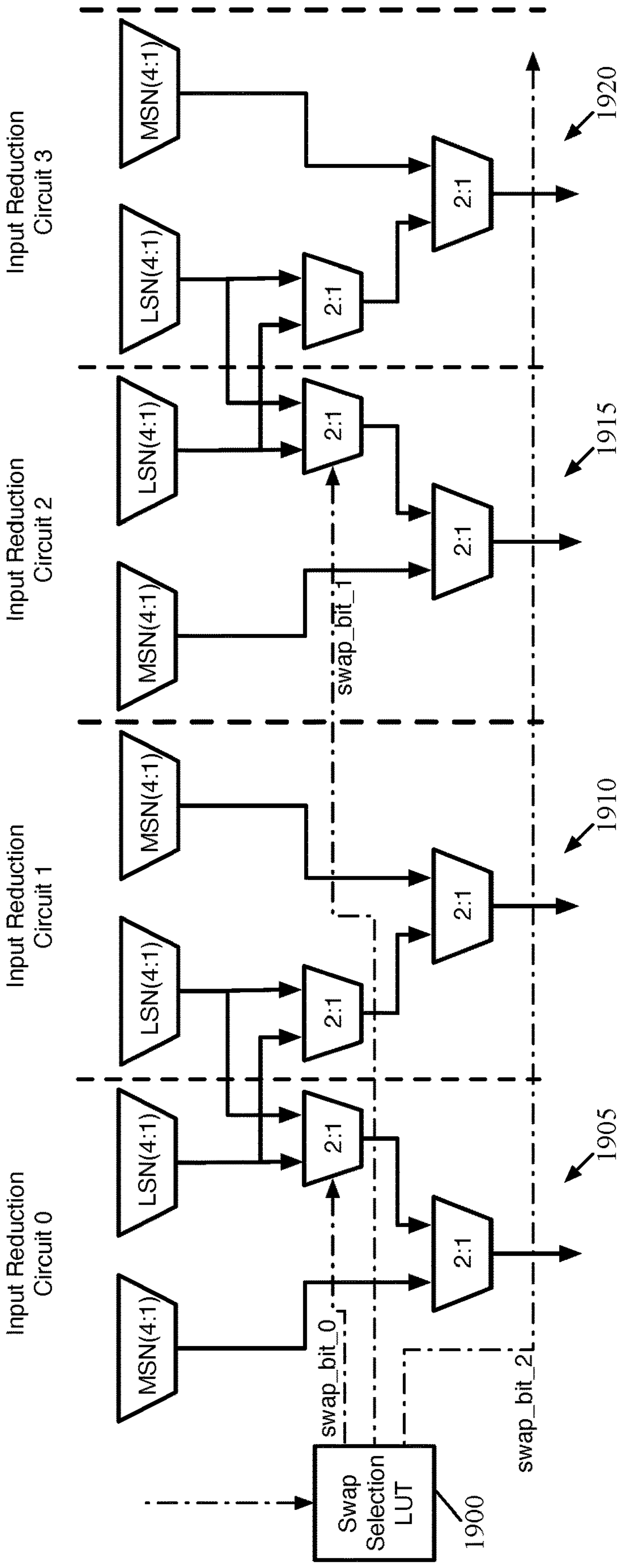
FIG. 19 conceptually illustrates the structure of input reduction circuits that enables separately swapping input values between pairs of the input reduction circuits according to some embodiments.

FIG. 19 conceptually illustrates the structure of input reduction circuits 1905-1920 that enables separately swapping input values between pairs of the input reduction circuits according to some embodiments. In this example, the input reduction circuits 1905-1920 are structured in the same manner as those shown in FIG. 18, with the outputs of the least significant nibbles multiplexers configurably swapping between pairs of input reduction circuits. However, in this case, separate swap bits are provided to each pair of input reduction circuits (e.g., the swap circuits of input reduction circuits 1905 and 1910 receive swap_bit_0, the swap circuits of input reduction circuits 1915 and 1920 receive swap_bit_1, etc.).

FIG. 19 shows that the swap bits provided to the input reduction circuits 1905-1920 (and those not shown in the figure) are output by a swap selection lookup table 1900. In theory, the individual swapping of input values could provide $2^{20}$ (1,048,576) different wirings of the activation buffer input values to a set of input reduction circuits. However, full availability of these options would require an extra 20 bits of encoded weight data to be stored per filter slice (for smaller input values) and would thus become unwieldy as the benefits of being able to compute more dot products in a single clock cycle would be eclipsed by the extra memory needed to store all of the weight information.

Instead, rather than storing the swap bits for each filter slice, some embodiments use the lookup table 1900 that provides a selection (e.g., determined by the compiler) of groups of swap bits and then store the bits for each filter slice to select one of these groups of swap bits. For instance, if a memory location (e.g., a RAM word) can store 128 bits, in some embodiments the compiler selects either six different groups of swap bits (out of the 1,048,576 possible groups) when using smaller input values (and 20 bits are needed for a group of swap bits) or twelve different groups of swap bits (out of the $2^{10}$, or 1,024 possible groups) when using larger input values (and 10 bits are needed for a group of swap bits). Some embodiments only use eight different groups of swap bits in the latter case so that only three bits are needed per filter slice to select one of the groups.

Figure 20:
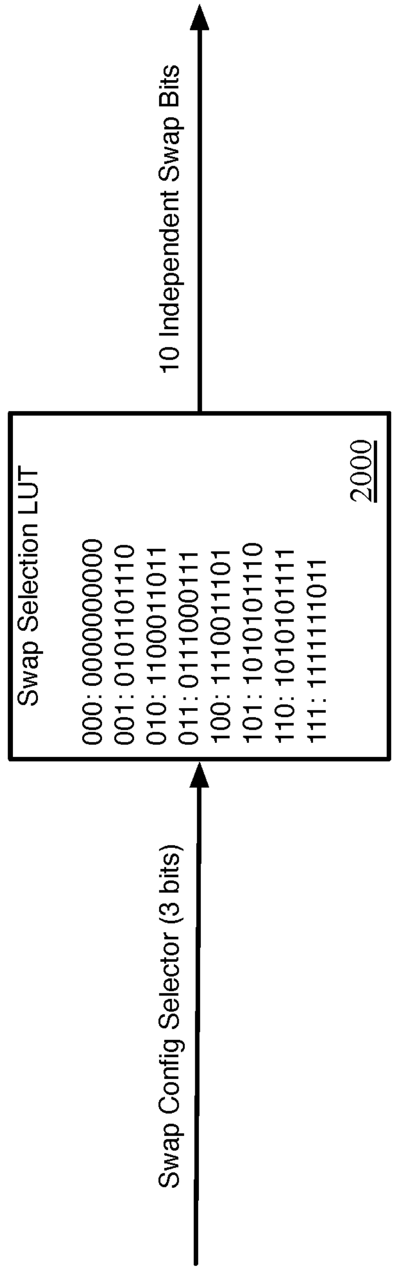
FIG. 20 conceptually illustrates a swap selection lookup table for a large input value (e.g., 8-bit) filter slice according to some embodiments.

FIG. 20 conceptually illustrates a swap selection lookup table 2000 for a large input value (e.g., 8-bit) filter slice according to some embodiments. In this case, the lookup table 2000 stores eight possible swap configurations, each of which includes 10 bits (as the same 10 bits can be used for each half of an input reduction circuit set). This requires less than one RAM word of memory to store the configurations for a layer (or portion of a layer, if the layer includes more filters than filter slices per core). As shown, the swap selection lookup table 2000 receives three bits of configuration selection data and uses these three bits to select one of the eight 10-bit swap configurations.

In some embodiments, the swap configurations stored in the lookup table are loaded to the lookup table from the microprocessor. The swap configurations may be fixed for the entire neural network in some embodiments, in which case these swap configurations need only be loaded to the lookup table at bootup of the network. In other embodiments, new swap configurations can be loaded to the lookup table for each group of filters (e.g., each layer or portion of a layer). In either case, the compiler identifies the optimal group of swap configurations (from the many potential such configurations) such that the input reduction circuits for each filter slice in a group of filters (or in the neural network, if using one swap configuration for the entire network) can pass all of the input values with non-zero corresponding weight values to their respective adder circuits using one of the swap configurations. In some embodiments, when new swap configurations can be loaded for each group of filters, the compiler is configured to prefer using the same swap configurations for subsequent groups of filters when possible, in order to save memory and configuration load time in between layers.

Figure 21:
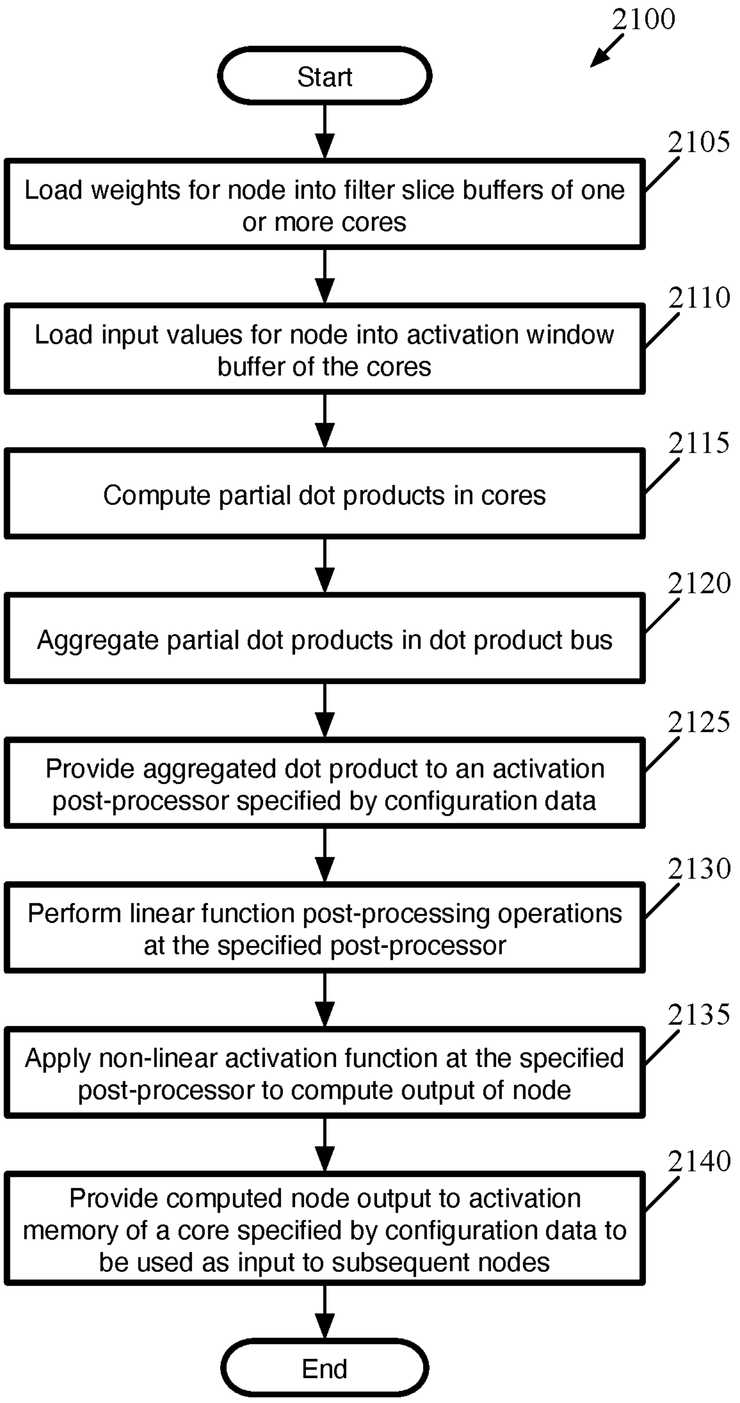
FIG. 21 conceptually illustrates a process of some embodiments for executing a set of instructions (or a portion of a set of instructions) to compute the output of a neural network node.

FIG. 21 conceptually illustrates a process 2100 of some embodiments for executing a set of instructions (or a portion of a set of instructions) to compute the output of a neural network node that includes a dot product between input activation values and weight values (specifically, a convolutional or fully-connected node). The process 2100 is executed by the chip fabric of a neural network IC, such as that described above. Typically, the process 2100 is executed simultaneously for multiple nodes, and operations 2110-2140 are performed repeatedly for multiple activation windows (i.e., multiple groups of input values loaded into the activation window buffer) in order to completely execute a convolutional layer (or portion of a convolutional layer) of the neural network. In the case of the process 2100, the dot product can be computed in a single cycle and does not involve any split filter slices (i.e., no time-multiplexing is required). Additional processes are described in U.S. Pat. No. 11,049,013, which is incorporated by reference above (i.e., for layers that have too many dot product components to be computed in a single clock cycle or that require filters to be split between multiple clock cycles because there are too many non-zero weight values).

As shown, the process begins (at 2105) by loading the weights for a node into filter slice buffers of one or more cores. In addition, the process loads (at 2110) the input (activation) values for the node into the activation window buffer of these cores. In some embodiments, a set of input values are loaded into one activation window buffer in a core while the weight data for several nodes are loaded into several filter slice buffers of the core. Other embodiments load the weight data into the filter slice buffers first, then load the input values into the activation window buffer. Furthermore, some embodiments load the weight data once for a pass (that computes outputs for many activation nodes), then iteratively load sets of input values and compute dot products for numerous nodes without the need to re-load the weight data. In addition, the weights and activations for a node, in some embodiments, are divided among the filter slice and activation window buffers of all of the cores that are active for the current set of instructions. The storage of the weight and activation values and loading of these values into the filter slice buffer and activation window buffer, respectively, are also described in greater detail below.

The process 2100 then computes (at 2115) partial dot products in the cores. As described above, the activation values loaded into the activation window buffers in each of the active cores are multiplied by their corresponding weight values loaded into the filter slice buffers of these cores. In some embodiments, the size of the partial dot products is reduced using the wiring structure shown in FIGS. 13-20, and with ternary weight values of $\{0, \alpha_k, -\alpha_k\}$ or quinary weight values of $\{0, \alpha_k, -\alpha_k, 2\alpha_k, -2\alpha_k\}$, the multiplication is handled by the ternary MAC circuits (as well as using the configurable doubling function for quinary weights).

Next, the process aggregates (at 2120) these partial dot products in the dot product bus. In some embodiments, the partial dot products for a particular node are calculated by the adder tree with the same index (i.e., out of several adder trees) in each of the active cores, and thus these partial dot products are all passed to the same corresponding lane of the dot product bus (which has one lane for each of the adder trees in a core). In some embodiments, the final aggregation is performed by the dot product bus lane in the channel segment of the post-processor selected for the particular node.

The process 2100 then provides (at 2125) the aggregated dot product to an activation post-processor (i.e., a dot product input processing circuit as well as a corresponding post-processing unit) specified by configuration data. This configuration data, in some embodiments, is generated by a compiler and parsed by the hierarchical controller circuits of the neural network chip fabric, and indicates which channel segment will perform the post-processing. Each of the channel segments has an equal number of post-processing units (and corresponding circuits), and the dot product input processing circuit in the selected channel segment that corresponds to the dot product bus lane that aggregates the dot product is the post-processing unit that receives the aggregated dot product.

At the post-processing circuits that receive the aggregated dot product, the process 2100 performs (at 2130) linear function post-processing operations. For all dot products, this includes the bias and scale operations described by reference to FIG. 10 above, with the values for these operations sent as configuration data from the cluster controller. In addition, as described below, certain dot products are aggregated over multiple cycles by the dot product input processing circuit shown in FIG. 11 (e.g., if time-multiplexing is required to handle dot products with a large number of components, or for certain dot products with double the standard number of bits).

Next, the process 2100 applies (at 2135) the non-linear activation function at the post-processing unit to complete the calculation of the node output value. In some embodiments, as shown in FIG. 10, a piecewise linear function is used for this computation. The specific function to be used is provided by configuration data from the cluster controller in some embodiments.

In some embodiments, the operations 2115-2135 are executed to compute the node output without storing the any intermediate values in memory. That is, none of the partial dot products are stored in any memories (e.g., RAM) during the computation within the core, and the same is true before and during the aggregation within the dot product bus. In some embodiments, the register 1130 is used to aggregate multiple dot product bus inputs. However, in a standard case, this register passes the dot product input through and the entire set of operations 2115-2135 is executed in a single clock cycle.

Finally, the process 2100 provides (at 2140) the computed node output to the activation memory of one (or more) of the cores as specified by the configuration data, so that this output can be used as the input to a subsequent set of neural network nodes. In some embodiments, the node output value is carried to the specified core by the activation write bus, with the core index for the value specified by the cluster controller(s). Once at the specified core, the node output value may be temporarily stored in a write cache until the write cache is full and the data is written to the core memory in some embodiments.

As mentioned, the process 2100 illustrates the most simplistic case for computing a dot product. For this simplest type of dot product computation, the neural network computation circuit of some embodiments places the following restrictions on the computation: (i) all of the input values should be of the same specified discrete size (e.g., 4 bits or 8 bits), (ii) the maximum number of input values is the size of the input buffer multiplied by the number of cores (e.g., 128 inputs×16 cores=2048 total values for 4-bit activations), (iii) all of the weight values are either 0, $+\alpha_k$, or $-\alpha_k$ (and thus can be treated as 0, 1, and −1 for multiplication) or 0, $+\alpha_k$, $-\alpha_k$, $+2\alpha_k$, or $-2\alpha_k$ (and thus can be treated as 0, 1, −1, 2, and −2 for multiplication), and (iv) a large enough percentage of the weight values are 0 that the input values with non-zero weight values can each map to a different multiplexer input.

As mentioned above by reference to FIG. 12, each core includes a block of memory to store the weight data and activation values used by the core to compute dot products (i.e., the activation values that are loaded into the activation window buffer and the weight data that is loaded into the filter slice buffers). In some embodiments, each core is allocated the same amount of memory (e.g., from the unified memory as shown in FIG. 3) in total, which is divided between weight memory and activation memory for a particular network by the compiler that designs the program for the inference circuit to execute the network. Some embodiments require that each core be divided between weight memory and activation memory in the same manner (i.e., the allocation of weight/activation memory to each core is the same for all of the cores), while other embodiments allow for different allocations between the cores. For example, in some embodiments the allocation is the same for each core within a cluster but can vary between cores in different clusters (e.g., if a subset of cores is used for a majority of the layers of the network, then that subset of cores might need more of its memory allocated to weight data storage).

Within a core, the weight memory and activation memory partitions are themselves subdivided between layers of the network. As described above, for some neural networks, all of the weight data used by a core is stored in the memory of that core at bootup time, because these values are the same for every input provided to the network. For other networks, if the amount of weight data is too large, the weight data is overwritten during the course of executing the network.

On the other hand, the activation values are determined at runtime (and occupy more memory per value than the weight data), so the cores do not store all of the activation values at one time. Depending on the type of network, only two layers of activations may need to be stored at once (the input activation values for the current layer being executed as well as the output activation values for that layer). In this case, once layer L is being executed (using the layer L activations as inputs and outputting the layer L+1 activations), the circuit can overwrite the layer L−1 activations. On the other hand, if a network has residual connections (i.e., the output activations from layer L are used as inputs for more than just layer L+1), then more than two layers of activations may need to be stored at once.

Figure 22:
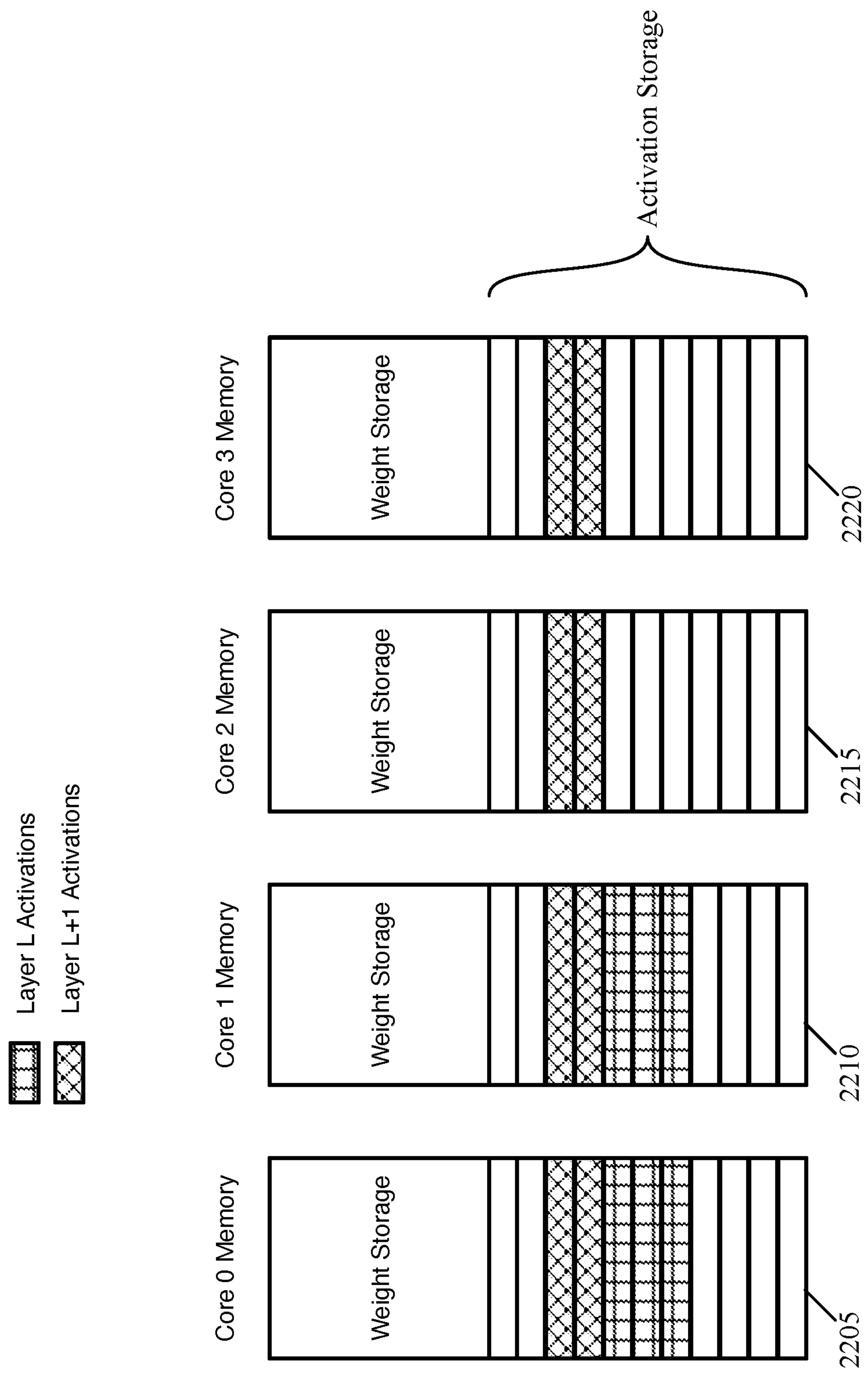
FIG. 22 conceptually illustrates the assignment of layers of activations to memories of four cores within a cluster.

FIG. 22 conceptually illustrates the assignment of layers of activations to memories 2205-2220 of four cores within a cluster. In this example, each of the cores is partitioned into weight storage (shown in the figure as a single block) as well as activation storage (shown as blocks of memory). Each of the blocks within the activation storage represents a set of memory locations (e.g., RAM words) in some embodiments. Though the figure shows a small number of such blocks within each core memory 2205-2220, it should be understood that a typical neural network computation circuit will have thousands of RAM words per memory. In addition, although the activation partition is larger than the weight partition in these examples, the weight partition will often be the larger partition if all of the weight values are stored in the memories at boot time. Furthermore, in some embodiments the weight storage and activation storage can be intermixed within a core.

The figure illustrates (using different types of cross-hatching) the memory portions allocated to the activation values (i.e., input activations) for each of two layers (layer L and layer L+1). In this example, the activations for layer L are divided across the memories 2205 and 2210 for two of the cores (meaning that only these two cores participate in the dot product calculations for this layer), whereas the activations for layer L+1 are divided across the memories 2205-2220 for all four illustrated cores. For each of the layers, the first RAM word storing activations for that layer is aligned to the same memory address (i.e., the first activation for the layer stored in each core starts at an equivalent memory location within the respective core). In addition, the first activation for a layer starts at the beginning of a RAM word (i.e., the least significant bit in the word) in some embodiments.

In some embodiments, the activation values for a layer are divided evenly among the cores storing the activations for that layer (or as close to evenly as possible). Some embodiments require that the number of cores for a layer is a multiple of the number of cores in a cluster (e.g., a multiple of four for the chip fabric shown above in FIG. 5). Other embodiments simply impose the requirement that the number of two-dimensional activation grids assigned to each core is equal (or as close to equal as possible). Referring to the three-dimensional structure of a layer of activations shown in FIG. 2, each two-dimensional grid of activations is assigned entirely to a single core. As such, if the number of activation grids is not evenly divisible by the number of cores to which those activations are assigned, then some of the cores will be assigned more of the actual activation values than other cores. However, some embodiments assign zero-grids (i.e., grids of activation values equal to zero) to make up the difference and even out the number of activations in each core for the layer. In other embodiments, rather than specifically ensuring the activation values are all zero (which would require generating one or more extra activation value grids of zeros and loading these values into the RAM each time the network is executed), the compiler ensures that the corresponding weight values stored in the weight memory are all zero, such that the data used for these activation value grids does not matter).

In addition, as shown in FIG. 22, all of the activation values for a layer are assigned to a contiguous block of each core's memory in some embodiments. As described further below, in certain cases, a portion of a RAM word may be zero-padded (or left with unverified data that is not used in the computations for the layer) within this contiguous block of memory. In other embodiments, activations for a layer may be fragmented within the memory of a core, with instructions to jump between these fragments. In certain situations, this allows for more optimal packing of the activation data within a core memory.

Figure 23:
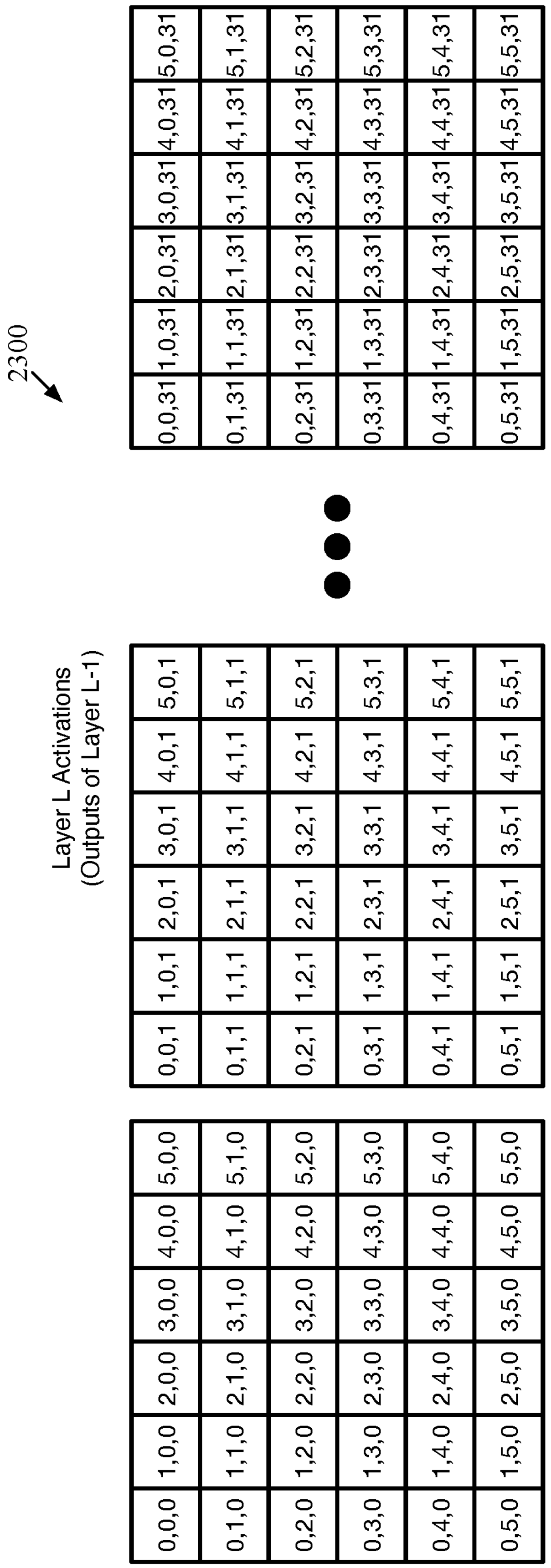
FIG. 23 conceptually illustrates a layer of activation values.
Figure 24:
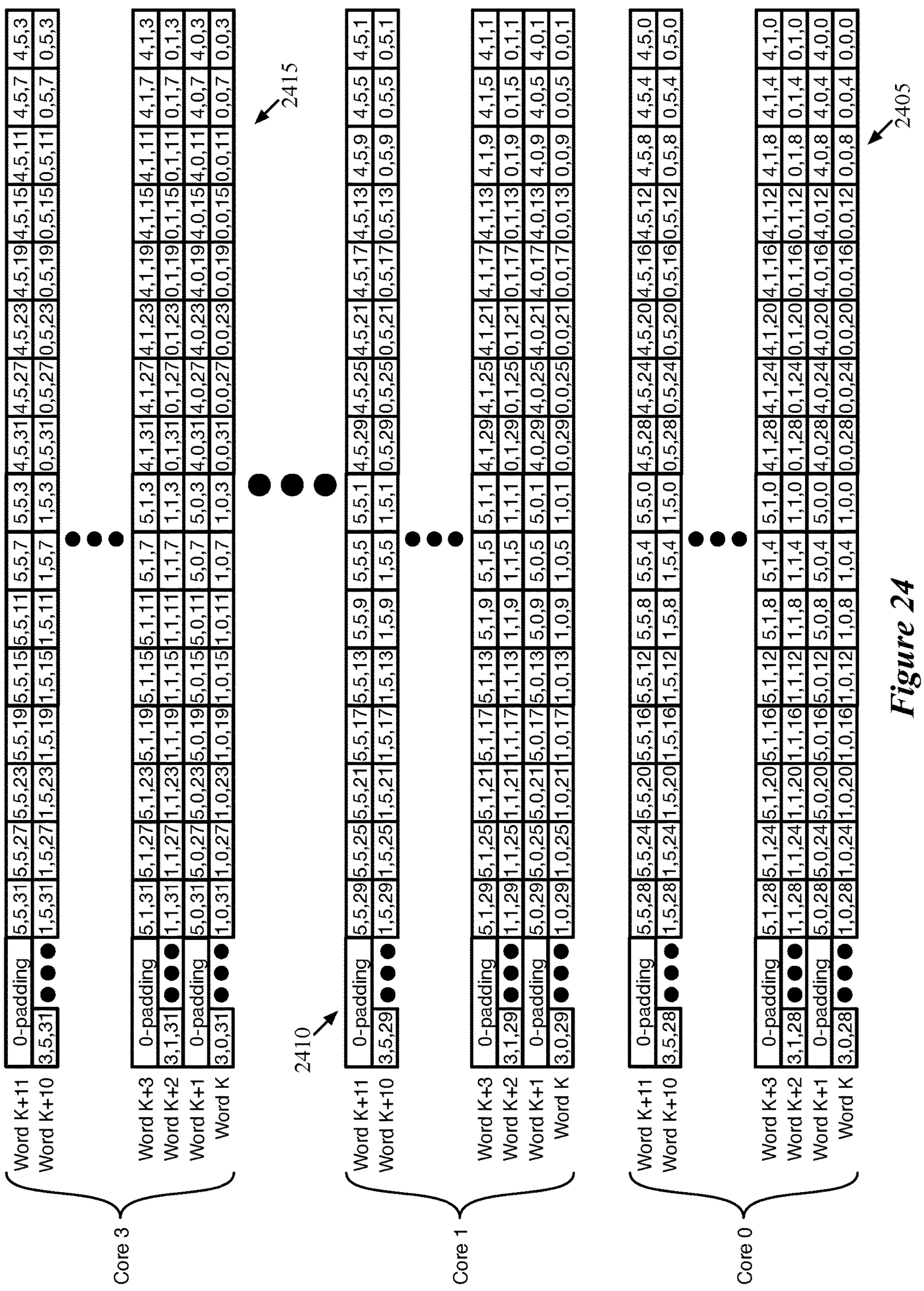
FIG. 24 conceptually illustrates the arrangement of the activation values of FIG. 23 among the memory of four cores.

FIG. 23 conceptually illustrates a layer of activation values 2300, and FIG. 24 conceptually illustrates the arrangement of these activation values 2300 among the memory of four cores according to some embodiments. As shown in FIG. 23, the layer L activation values are structured as a 6×6×32 layer (i.e., 32 6×6 grids or input channels, meaning that the previous layer most likely had 32 filters). Each activation value in the layer is labeled with a three-dimensional (x, y, z) coordinate. The x-coordinate refers to the column to which the activation belongs (0-5), the y-coordinate refers to the row to which the activation belongs (0-5), and the z-coordinate refers to the channel to which the activation belongs (0-31). Each of these activations will have different values depending on the input data provided to the network, but the activation value at a given coordinate will be stored in the same location in the core memories each time the network is executed.

FIG. 24, as mentioned, illustrates the arrangement of the activation values 2300 according to the activation storage rules of some embodiments. In this case, the compiler determined that the activation values 2300 of Layer L will be stored in four cores of the neural network computation fabric (Cores 0-3). The memories 2405-2415 of each of the cores include numerous banks of RAM in some embodiments, divided into words that can each be read from or written to individually. These words may have different lengths in different embodiments; in this example, the words are each 128 bits long. Thus, if the activation values are each 4-bit values (as is the case in some embodiments), then a single word can hold 32 activation values. When larger 8-bit activation values are used, then a single word can hold 16 activation values, as shown in the subsequent FIG. 25. In the figure, each word is shown with the least significant bits on the right, which will be referred to as the "start" of the word. Thus, the rightmost 4 bits (least significant nibble) of each word holds the first activation value of the word. In addition, the words are ordered, with this example showing the first word in each core (or at least the first word for the illustrated layer of activation values) at the bottom of the diagram.

To optimize the use of the core memory as well as the efficiency with which the activation values are read from the core memory, some embodiments organize the activation values in the memory according to a set of defined rules (which are shown by way of example in FIG. 24). As mentioned, each two-dimensional channel of activation values is assigned entirely to a single core. In this example, channels {0, 4, 8, . . . 28} are assigned to Core 0, channels {1, 5, 9, . . . 29} are assigned to Core 1, channels {2, 6, 10, . . . 30} are assigned to Core 2, and channels {3, 7, 11, . . . 31} are assigned to Core 3. The compiler may use different algorithms to assign channels of activation values to different cores in some embodiments, so long as the channels are assigned evenly (or as close as possible to evenly) to the cores.

The activation values within a core are not necessarily arranged with all of the activation values of a channel stored contiguously. Instead, within each core, some embodiments store all of the activations for a particular coordinate (i.e., an x-y coordinate) within the channels assigned to that core in a contiguous block. For a typical convolution, all of the activation values at a particular (x,y) coordinate will be used for dot product computations at the same time, so storing these values contiguously helps minimize resources used (and latency) for loading the activation values when computing the dot products for a layer.

As shown, the activation memory for layer L in each core starts with the activations at (0,0) for all of the channels assigned to that core. In this case, eight channels of activation values are assigned to each of the four cores (the 32 channels are evenly divisible by 4, so no zero-channels are required). Thus, the first eight values of the first word in each core (designated as word K) are the activations with (x,y) coordinates of (0,0). In some embodiments, if there are more channels assigned to a core than the number of activation values that a memory location (i.e., a RAM word) can store, then these are split up into separate sets of activations, and only a single word worth of activation values at the same coordinate are stored contiguously. That is, if 35 channels of activation values were assigned to Core 0, then only the first 32 activation values would have coordinates of (0,0) stored together. Those first 32 channels would be stored as a contiguous block that iterates through each (x,y) coordinate, followed by the remaining 3 channels of activation values (stored in the same way, iterating through each (x,y) coordinate).

Within the memory 2405-2415 of each core, the first 8 activation values are those located at coordinate (0,0). Next, the algorithm for activation value storage moves to the activation values coordinate (1,0)—that is, the x-coordinate is incremented as the next value in the same row of each channel is stored. This proceeds until the end of the current row is reached (i.e., the activation values with coordinate (5,0)). In some embodiments, once the end of a row in the activation channel is reached, the remainder of the current RAM word is 0-padded. As shown in the figure, this means that the last half (64 bits, or 16 activations) of word K+1 (as well as words K+3, K+5, etc.) in each of the memories 2405-2415 is 0-padded (or padded with unverified data that is never loaded into the activation window buffer). This pattern (arranging the activation values in row-major order) is repeated for each row of activation values in the channels assigned to a given core.

When loading the activation values as inputs to dot product computation, upon reaching the end of a row of the activation grids, the core memory controller returns to the start of the next row, and the activation values from the end of the previous row are not reused. The use of 0-padding (rather than starting the next row of activation values in the same RAM word) avoids the need to read multiple words when starting a new row of convolutional layer computations (which would require additional clock cycles).

As a result of this activation storage algorithm, in some embodiments a given memory location in one source core for a layer will store activations for the same x-y coordinates as that memory location in any of the other source cores. For example, the tenth activation in RAM word K+1 of Core 0 is the activation for coordinate (5,0) in activation channel 4. Correspondingly, the tenth activation in RAM word K+1 of any of the other cores is also an activation for coordinate (5,0), in different activation channels. In other embodiments, while the arrangement of the activation values for a layer is the same within each core to which those activation values are assigned, the actual memory locations may be offset between the cores in order to accommodate the different activation and weight values that may be stored in different cores. That is, in the example shown in FIG. 24, the storage of activation values for the layer begins with word K in all four cores. However, in other embodiments, the activation values for the layer might begin at a different RAM word in one or more of the layers.

Figure 25:
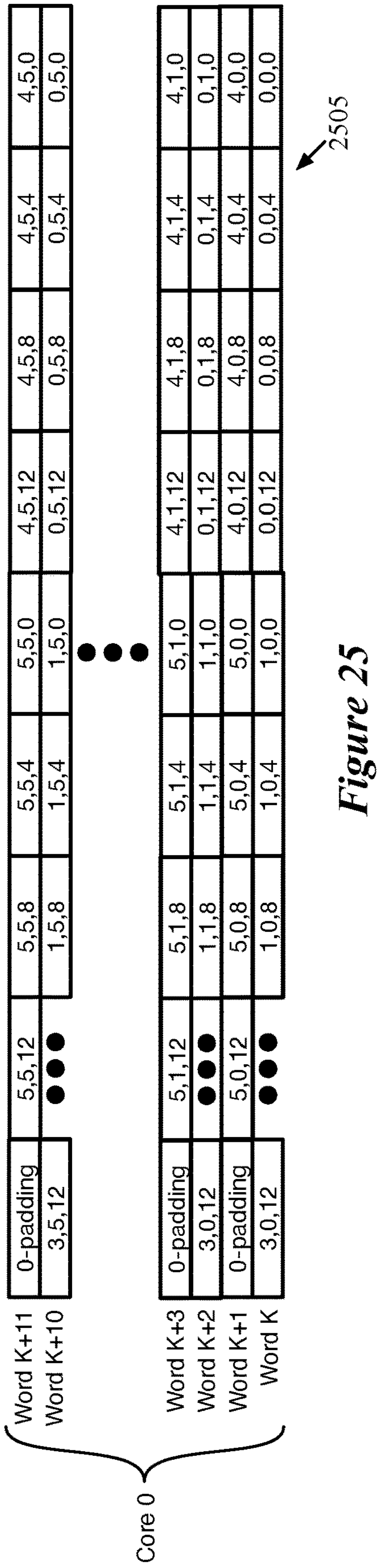
FIG. 25 illustrates the arrangement of larger activation values according to the activation storage rules of some embodiments.

FIG. 25 illustrates the arrangement of larger (8-bit) activation values according to the activation storage rules of some embodiments. In this case, rather than 8 input channels being stored per core, only 4 channels are stored in each core. This could be due to the layer having fewer input channels (e.g., 16 channels stored across four cores) or using more cores (e.g., 32 channels stored across eight cores). In some embodiments, because the activations are twice the size of the standard size (e.g., 8 bits rather than 4 bits), half the number of input channels can be stored contiguously (e.g., 16 rather than 32) as half the number of activations can be stored within a single RAM word. This figure illustrates the arrangement of the activation values within the memories 2505 of a single core, but it should be understood that this arrangement is repeated for the other source cores of the layer as shown in FIG. 24.

The weight values for a neural network are stored in a similar manner, in some embodiments, with certain differences. Just as activation values for a layer are divided across multiple cores (and, specifically, the activation values for each particular dot product in a layer are divided across the multiple cores that execute that layer), the weight values for each filter in a layer also divided across these same multiple cores. Over the course of a convolutional layer, a particular weight value in a filter is multiplied by numerous activation values, all of which are in the same activation channel. As such, each weight value is stored in the same core as the activation channel that contains the activations by which that weight value is multiplied. However, in some embodiments, the length of each filter slice may be different, even within a single layer, due to the different number of non-zero weight values in different portions of a filter. That is, even if a filter slice buffer always has 40 weight values, the amount of memory required to store those weight values may differ depending on the number of non-zero weight values.

The above-described storage pattern of the input activation values for one layer, in some embodiments, influences the assignment of filters to different indices (i.e., partial dot product computation circuit, dot product bus lane, post-processing circuit, and output bus lane) for the previous layer. As indicated above, in some embodiments the activation write bus operates such that all of the output activation values (which are input activation values for a subsequent layer or layers) computed at a given time (i.e., in a given clock cycle) that are to be stored in a particular core should be computed by post-processing units having a contiguous range of indices. In the typical scenario (e.g., in which the filter slices do not need to be split across multiple partial dot product computation circuits), this means that all of the filters used to compute output activation values that will be stored in a particular core will be assigned by the compiler to a contiguous range of filter slice buffers (and thus to a contiguous range of activation write bus lanes).

Figure 26:
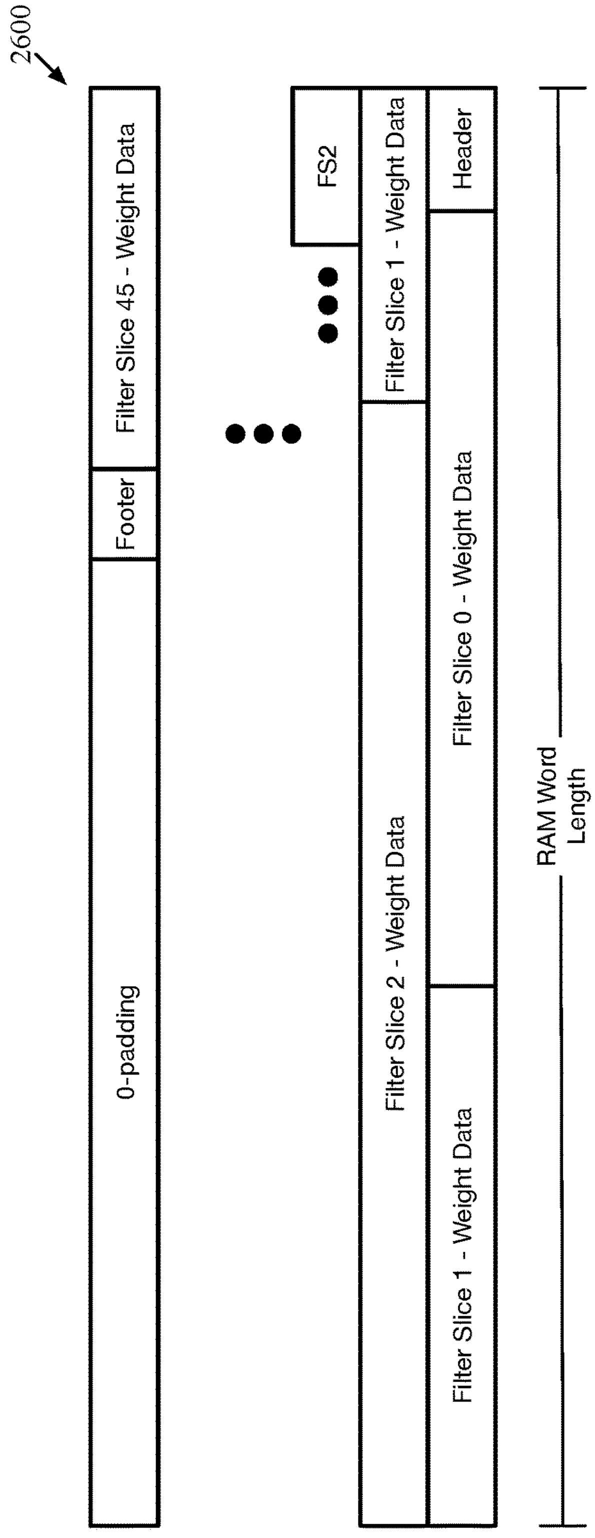
FIG. 26 conceptually illustrates the organization of a block of weight data within a single core for a single pass of the neural network computation circuit.
Figure 27:
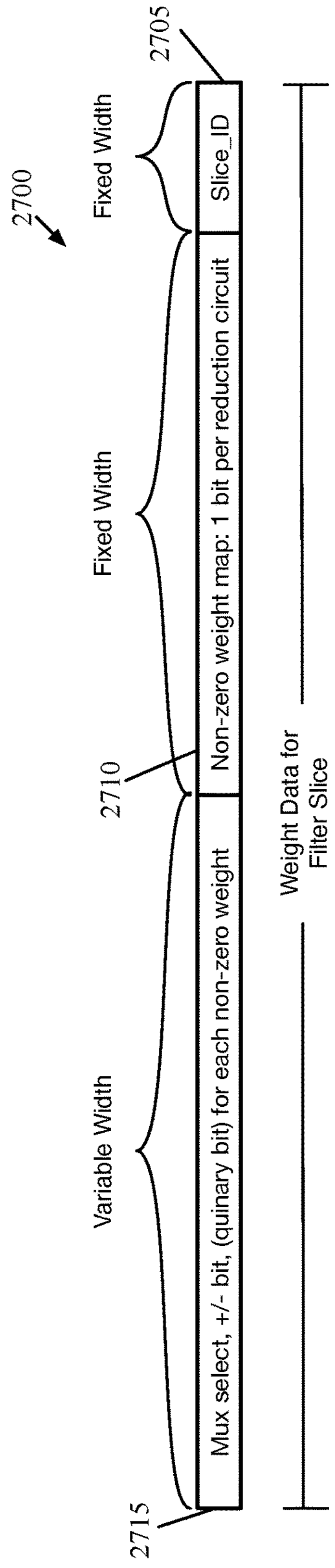
FIG. 27 conceptually illustrates the format of the encoded weight data for a single filter slice buffer in some embodiments.

FIGS. 26 and 27 illustrate the organization of the weight data in memory. Specifically, FIG. 26 illustrates the organization of a block of weight data 2600 within a single core for a single pass of the neural network computation circuit (i.e., a layer or a portion of a layer of the neural network). In some embodiments, as with the activation data, each of the cores across which the dot products of the network layer are spread includes a similar weight data block starting at the same memory address. However, unlike in the case of activations, due to the encoding of the weight data, different cores will store different amounts of data for the same pass (which includes the same number of filter slices in each core). As such, some embodiments allow for the weight data blocks for the same pass to start at different memory addresses in different cores, to more efficiently pack the weight data into memory (i.e., so that RAM words do not go unused when the filter slices stored in one core are larger than the filter slices stored in another core).

As shown in FIG. 26, in some embodiments the block of weight data 2600 begins with a header. In some embodiments, this header includes at least (i) a bit specifying whether the weight data in the current block is for use with large (e.g., 8-bit) activation values and (ii) a bit specifying whether the weight values are ternary or quinary. If the weight data is for use with large activation values, then configuration for only half of the input reduction circuits are specified for each filter slice, as these can be duplicated for the other half. If the weight values are quinary, then the information for each non-zero weight value in the filter slice block includes an additional bit to specify whether to double the weight.

Following the header, each filter slice is allocated a variable amount of memory. In some embodiments, the filter slices are stored in order based on the filter slice index (i.e., the index 0-63 of the filter slice buffer and the corresponding adder tree, dot product bus lane, and post-processing units), though storing this data in order is not required. In some embodiments, the amount of memory required depends on the number of non-zero weight values, with non-zero weight values requiring more data than weight values equal to zero. For example, in the encoding described below by reference to FIG. 27, a filter slice with all zero weight values would use 48 bits of memory (significantly less than a 128-bit RAM word), while a filter slice with entirely non-zero weight values (i.e., 40 non-zero weight values, corresponding to the 40 multiplexers that reduce the number of inputs to an adder tree from 128 to 40 as shown in FIG. 13) would use 208 bits of memory (more than a 128-bit RAM word).

In the example shown in FIG. 26, data is stored for 46 filter slices. If a pass does not use all of the filter slice buffers because there are fewer filters in a layer than the number of filter slice buffers in the cores (or the filters in a layer are divided evenly between multiple passes), some embodiments do not require data to be stored for all of the unused filter slices. The weight block 2600 (and all such weight blocks for a pass, in some embodiments) begin at the start of a RAM word, though the weight data for individual filter slices within that weight block are not required to begin at RAM word boundaries. In some embodiments, the read cache can output activation or weight data that crosses a RAM word boundary, so that, e.g., all of the data for filter slice 1 could be loaded into the appropriate filter slice buffer at once (subject to certain constraints) even though it crosses the boundary between two RAM words. As shown, because the amount of data stored in a weight block is variable, a footer (e.g., a succession of 0s) is used to mark the end of the weight block 2600. Some embodiments then 0-pad the final RAM word of the weight block (or use random data, as this data will never be used) so that the next weight block can start at the beginning of the next RAM word.

FIG. 27 illustrates the format of the encoded weight data 2700 for a single filter slice in some embodiments. Though described here for an entire filter slice, some embodiments store separate data for each half of a filter slice. That is, data is stored as a first block for the even half of a filter slice and then as a separate block for the odd half of a filter slice. As noted, when using larger activation values, only one of these half-slices needs to be stored because the data is then duplicated for the other half-slice.

As shown in this example, some embodiments divide the weight data for a filter slice into three sections: a slice identifier 2705, a non-zero weight map 2710, and additional weight data 2715 for each of the non-zero weights. The slice identifier 2705 and the non-zero weight map 2710 have a fixed width (i.e., a fixed number of bits) in some embodiments, while the additional weight data 2715 has a variable width that depends on the number of non-zero weights in the filter slice.

The slice identifier 2705, in some embodiments, includes information indicating to which filter slice buffer the decoded weight data based on the data in sections 2710 and 2715 will be written. This data includes (i) write enable bits for the primary and secondary filter slice buffers and (ii) a filter slice buffer index address. Thus, for a circuit with 64 filter slice buffers, the slice identifier includes 8 bits (1 bit for each of the write enables and 6 bits for the filter slice buffer index address). This information is not stored in the filter slice buffer, but is used by the control circuitry to ensure that the subsequent data is stored in the correct filter slice buffers. In some embodiments, only one of the write enable bits will be non-zero, while other embodiments allow for the same filter slice to be written to both primary and secondary filter slice buffers (e.g., in certain filter slicing cases).

In some embodiments, the slice identifier 2705 specifies which entry in the swap selection lookup table the filter slice (or half-slice) uses. In addition, in some embodiments, rather than storing a 6-bit filter slice buffer index, the filter slices (or half-slices) are stored in order and the filter slice identifier can be determined based on the order, a slice type value stored in the slice identifier 2705, and the header bit that indicates whether large activation values are used.

The non-zero weight map 2710, in some embodiments, includes a bit for each of the input reduction circuits in the partial dot product computation circuit corresponding to the filter slice buffer identified in the slice identifier 2705. Thus, for a chip fabric with partial dot product computation circuits as shown in FIG. 13, the non-zero weight map 2710 includes 40 bits (or 20 bits if the weight data is stored separately for each half slice). Each bit of the non-zero weight map 2710 specifies whether the corresponding input multiplexer passes an input value with a non-zero corresponding weight value.

The variable width additional weight data 2715 includes additional data for each non-zero weight indicated in the non-zero map 2710. Thus, if all of the weights are zero for an entire filter slice, then no additional weight data 2715 is required (in certain cases, the entire filter slice can be eliminated in this case, and no data need be stored). For each non-zero weight indicated in the non-zero map, some embodiments store (i) a bit indicating whether that weight is positive or negative, (ii) a bit indicating whether the weight should be doubled (this bit is only present when the weights for the layer are identified as quinary in the block header), and (iii) select bits for the corresponding input reduction circuit. The select bits for the input reduction circuit are used to indicate which of the activation inputs that input reduction circuit selects to output to the adder tree, while the positive/negative weight bit is used along with the corresponding bit from the non-zero weight map 2710 to direct the operation of the corresponding ternary MAC circuit and the doubling bit is used to configurably double the input value prior to providing that input value to the ternary MAC circuit.

For the example input reduction circuits shown in FIG. 13, three select bits are stored. These three bits specify which of the eight inputs received by the corresponding input reduction circuit are selected. Three select bits for each such input reduction circuit are also stored in embodiments that use the configurable input swapping shown in FIGS. 18 and 19. If no swaps are used for a pair of input reduction circuits, then two bits are used to select the same input (e.g., the first, second, third, or fourth) from each of the two 4:1 multiplexers and then a third bit for the 2:1 multiplexer. Because only one of the input values is needed, the same input can be selected from each of the 4:1 multiplexers. If swaps are used, however, then two input values received at the same input reduction circuit will be used by the adder tree (i.e., one input value is passed to the adder tree from that input reduction circuit and one is swapped to the paired input reduction circuit which then passes the input value to the adder tree), and thus different inputs may need to be selected by the 4:1 multiplexers. Some such embodiments include a circuit (e.g., a multiplexer) that configurably swaps the two select bits for one of the 4:1 multiplexers (e.g., for the least significant nibble multiplexers). Thus, the select bits for the most significant nibble multiplexer that receives an input to be passed through to the adder tree are stored for the input reduction circuit with that most significant nibble multiplexer, while the select bits for that input reduction circuit's least significant nibble multiplexer are stored for its paired input reduction circuit and swapped based on the swap bit for that pair of input reduction circuits.

The additional weight data 2715 is organized with the sets of data for each input reduction circuit in the same order as the bits in the non-zero weight map 2710. Thus, the first set of 4 bits (or 5 bits, if using quinary weights) in the additional weight data 2715 corresponds to the multiplexer indicated with the first non-zero in the non-zero weight map 2710 (which could be the first bit, second bit, etc. all the way to the last bit). As described in U.S. Pat. No. 11,049,013, which is incorporated by reference above, weight data decoder circuits are used to (i) align the non-zero weight map bits with their corresponding additional weight data within the filter slice buffer and (ii) fill in the additional data for the input reduction circuits that do not pass activation values corresponding to non-zero weights.

The integrated circuit of some embodiments can be embedded into various different types of devices in order to perform different purposes (e.g., face recognition, object categorization, voice analysis, etc.). For each type of device, a network is trained, obeying the sparsity and/or ternary constraints, with the network parameters stored with the IC to be executed by the IC on the device. These devices can include mobile devices, desktop computers, Internet of Things (IoT) devices, etc.

Figure 28:
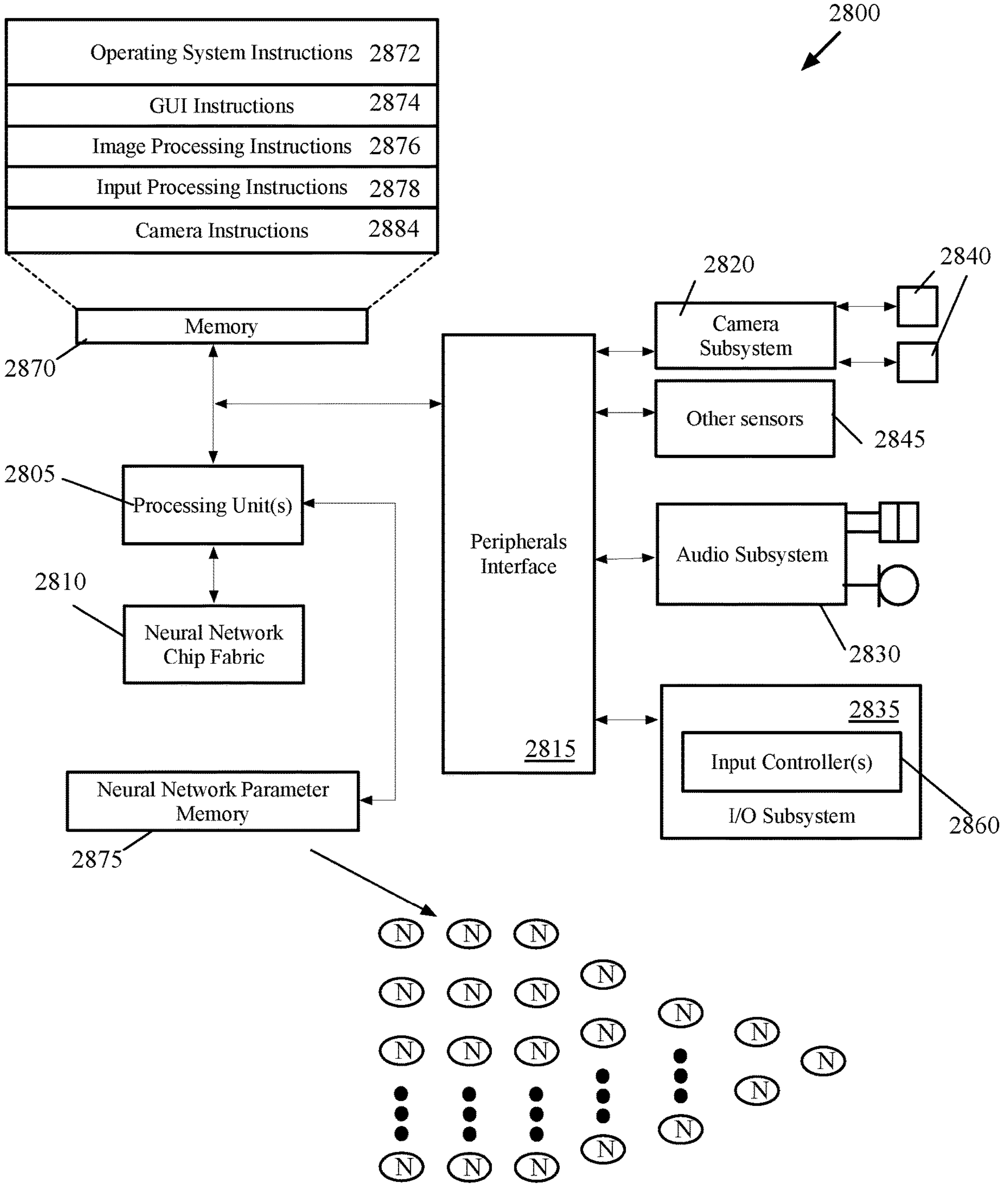
FIG. 28 is an example of an architecture of an electronic device that includes the neural network integrated circuit of some embodiments.

FIG. 28 is an example of an architecture 2800 of an electronic device that includes the neural network integrated circuit of some embodiments. The electronic device may be a mobile computing device such as a smartphone, tablet, laptop, etc., or may be another type of device (e.g., an IoT device, a personal home assistant). As shown, the device 2800 includes one or more general-purpose processing units 2805, a neural network chip fabric 2810, and a peripherals interface 2815.

The peripherals interface 2815 is coupled to various sensors and subsystems, including a camera subsystem 2820, an audio subsystem 2830, an I/O subsystem 2835, and other sensors 2845 (e.g., motion/acceleration sensors), etc. The peripherals interface 2815 enables communication between the processing units 2805 and various peripherals. For example, an orientation sensor (e.g., a gyroscope) and an acceleration sensor (e.g., an accelerometer) can be coupled to the peripherals interface 2815 to facilitate orientation and acceleration functions. The camera subsystem 2820 is coupled to one or more optical sensors 2840 (e.g., charged coupled device (CCD) optical sensors, complementary metal-oxide-semiconductor (CMOS) optical sensors, etc.). The camera subsystem 2820 and the optical sensors 2840 facilitate camera functions, such as image and/or video data capturing.

The audio subsystem 2830 couples with a speaker to output audio (e.g., to output voice navigation instructions). Additionally, the audio subsystem 2830 is coupled to a microphone to facilitate voice-enabled functions, such as voice recognition, digital recording, etc. The I/O subsystem 2835 involves the transfer between input/output peripheral devices, such as a display, a touch screen, etc., and the data bus of the processing units 2805 through the peripherals interface 2815. The I/O subsystem 2835 various input controllers 2860 to facilitate the transfer between input/output peripheral devices and the data bus of the processing units 2805. These input controllers 2860 couple to various input/control devices, such as one or more buttons, a touchscreen, etc.

In some embodiments, the device includes a wireless communication subsystem (not shown in FIG. 28) to establish wireless communication functions. In some embodiments, the wireless communication subsystem includes radio frequency receivers and transmitters and/or optical receivers and transmitters. These receivers and transmitters of some embodiments are implemented to operate over one or more communication networks such as a GSM network, a Wi-Fi network, a Bluetooth network, etc.

As illustrated in FIG. 28, a memory 2870 (or set of various physical storages) stores an operating system (OS) 2872. The OS 2872 includes instructions for handling basic system services and for performing hardware dependent tasks. The memory 2870 also stores various sets of instructions, including (1) graphical user interface instructions 2874 to facilitate graphic user interface processing; (2) image processing instructions 2876 to facilitate image-related processing and functions; (3) input processing instructions 2878 to facilitate input-related (e.g., touch input) processes and functions; and (4) camera instructions 2884 to facilitate camera-related processes and functions. The processing units 2810 execute the instructions stored in the memory 2870 in some embodiments.

The memory 2870 may represent multiple different storages available on the device 2800. In some embodiments, the memory 2870 includes volatile memory (e.g., high-speed random access memory), non-volatile memory (e.g., flash memory), a combination of volatile and non-volatile memory, and/or any other type of memory.

The instructions described above are merely exemplary and the memory 2870 includes additional and/or other instructions in some embodiments. For instance, the memory for a smartphone may include phone instructions to facilitate phone-related processes and functions. An IOT device, for instance, might have fewer types of stored instructions (and fewer subsystems), to perform its specific purpose and have the ability to receive a single type of input that is evaluated with its neural network.

The above-identified instructions need not be implemented as separate software programs or modules. Various other functions of the device can be implemented in hardware and/or in software, including in one or more signal processing and/or application specific integrated circuits.

In addition, a neural network parameter memory 2875 stores the weight values, bias parameters, etc. for implementing one or more machine-trained networks by the neural network chip fabric 2810. As mentioned above, different clusters of cores of the fabric 2810 can implement different machine-trained networks in parallel in some embodiments. In different embodiments, these neural network parameters are stored on-chip (i.e., in memory that is part of the neural network chip fabric 2810) or loaded onto the IC 2810 from the neural network parameter memory 2875 via the processing unit(s) 2805.

While the components illustrated in FIG. 28 are shown as separate components, one of ordinary skill in the art will recognize that two or more components may be integrated into one or more integrated circuits. In addition, two or more components may be coupled together by one or more communication buses or signal lines (e.g., a bus between the general-purpose processing units 2805 and the neural network IC 2810, which enables the processing units 2805 to provide inputs to the neural network IC 2810 and receive the outputs of the network from the IC 2810. Also, while many of the functions have been described as being performed by one component, one of ordinary skill in the art will realize that the functions described with respect to FIG. 28 may be split into two or more separate components.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 29:
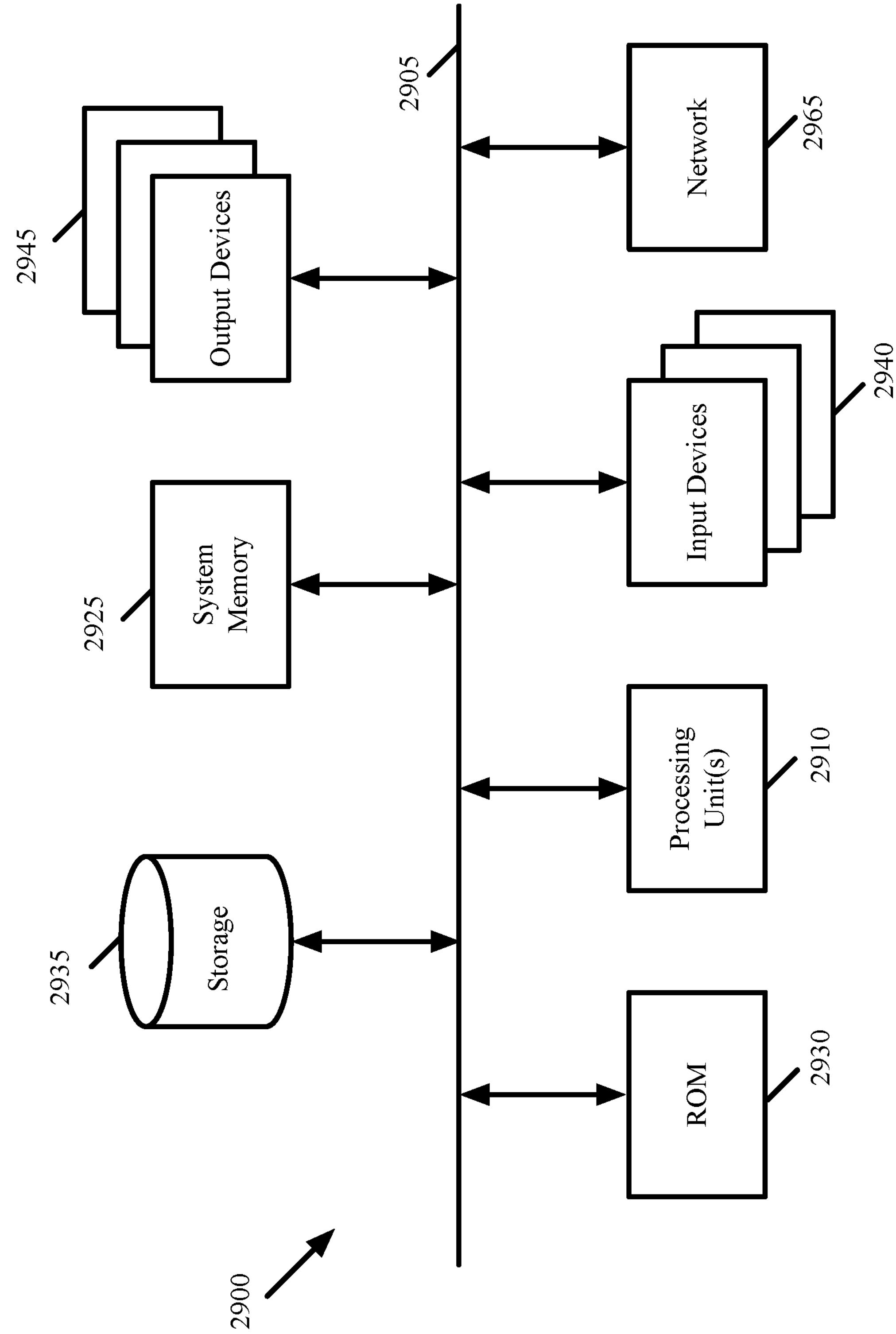
FIG. 29 conceptually illustrates an electronic system with which some embodiments of the invention are implemented.

FIG. 29 conceptually illustrates an electronic system 2900 with which some embodiments of the invention are implemented. The electronic system 2900 can be used to execute any of the control and/or compiler systems described above in some embodiments. The electronic system 2900 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 2900 includes a bus 2905, processing unit(s) 2910, a system memory 2925, a read-only memory 2930, a permanent storage device 2935, input devices 2940, and output devices 2945.

The bus 2905 collectively represents all system, peripheral, and chipset buses that communicatively connect the numerous internal devices of the electronic system 2900. For instance, the bus 2905 communicatively connects the processing unit(s) 2910 with the read-only memory 2930, the system memory 2925, and the permanent storage device 2935.

From these various memory units, the processing unit(s) 2910 retrieves instructions to execute and data to process in order to execute the processes of the invention. The processing unit(s) may be a single processor or a multi-core processor in different embodiments.

The read-only-memory (ROM) 2930 stores static data and instructions that are needed by the processing unit(s) 2910 and other modules of the electronic system. The permanent storage device 2935, on the other hand, is a read-and-write memory device. This device is a non-volatile memory unit that stores instructions and data even when the electronic system 2900 is off. Some embodiments of the invention use a mass-storage device (such as a magnetic or optical disk and its corresponding disk drive) as the permanent storage device 2935.

Other embodiments use a removable storage device (such as a floppy disk, flash drive, etc.) as the permanent storage device. Like the permanent storage device 2935, the system memory 2925 is a read-and-write memory device. However, unlike storage device 2935, the system memory is a volatile read-and-write memory, such a random-access memory. The system memory stores some of the instructions and data that the processor needs at runtime. In some embodiments, the invention's processes are stored in the system memory 2925, the permanent storage device 2935, and/or the read-only memory 2930. From these various memory units, the processing unit(s) 2910 retrieves instructions to execute and data to process in order to execute the processes of some embodiments.

The bus 2905 also connects to the input and output devices 2940 and 2945. The input devices enable the user to communicate information and select commands to the electronic system. The input devices 2940 include alphanumeric keyboards and pointing devices (also called "cursor control devices"). The output devices 2945 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 29, bus 2905 also couples electronic system 2900 to a network 2965 through a network adapter (not shown). In this manner, the computer can be a part of a network of computers (such as a local area network ("LAN"), a wide area network ("WAN"), or an Intranet, or a network of networks, such as the Internet. Any or all components of electronic system 2900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, some of the figures (including FIG. 21) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A neural network inference circuit for executing a neural network, the neural network inference circuit comprising:

a set of circuits to compute a dot product of (i) a set of input values for a computation node of the neural network and (ii) a set of predefined weight values for the computation node, wherein each weight value in the set of predefined weight values for the computation node comprises one of a positive value, twice the positive value, a negation of the positive value, twice the negation of the positive value, and the value zero, wherein the set of circuits comprises:

an adder tree circuit to (i) receive at least a subset of the input values, (ii) apply a negation factor to received input values with negative corresponding weight values, and (iii) add together the received input values with the negation factors; and for each input value of the subset of input values, a circuit to configurably double the input value when the weight value corresponding to the input value is either twice the positive value or twice the negation of the positive value.

2. The neural network inference circuit of claim 1, wherein for each input value of the subset of input values, the circuit to configurably double the input value comprises:

a multiplier circuit for doubling the input value; and a multiplexer circuit for selecting between the input value and the doubled input value based on configuration data that specifies to select the doubled input value when the corresponding weight value is either twice the positive value or twice the negation of the positive value.

3. The neural network inference circuit of claim 2, wherein each multiplier circuit for doubling the input value comprises a left shift circuit that shifts the input value left by one bit.

4. The neural network inference circuit of claim 2, wherein the configuration data is stored as encoded weight data, said encoded weight data comprising, for each weight value that is not equal to zero, (i) a bit specifying whether the weight value is positive and (ii) a bit specifying whether to select the doubled input value.

5. The neural network inference circuit of claim 1, wherein:

the set of input values comprises a first number of input values and the subset of input values received by the adder tree circuit comprises a second, smaller number of input values;

the set of circuits further comprises a plurality of input reduction circuits to select the subset of input values from the set of input values.

6. The neural network inference circuit of claim 5, wherein the input values that are not selected for the subset of input values all have corresponding weight values equal to zero.

7. The neural network inference circuit of claim 6, wherein at least one of the selected input values in the subset of input values also has a corresponding weight value equal to zero.

8. The neural network inference circuit of claim 5, wherein each input value in the set of input values with a corresponding weight value that is not equal to zero is selected for the subset of input values.

9. The neural network inference circuit of claim 8, wherein the neural network is trained to ensure that at least a threshold number of the weight values are equal to zero.

10. The neural network inference circuit of claim 1, wherein the set of input values comprises output values from a plurality of previously-executed nodes of the neural network.

11. The neural network inference circuit of claim 1 further comprising a set of post-processing circuits to apply a set of post-processing operations to the dot product in order to compute an output value for the computation node.

12. The neural network inference circuit of claim 11, wherein the set of post-processing circuits comprises:

an addition circuit to add a first predefined value to the dot product to compute a first intermediate result, the predefined value based at least partly on a number of negative weight values in the set of predefined weight values;

a multiplication circuit to multiply the first intermediate result by a second predefined value to compute a second intermediate result, the second predefined value based at least on the positive value that defines the weight values for the computation node; and an activation function circuit to apply a non-linear activation function to the second intermediate result to compute the output value for the computation node.

13. The neural network inference circuit of claim 12, wherein the circuits to configurably double the input value enable the use of weight values that are twice the positive value and twice the negation of the positive value, thereby enabling the neural network inference circuit to execute networks with quinary weight values.

14. The neural network inference circuit of claim 1 further comprising a plurality of sets of circuits, each respective circuit set to compute a respective dot product of (i) a respective set of input values for a respective computation node of the neural network and (ii) a respective set of predefined weight values for the respective computation node.

15. The neural network inference circuit of claim 14, wherein:

each respective circuit set in the plurality of circuit sets simultaneously computes its respective dot product using (i) a same set of input values as each other circuit set of the plurality of circuit sets and (ii) different respective sets of predefined weight values; and for each respective set of predefined weight values for a respective computation node, each weight value comprises a respective positive value for the computation node, twice the respective positive value, the negation of the respective positive value, twice the negation of the respective positive value, and the value zero.

16. The neural network inference circuit of claim 15, wherein each respective circuit set comprises:

a respective adder tree circuit to (i) receive a respective subset of the set of input values, (ii) apply the negation factor to received input values with negative corresponding weight values in the respective set of predefined weight values, and (iii) add together the received input values with the negation factors; and for each input value of the respective subset of input values, a circuit to configurably double the respective input value when the respective weight value corresponding to the input value is either twice the respective positive value or twice the negation of the respective positive value.

17. The neural network inference circuit of claim 16, wherein, based on the different sets of weight values, different input values are doubled for different computation nodes by sending different configuration data to the different circuits for configurably doubling the input values.

18. The neural network inference circuit of claim 15, wherein the respective positive values are the same for all of the simultaneously-computed respective dot products.

19. The neural network inference circuit of claim 15, wherein the respective positive values are different for different simultaneously-computed respective dot products.

20. The neural network inference circuit of claim 1, wherein:

the neural network comprises a plurality of layers; and for a particular layer, the circuit set computes a plurality of dot products for a plurality of computation nodes, each dot product being a dot product of (i) a different respective set of input values and (ii) the set of predefined weight values.

* * * * *